United States Patent [19]

Bennett et al.

[11] Patent Number: 4,591,983
[45] Date of Patent: May 27, 1986

[54] HIERARCHICAL KNOWLEDGE SYSTEM

[75] Inventors: James S. Bennett; Jay S. Lark, both of Palo Alto, Calif.

[73] Assignee: Teknowledge, Inc., Palo Alto, Calif.

[21] Appl. No.: 628,817

[22] Filed: Jul. 9, 1984

[51] Int. Cl.⁴ .............................................. G06F 15/24
[52] U.S. Cl. .................................... 364/403; 364/468; 364/478; 235/385; 29/703
[58] Field of Search ................................ 364/400–401, 364/403, 468–469, 478, 513, 518; 209/1–2, 546, 552; 235/385; 29/33 K, 33 R, 400 R, 400 M, 428–431, 469, 564, 568, 700–703, 711

[56] References Cited

U.S. PATENT DOCUMENTS

| 4,203,204 | 5/1980 | Murphy | 29/703 |
| 4,310,964 | 1/1982 | Murphy | 29/469 |
| 4,332,012 | 5/1982 | Sekine et al. | 364/468 |
| 4,472,783 | 9/1984 | Johnstone et al. | 364/478 X |
| 4,484,289 | 11/1984 | Hemond | 364/478 |
| 4,504,919 | 3/1985 | Fujii et al. | 364/478 |
| 4,509,123 | 4/1985 | Vereen | 364/403 X |

OTHER PUBLICATIONS

James Bennett et al., "SACON: A Knowledge-Based Consultant for Structured Analysis," Stanford University Rep. STAN-CS-78-688 (Sep. 1978).
Bennett & Engelmore, "SACON: A Knowledge-Based Consultant for Structured Analysis," Proc. of the Sixth Int. Joint Conf. on Artificial Intelligence, Tokyo (Aug. 20–23, 1979) pp. 47–49.
John McDermott, "R1: A Rule-Based Configurer of Computer Systems," Carnegie-Mellon Univ., Rep. CMU-CS-80-119 (Apr. 1980).
W. van Melle et al., The Emycin Manual, Stanford University, Rep. STAN-CS-81-855 (Oct. 1981).
Barr & Feigenbaum (eds.), The Handbook of Artificial Intelligence, William Kaufmann, Inc. (1982) vol. II, pp. 79–86, 150–154, vol. III, pp. 515–530, 541–556.

Primary Examiner—Gary V. Harkcom
Attorney, Agent, or Firm—Leydig, Voit & Mayer

[57] ABSTRACT

A knowledge system has a hierarchical knowledge base comprising a functional decomposition of a set of elements into subsets over a plurality of hierarchical levels, a plurality of predefined functions or conditions of the elements within the subsets of a plurality of the hierarchical levels, and a predefined set of operations to perform on a user-defined set of elements responsive to the functional knowledge base. Preferably, the knowledge base is defined declaratively by assigning parent sets to offspring subsets to define the hierarchy, by indicating the conditions of the subsets which satisfy the predefined functions and by writing task blocks in an imperative language defining the sequence of operations to perform on the user-defined set of elements. Preferably the operations include matching, configuring and expanding the user-defined set of elements into the defined subsets of individual elements and evaluating the predefined functions, and the operations are executed recursively. In a specific embodiment the elements are available components for a system or item of manufacture, and the subsets of elements are sub-assemblies or functionally related components. The predefined functions define condition-action constraints to insure that the sub-assemblies have compatible components. Such a knowledge system has general applicability, is easy to maintain and incrementally modify, has transparent representation of the functional decomposition and the configuration operations, and provides explanation for an assessment of the configuration.

70 Claims, 13 Drawing Figures

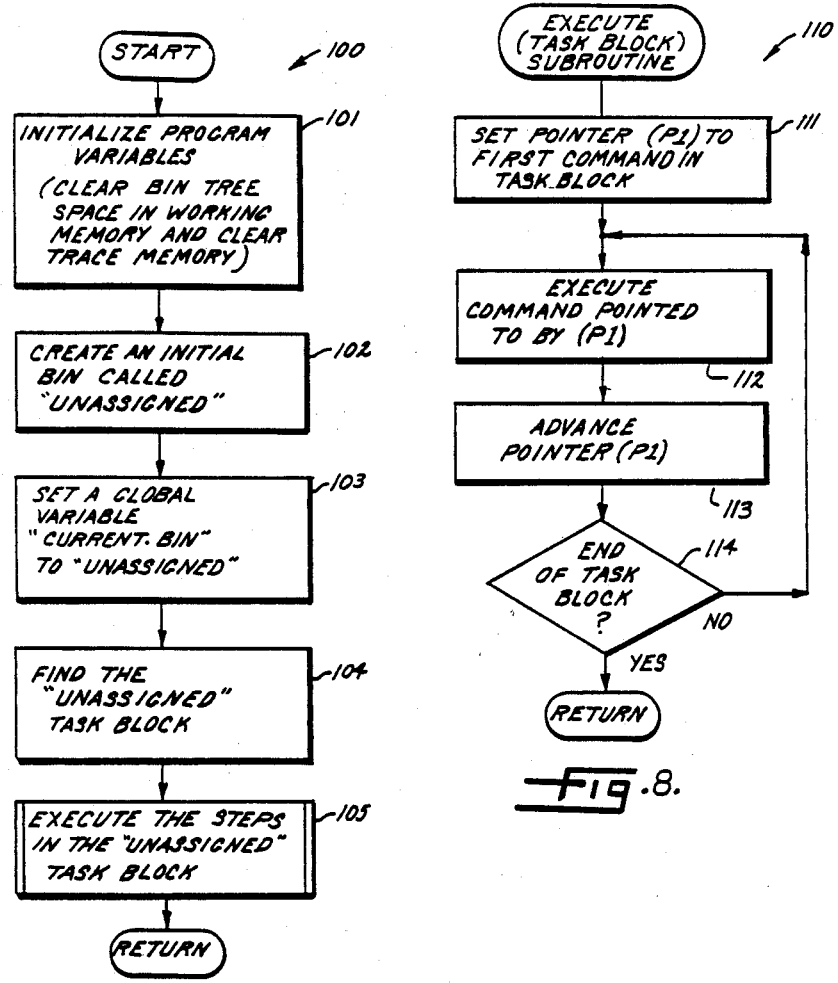

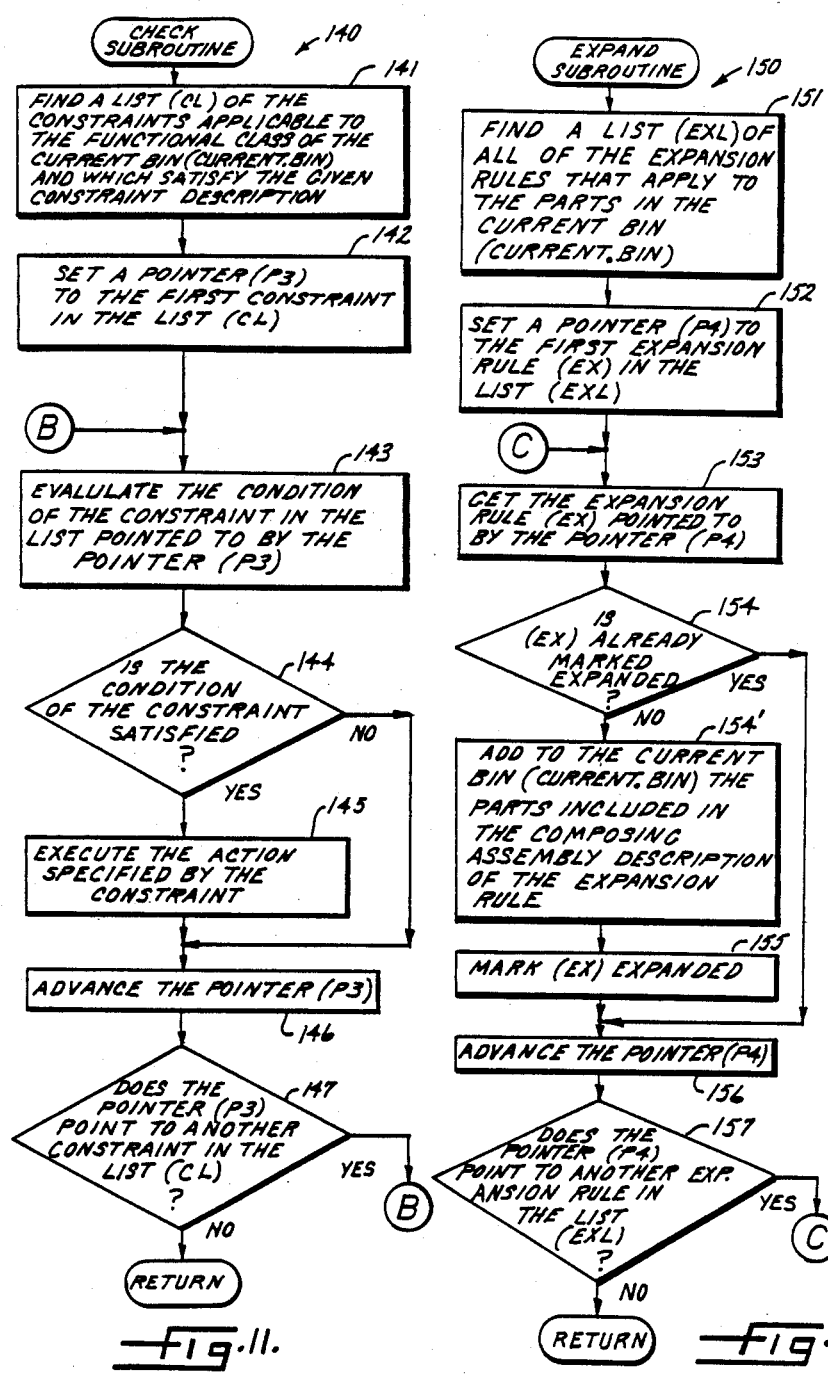

HIERARCHICAL KNOWLEDGE SYSTEM

FIELD OF THE INVENTION

The present invention relates generally to inventory control and the processing of orders for flexibly assembled systems or items of manufacture, and more specifically to computer systems to aid in the checking of orders for products or systems to be manufactured or assembled.

BACKGROUND OF THE INVENTION

The traditional method of mass production realizes economy of scale due to continuous application of capital and division of labor. In recent years, however, a method of "flexible assembly" has become popular for relatively expensive and complex items such as computers. For these kinds of products, the additional cost of assembling a unique system for a particular customer is offset by the omission of parts that are not desired by the customer. The flexibly assembled product becomes a better match to a specific customer's need than a standard product designed for a particular group of customers.

The typical method of handling an order for a flexibly assembled product is to split the order into secondary orders or "production requests" for groups of standard parts or "kits" that are functionally related or comprise sub-assemblies. Since the production requests are standardized, the flexibly assembled item is sold in terms of features or "packages" which can be made up of the kits. The process of converting the desired packages or features into corresponding production requests is a process of expansion from a list of packages to a list of kits. As this expansion process is carried out, the order is also validated or checked for comformance with marketing and engineering constraints on permissible configurations. In many cases, violations of the constraints are not evident when the order is submitted and are revealed only when the order is partially or totally expanded.

Computer systems have been used previously for expanding and validating orders. The expansion and validation, for example, is part of an inventory control system. Using traditional computer programs, the computer system performs a syntactic check on the list of package numbers comprising an order. The computer system may also use product definition files for separate versions of a generic product as the basis for expanding packages into kits, and may check whether the individual package numbers are legal options within a particular hierarchy under at least some conditions. But global engineering constraints such as power and interconnection are not performed by these computer systems using traditional programming techniques. Although it would be possible to program constraints into the computer program for a specific set of product hierarchies, the computer program would not be easy to update and maintain since the computer program would have to be rewritten for each change in the product hierarchy. Moreover, the constraints are relatively complex and change frequently. It is, therefore, not economical to include global constraint checking in these conventional computer systems.

In order to provide a maintainable computer system for running expansion and validation of an order, knowledge-based systems have been considered wherein the knowledge of what the constraints are and when the constraints are to be applied is encoded declaratively in a knowledge base. A separate knowledge base interpreter interprets the knowledge base to apply the constraints. Consequently, the knowledge base interpreter need not be modified when the knowledge in the knowledge base is updated or changed. Knowledge systems have been used in general for problems that require diagnosis, recommendation, selection or classification. These problems have traditionally been performed by human experts and are not easily implemented using conventional programming techniques.

Presently there are highly developed commercial tools which may be used to build knowledge systems. The well-known commercial tools (such as KS300 manufactured by Teknowledge Inc., 525 University Avenue, Palo Alto, Calif. 94301) are patterned after a tool called EMYCIN described in *The Emycin Manual* by Van Melle et al., Standford University Report No. STAN-CS-81-885, Standford, Calif. 94305 (October, 1981).

EMYCIN is specifically designed as a domain-independent system for constructing rule-based consultant expert system programs. Domain knowledge is represented in EMYCIN systems primarily as condition-action production rules which are applied according to a goal-directed backward-chaining control procedure. Rules and consultation data are permitted to have associated measures of certainty, and incomplete data entry is allowed. The EMYCIN system includes an explanation facility displaying the line of reasoning followed by the consultation program, and answers questions from the client about the content of its knowledge base. To aid the system designer in producing a knowledge base for a specific domain, EMYCIN provides a terse and stylized language for writing rules; extensive checks to catch common user errors, such as misspellings; and methods for handling all necessary indexing chores.

In addition to production rules, the knowledge base for an EMYCIN system includes a hierarchical structure called a "context tree." The elemental representation of an object or idea is defined as a context-parameter-value triple. The context refers generally to an instance of a particular context type, the parameter refers to an attribute of the context instance and the value refers to the particular value of the parameter for the particular context instance. The context tree is defined by parent and offspring declarations for the context types.

The instantiation of contexts is similar to the invocation of a subroutine for each context, the subroutine in effect being defined by various declarations in the context definition. A consultation is started by instantiating a root context and the branches from this root context define major steps in the consultation during which the offspring contexts of the root node are instantiated. Thus, the context definitions are used to structure the data or evidence required to advise a user about the root context. Besides consultation control, the context tree may be used to organize the distinguished components of some object, or for representing distinguished events or situations that happen to an object.

A rule-based knowledge system has been developed for determining a computer system's configuration from a skeletal specification. A system called XCON has been used by the Digital Equipment Corporation when salesmen take orders and when processing clerks check and flesh out incoming orders for VAX-11/780 computer systems. Given a customer's order, XCON determines what, if any, modifications have to be made to the order for reasons of system functionality and produces a number of diagrams showing how the various components on the order are to be associated.

A version of XCON called R1 is described in John McDermott, *R1: A Rule-Based Configurer Of Computer Systems,* Department of Computer Science, Carnegie-Mellon University, (April, 1980). It is said that R1 has sufficient knowledge of the configuration domain and of the peculiarities of the various configuration constraints that at each step in the configuration process, R1 simply recognizes what to do. Consequently, it is said that little search is required in order for R1 to configure a computer system.

Although the XCON rule-based system represents a major improvement over traditional computer techniques in the field of computer configuration, it is rather difficult to change the constraint rules in XCON. In particular, to change a constraint rule, one needs to know what occurs before and after the constraint rule is applied. In general, the constraint rules are interlaced and spread, and they are not readily accessible for maintenance since in general they are not conceptually hierarchical.

SUMMARY OF THE INVENTION

The primary object of the invention is to provide a knowledge system for generalized representation and processing of hierarchical assemblies that is easily maintainable and extensible.

Another object of the invention is to provide an intelligible knowledge base representation for hierarchical assemblies and their functionality.

Still another object of the invention is to provide an intelligible knowledge base representation for configuration strategies and actions.

Still another object of the invention is to provide a knowledge system for configuration checking which clearly separates the definition of configuration constraints from configuration checking strategies and actions.

And yet another object of the invention is to provide an improved control procedure for configuration checking.

And still another object of the invention is to provide an explanation facility especially suited for configuration analysis and adaptation.

Briefly, in accordance with the broadest aspect of the invention, a knowledge system for generalized representation and processing of hierarchical assemblies has a hierarchical knowledge base comprising a decomposition of a set of elements into subsets over a plurality of hierarchical levels, a plurality of respective predefined functions or conditions of the elements within the subsets at a plurality of the hierarchical levels, and a predefined set of operations to perform on a user-defined set of elements responsive to the knowledge base. For ease of maintenance and extensibility, the knowledge base is defined declaratively by assigning parent sets to offspring subsets to define the hierarchy, by indicating the conditions of the subsets which satisfy the predefined functions, and by writing task blocks in an imperative language defining the sequence of operations to perform on the user-defined set of elements. Preferably, the operations include operations for matching, configuring and expanding the user-defined set of elements into the defined subsets of individual elements and for evaluating the predefined functions, and the operations are executed recursively.

In accordance with a preferred embodiment of the invention, a knowledge-based configuration system has separate portions encoding a configuration checking strategy, a description of hierarchical functions of the product to be configured, a catalog of the parts and components which implement those functions, assembly constraints that check whether a given set of components will successfully implement their respective hierarchical functions. The configuration system applies the assembly constraints during configuration checking and if necessary, warns the user or modifies the given set of components to insure compliance with the assembly constraints.

The control knowledge is encoded in an imperative language defining specific configuration control actions to be executed during interpretation of the control knowledge according to a built-in control procedure. Since the configuration control knowledge is explicit and results in modification of the given configuration only in a precisely defined fashion, the configuration system can always explain its conclusions and reasoning, and is intelligible and modifiable.

To provide transparent representation of the control knowledge as well as factual knowledge, the knowledge base is preferably organized into distinct portions including the assembling constraints, task blocks encoding the control strategy knowledge, functional hierarchy classes which become instantiated into bins, bin variables which take on values describing the bins and their contents, the catalog of parts, rules for expanding sub-assemblies into parts, and user-defined functions for computing the values of bin variables. The assembly constraints may be defined in terms of specified bin variables and certain built-in functions responsive to the number of specified parts in specified bins.

A particular task block is provided to be executed at the start of a configuration. The knowledge engineer must provide task blocks which are invoked after instantiation of specified functional hierarchy classes and when the values of the bin variables are to be determined, and may provide explicitly invoked task blocks.

The functional hierarchies are preferably represented by entries defining specific functions that are performed by the configured product, and each entry can be composed of more specific functional entries. Associated with each functional entry is a configuration strategy for checking that the parts in a given configuration will implement the desired function. The system will warn the user when the configuration is incorrect, and can optionally modify the configuration by adding, deleting, and modifying parts in the respective bin for the functional hierarchy. The configuration strategy also describes the order that parts that achieve certain functions should be checked, and describes when to expand sub-assemblies into the same bin of their respective functions.

An explanation facility is provided to allow the user to validate the acceptability of the configuration, to identify unacceptable portions of the configuration, and to identify modifications made to the configuration to satisfy the constraints. A tracing and translation facility is provided to expose the specific steps and the knowledge used in the configuration checking process so that the validity of the configuration strategy is apparent.

BRIEF DESCRIPTION OF THE DRAWINGS

Other objects and advantages of the invention will become apparent upon reading the following detailed description and upon reference to the drawings in which:

FIG. 7 is a flowchart for the executive program in the built-in control procedure of the knowledge system shown in FIG. 1;

FIG. 8 is a flowchart of an EXECUTE subroutine for executing task blocks of control procedure steps;

FIG. 11 is a flowchart of a CHECK subroutine for applying a specified subset of the constraints applicable to the functional class of the current bin;

FIG. 12 is a flowchart of an EXPAND subroutine for expanding the parts in the current bin into their component parts by applying predefined expansion rules associated with the current bin.

Figure 1:
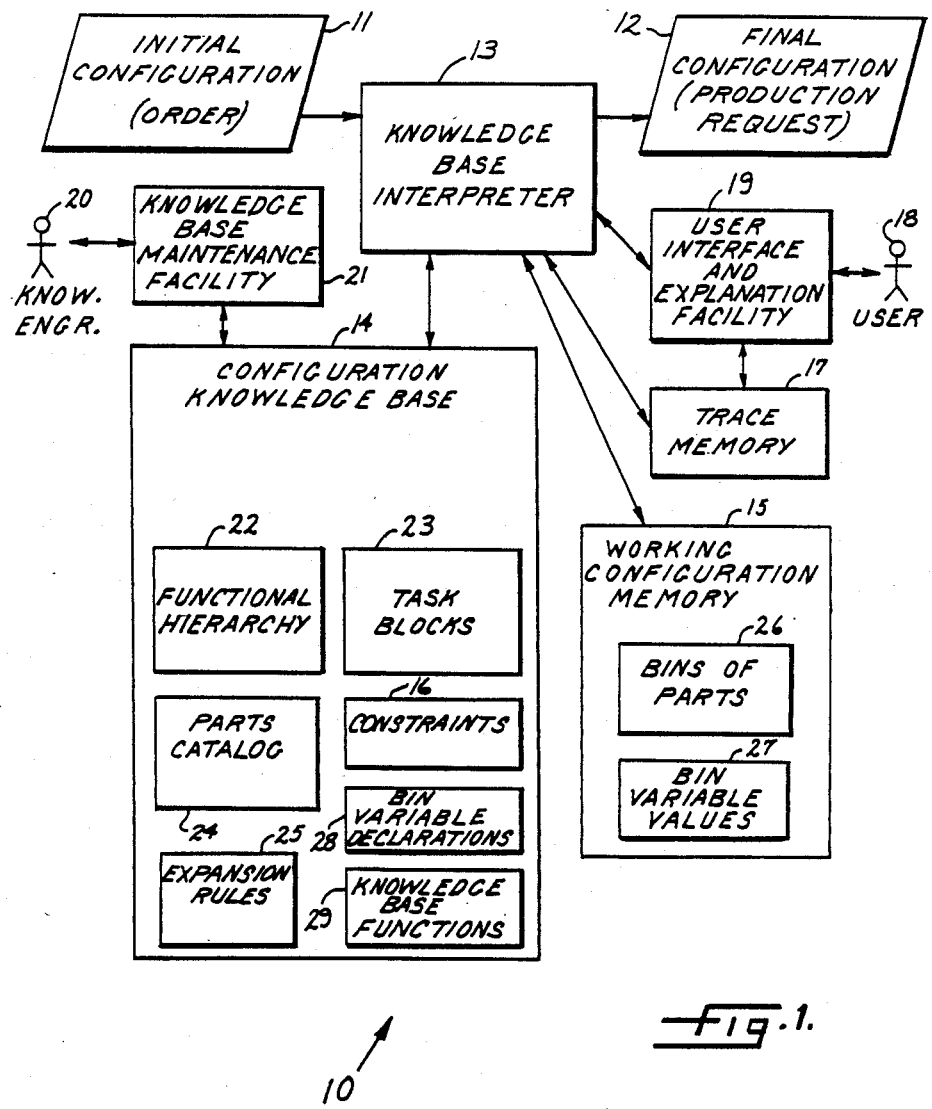
FIG. 1 is a schematic diagram of a knowledge system incorporating various aspects of the present invention.

While the invention is susceptable to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to FIG. 1, there is shown a block diagram generally designated 10 of a knowledge system for processing an initial configuration of elements or an order 11 to arrive at a final configuration or production request 12. The system 10 is recognized as a knowledge system since it has a domain-independent knowledge base interpreter 13 executing a built-in control procedure for interpreting a domain-dependent knowledge base 14. The knowledge base 14 encodes a generic configuration in a highly structured and transparent format. In general terms, the knowledge base interpreter 13 matches the elements of the initial configuration in the order 11 to the generic configuration in the knowledge base 14 to structure or configure the elements according to the generic configuration. The elements structured in terms of the generic configuration are stored in a working configuration memory 15.

Once the elements or parts of the order 11 are structured according to the generic configuration, the knowledge base intepreter 13 may apply functions or constraints 16 stored in the knowledge base 14 to the working configuration in the memory 15. The constraints 16, for example, indicate particular aspects of the working configuration 15 that are not apparent from the initial configuration or order 11. The constraints 16 may also indicate desirable changes to make to the working configuration 15. The knowledge base interpreter 13 may execute these indicated changes in order to change the working configuration. At the end of processing by the knowledge base interpreter 13, these executed changes are reflected in the final configuration 12.

The knowledge system 10 has a trace memory 17 for keeping a precise record of the steps performed during the matching of the elements of the initial configuration 11 to the generic configuration in the knowledge base 14 and during the application of the constraints 16 to the working configuration 15. To enable a user or order analyst 18 to inspect relevant portions of the trace 17, a user interface and explanation facility 19 is provided. The user 18 may, for example, request a complete typescript of the contents of the trace memory 17 in an easily understandable form. An example typescript is included in Appendix I at the end of the present specification.

The knowledge base 14 is arranged so that it is easily modified and maintained to reflect desired changes in the generic configuration. The modification and maintenance is performed by a knowledge engineer 20 and the knowledge base 14 is accessed through an editor 21 called a knowledge base maintenance facility. The knowledge engineer 20 initially creates the knowledge base 14 collecting and encoding knowledge about the generic configuration according to a precise format and syntax so that the knowledge is transparent to the knowledge engineer and is machine readable by the knowledge base intepreter 13. For the processing of an order of parts 11 to generate a production request 12 for a system or product, the knowledge engineer 20 collects engineering and marketing data on the generic configuration of the product and its constraints and encodes the information according to the syntax recognized by the knowledge base interpreter 13.

The specific format of the knowledge base 14 is chosen so that the knowledge base can be easily updated to reflect the addition of new products and changes in current products. The generic configuration is represented as a functional hierarchy 22 which describes the product in various degrees of particularity. When a product is modified, only the particular portions of the functional hierarchy 22 need be changed. Moreover, since the hierarchy is in terms of the function of performance of parts of the generic configuration for the product, the changes required in the functional hierarchy 22 are minimal.

For each function in the functional hierarchy 22, a separate task block 23 is provided to encode corresponding steps in the control procedure followed by the knowledge base interpreter 13 to match the parts or elements of the initial configuration 11 to the functional hierarchy 22. A change in the functional hierarchy usually requires only a localized change in the respective task block 23. Also, the constraints 16 correspond to particular functions in the functional hierarchy 22 so that the constraints 16 are also easily modified. Consequently, the constraints associated with a particular function in the functional hierarchy are applied in a manner specified by the respective task block 23.

It should be noted that even though the functional hierarchy 22 might not change during the life of a particular product, the parts or elements making up the product may change during the life of the product. These changes are reflected in a parts catalog 24. Moreover, to simplify the process of taking an order from a customer, an order typically includes packages of parts implementing certain features. To enable the knowledge base interpreter 13 to find the particular parts included in the packages in the order 11, the knowledge base 14 includes a set of expansion rules 25.

In addition to providing a framework for clearly intelligible and maintainable representation of knowledge about a product, the functional hierarchy 22 provides the structure or framework for the control procedure executed by the knowledge base interpreter 13 to match the parts in the order 11 to the generic configuration in the knowledge base 14 and to apply the constraints 16 to validate the order 11 and generate a production request 12. The working configuration memory 15 is organized into respective bins of parts 26 corresponding to the major functional components of the product defined by the functional hierarchy 22. Each bin of parts 26 corresponds to a structural or functional assembly in the product and the matching process is performed by inputting the initial configuration or list of parts 11 into an initial bin of parts 26 and sequentially matching the parts in parent bins to assembly descriptions for offspring bins and transferring the matching parts to the offspring bins. The task blocks 23 specify the particular assembly descriptions and the specific sequence of matching and transferring the parts. Before matching and transfering the parts from certain bins, however, the expansion rules 25 must sometimes be applied to "break open" certain packages of parts in the order 11 since different parts from the same packages sometimes match the assembly descriptions of different offspring bins. At the end of the transfer process, the bins of parts 26 contain respective parts from the initial configuration 11. Hence, the parts in the initial configuration 11 have been structured or configured according to the generic product configuration or functional hierarchy 22 and thus the constraints 16 may be applied to their respective bins of parts 26.

In order to simplify the process of applying the constraints, the constraints 16 may include bin variables defined for particular respective parent bins and which may be referenced in the parent bins and respective offspring bins of the parent bins. The knowledge base 14 includes separate declarations 28 of the bin variables. The respective task blocks 23 include steps for determining the values for the bin variables 27 and the values are stored in the working configuration memory 15. These steps in the task blocks 23 may include function calls to knowledge base functions 29 in the knowledge base 14. The knowledge base functions 29 typically count parts and perform numerical computations to determine values for bin variables. In addition to conditioning constraints, bin variables may be used to condition the sequence of execution of the steps in the task blocks in order to perform conditional expansion, matching and transfer of parts and assemblies.

Figure 2:
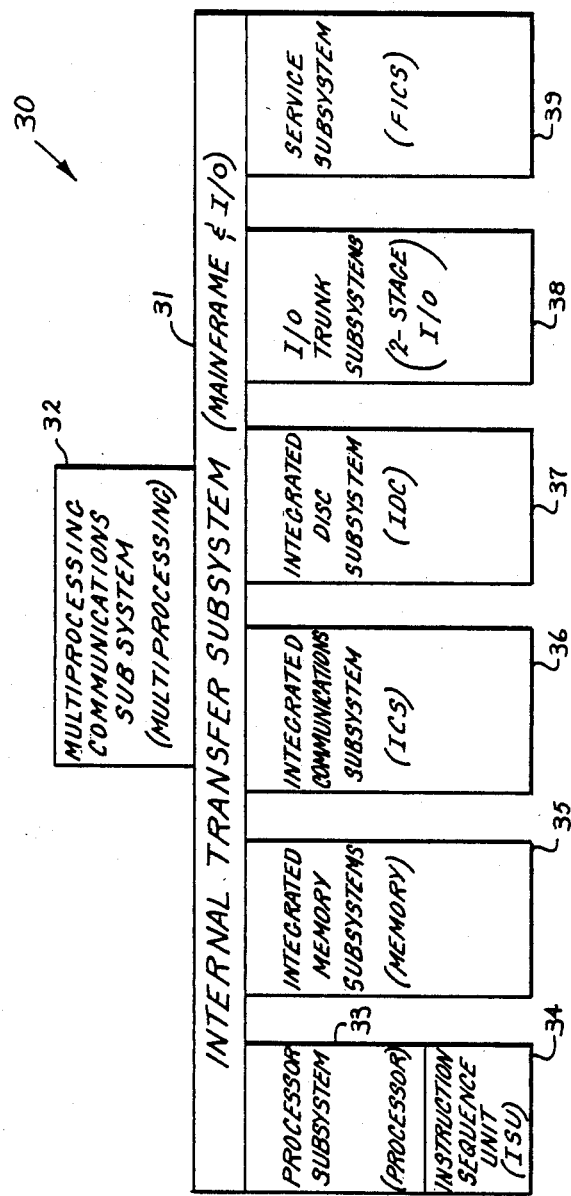
FIG. 2 is a block diagram of an exemplary M1234 computer system which is configured by the knowledge system in FIG. 1 using the knowledge base shown in Appendices II (A)–(E) to the present specification.
Figure 3:
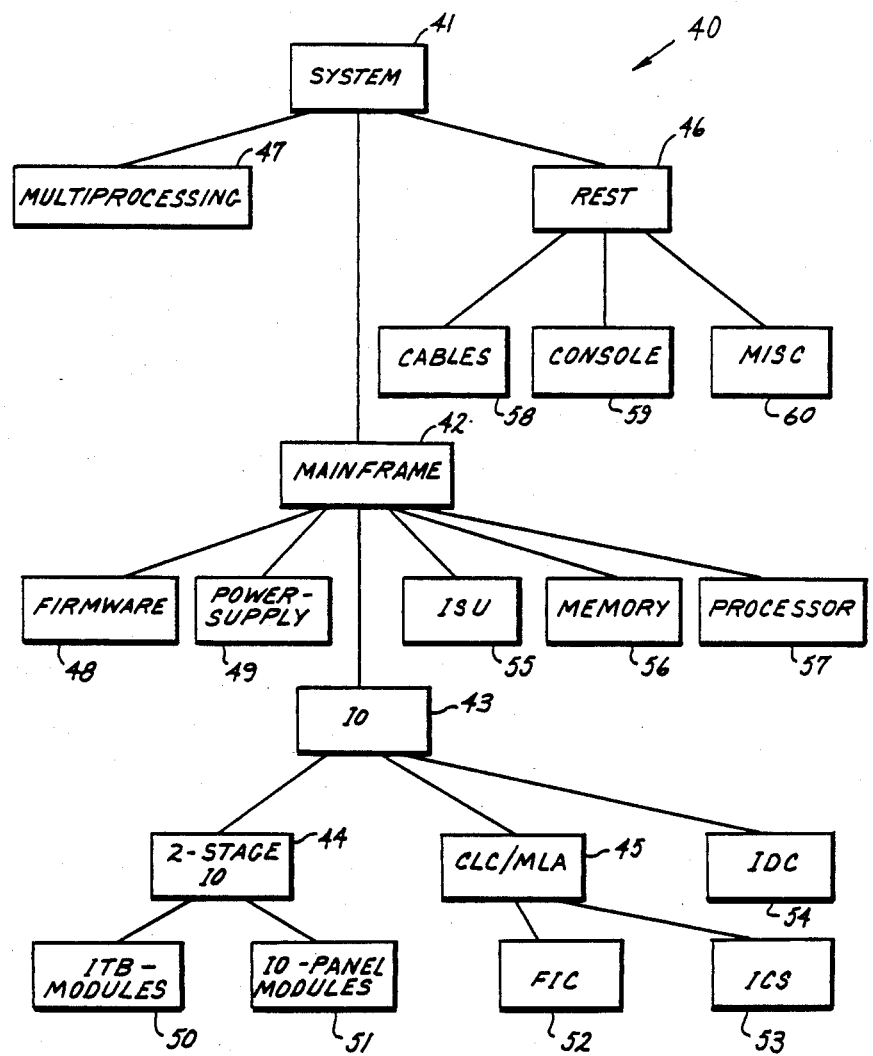
FIG. 3 is a tree diagram of the functional hierarchy for the M1234 computer system shown in FIG. 2.

Turning now to FIGS. 2 and 3, the process of generating a functional hierarchy for a particular product is illustrated. The knowledge engineer obtains a description of the product from product engineers and technical manuals. The description should include an engineering diagram of the product in the form of a functional block diagram. A functional block diagram generally designated 30 for an exemplary M1234 computer system is shown in FIG. 2. The block diagram 30 shows functional subsystems arranged around an internal transfer subsystem 31 which includes, for example, the mainframe and primary input/output (I/O) bus in the M1234 computer. The internal transfer subsystem 31 exchanges data among the various other subsystems of the computer. These other subsystems include a multiprocessing communications subsystem 32, a processor subsystem 33 including the central processing unit of the computer, an instruction sequence unit 34 for controlling the sequence of instructions executed by the central processor, integrated memory subsystems 35 including the random access memory for the computer, an integrated communication subsystem 36 for providing a number of data links between the computer and external devices, an integrated disk subsystem 37 having a number of disk drives, I/O trunk subsystems 38 interfacing a number of computer peripherals, and a service subsystem 39 for interfacing printers, flexible disk drives, card readers, and computer terminals.

From the block diagram in FIG. 2 and other technical information about the M1234 computer, the knowledge engineer 20 generates a functional hierarchy description of the M1234 computer as illustrated in FIG. 3. In FIG. 3 the hierarchy is arranged in the form of a tree diagram generally designated 40, having an initial or root node 41, intermediate or branch nodes 42–46, and several terminal or leaf nodes 47–60. Each node in the functional hierarchy 40 represents a single functional component. The initial node 41 and the intermediate nodes 42–46 represent functional components that are composed of a number of more specific functional components. Specifically, the functional hierarchy 40 is defined by including declarations of parent functional components in the definitions of the intermediate 42–46 and terminal 47–60 functional components. The functional component MAINFRAME 42, for example, has the parent functional component SYSTEM 41. The functional hierarchy 22 of the knowledge base 14 (FIG. 1) corresponding to the tree diagram 40 in FIG. 3 is listed in Appendix II (A). According to the particular knowledge base syntax of Appendix II (A), it is said that the declared offspring functional component "COMPOSES" its parent functional component.

It should be noted that the consultation typescript of Appendix I was generated by the interpretation of a knowledge base in Appendices II (A)–(E). The task blocks are in Appendix II (B); the parts catalog is in Appendix II (C); the constraints, bin variable declarations, and knowledge base functions are in Appendix II (D); and the expansion rules are in Appendix II (E).

In general the knowledge base is in the form of a list of declarations of task blocks which are invoked and executed when the system is run, declarations of knowledge base functions which are applied or evaluated during execution of the task blocks to set values of the bin variables, and declarations of knowledge base objects which become instantiated to generate one or more object instances in working memory during execution of the task blocks. Declarations of task blocks and knowledge base functions are preceded by the identifiers DEFTASKBLOCK and DEFKBFUN, respectively, followed by a specified name for the task block or knowledge base function. Declarations of objects are preceded by the identifier DEFCLASS, followed by a specified name for the object and, in parentheses, the class or type of the instantiated object. Object types include BIN (an instance of component or node in the functional hierarchy), PRODUCT.ID (an instance of a particular part), BVI (a bin variable instance), CTI (an instance of applying a constraint or product expansion), and QUEUE. Respective QUEUE instances keep track of the current step of execution in each task block so that the execution of one task block may be interrupted to execute another task block.

The declarations or definitions of object types in the knowledge base include values for instance variables or IVARs associated with instances of the object types. For each offspring BIN, for example, the IVAR "COMPOSES" is set to the name of the BIN's parent BIN. Each BIN and PRODUCT.ID has an IVAR "DESCR" including a description of the respective function or part in English so that the user interface and translation facility 19 may generate comprehensible explanations and traces of the operation of the system 10 (FIG. 1).

Each part in the parts catalog 24 (FIG. 1) implements one of the functions described in the functional hierarchy and each part is annotated to indicate the appropriate functional hierarchy element. In the parts catalog of Appendix IIC, each PRODUCT.ID or individual part has an IVAR "IMPLEMENTS.FN" including the name of the functional component which the part implements. These declarations of the functions implemented by the parts are critical to the operation of the system, since they are used to group and manipulate parts of different functional types during the matching operations.

As noted above, each component of the functional hierarchy has associated with it a particular task block 23 specifying when and how the system should focus on the ordered parts that implement the respective functional component. Also, associated with each functional component in the hierarchy is a set of constraints and bin variables 16 which are evaluated or applied during execution of the task block associated with the functional component.

It is apparent that the functional hierarchy serves both to organize the configuration process and to guide the knowledge engineer in designing and maintaining the knowledge base. By understanding the structure of the functional hierarchy and the effects of the configuration strategy used to process an order, the knowledge engineer can understand how the system will configure an order and how the application of constraints, product definitions, and expansion will affect the processing of that order.

The knowledge system 10 of FIG. 1 has its greatest utility for configuring complex systems such as the M1234 computer as described in FIGS. 2 and 3 and the typescript and knowledge base of Appendices I and II (A)-(E). For the sake of illustration, however, the internal operation of the system will be described in connection with a more easily understood minicomputer system corresponding to the functional hierarchy generally designated 70 in FIG. 4 and corresponding to the consultation typescripts and knowledge base in Appendices III (A)-(B) and IV (A)-(D).

Figure 4:
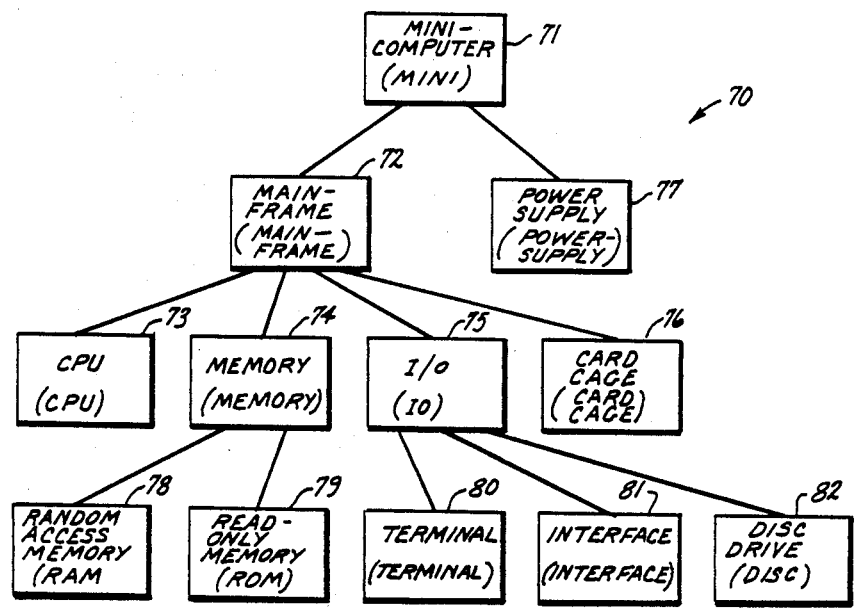
FIG. 4 is a tree diagram of a functional hierarchy for a standard mini computer.

In the functional hierarchy 70 of FIG. 4, each node such as the initial node 71 is labeled by its functional component and has a class name enclosed in parentheses corresponding to the classes declared in the knowledge base functional hierarchy of Appendix III. The minicomputer 71 is presumed to have two major functional components. The main-frame 72 of the minicomputer encompasses all of the active components of the computer such as the central processing unit 73, a computer memory 74, and input/output devices 75. These active devices 73-75 are physically tied together by a card cage 76. The card cage 76 includes mechanical support for various circuit boards performing the active functions of the computer and also provides a network of electrical connections for the transfer of data among the circuit boards. The second functional component of the minicomputer 71 is a power supply 77 which feeds power to the circuit boards through power supply lines running through the card cage 76.

The minicomputer 71 also has a number of sub-assemblies performing active functions. Random access memory (RAM) 78 records data generated during operation of the minicomputer. Read-only memory (ROM) 79 contains fixed data used, for example, to initially run the minicomputer when the computer is first turned on, and also to run fixed utility programs for input and output and also to interpret, compile, or load a computer program written in a standard programming language.

The input/output function 75 has three separate functional assemblies. The minicomputer may include a number of terminals 80 for interacting with a human user. A terminal includes, for example, a cathode ray tube for displaying data to the operator, and a keyboard for receiving data from the operator. The terminals 80 and any other input/output devices are connected or interfaced to the computer via interface circuits 81 on circuit boards received by the card cage 76. The input/output function 75 may also include disk drives 82 for recording and storing relatively large amounts of data.

As a physical object, the minicomputer 71 is comprised of discrete physical components or parts. For a particular model of minicomputer, the minicomputer should be assembled from only a specified set of parts. These specified parts are listed in the parts catalog of Appendix IV (C). These parts include a CAGE-1000 for implementing the card cage 76, a CPU-1000 central processing unit circuit board for implementing the CPU function, a DISC-1000 disk drive, an IF-1000 interface circuit board, a RAM-1000 random access memory circuit board, a ROM-1000 read-only memory circuit board, a TERMINAL-1000 computer terminal, and three different power supplies, including a five ampere power supply SUPPLY-05, a ten ampere power supply SUPPLY-10, and a fifteen ampere power supply SUPPLY-15. The parts catalog in Appendix IV (C) also assigns a model number MINI-1000 to the minicomputer 71.

An order for a MINI-1000 minicomputer must at least include a set of parts, but the set may be empty. In general, an order for a product consists of three types of information. The first type is called "order information"

consists of such information as the customer name and an order number. It is primarily used to identify the order and does not effect the configuration process. The second type called "order lines" is a list of parts ordered and the quantity of each part desired. In general the order lines include the product model number and additional or optional features requested by the customer. The list of parts ordered and the quantity of each part desired is checked by the knowledge system 10 to ensure compatibily. The third type called "field service parts" is a list of additional part numbers and are merely appended or said to be shipped "on top" of the order. The field service parts are typically replacement or spare parts for the customer. The field service parts are not intended to be built into the system and are not checked either for compatibility among themselves or with the rest of the order.

For the consultation typescript in Appendix III (A), the order consists merely of order lines. These order lines specify that the product to be configured is one MINI-1000 minicomputer comprising four RAM-1000 random access memory circuit boards, three ROM-1000 read only memory circuit boards, four TERMINAL-1000 computer terminals, and three DISC-1000 disk drives.

Once the order is received by the knowledge system 10, the parts in the order are checked for consistency by applying the constraints in the knowledge base (Appendix IV (D)). In general, constraints specify engineering or marketing conditions which must be satisfied for the order lines. The constraints also specify the particular action that should be taken in response to whether the conditions are satisfied when the constraints are applied. For the MINI-1000 minicomputer, the order must include at least one RAM-1000 random access memory board, at least one ROM-1000 read only memory board, at least one TERMINAL-1000 computer terminal, and at least one IF-1000 interface board. The action to take when any of these parts is found to be missing is to add one of the respective missing parts, since these parts are essential to the operation of the minicomputer. The minicomputer also has a number of essential components that must be added if missing, but which can only appear with a quantity of one. The minicomputer must have one and only one power supply (SUPPLY-05, SUPPLY-10, or SUPPLY-15), one and only one CPU-1000 central processing unit card, and one and only one CAGE-1000 card cage.

The MINI-1000 minicomputer also has certain functional constraints conditioned on combinations of components. Due to the limited range of addresses addressed by the central processing unit 73, the memory 74 has a limited size. This memory constraint in turn limits the total number of memory circuit boards to no more than seven. If the number of RAM-1000 cards plus the number of ROM-1000 cards exceeds seven, the user must be told that he has ordered too many memory cards. This kind of constraint is called a warning constraint in contrast to the previous modification constraints which require the working configuration of parts to be changed.

The input/output assembly 75 has a few rather complex constraints. No more than four terminals are permitted for the MINI-1000 computer due to marketing objectives. The customer must, for example, buy a more expensive MINI-2000 computer in order to have a system with more than four terminals. Also, a single interface card can either support four terminals, or one terminal and one disk drive per card since the DISC-1000 disk drive requires three times as many data lines than the TERMINAL-1000 computer terminal. The order is modified by adding interface cards and deleting terminals so that these input/output conditions are satisfied.

The mainframe 72 has a hardware or interconnection constraint since the CAGE-1000 card cage has room for no more than sixteen cards or circuit boards. The user is warned if the total number of CPU-1000, RAM-1000, ROM-1000, and IF-1000 cards exceeds sixteen.

The minicomputer 71 has a global power constraint due to the fact that the customer may order a power supply that is smaller than that required under the worst case conditions. The power required is a function not only of the number of cards, but of the particular cards that are used. The CPU-1000 card requires two amperes of current, the RAM-1000 card requires one ampere of current, the ROM-1000 card requires 0.5 amperes of current, and the IF-1000 interface card requires 0.2 amperes of current. The knowledge base in Appendix IV (D) includes a special knowledge base function called "COMPUTE.POWER.NEEDED" for calculating the total amount of power required. Based on the required power, a five ampere power supply SUPPLY-05, a ten ampere power supply SUPPLY-10, or a fifteen ampere SUPPLY-15 should be included in the order. The knowledge base in Appendix IV (D) includes a set of modification constraints to ensure that the smallest power supply is included consistent with the total power requirement.

Figure 5:
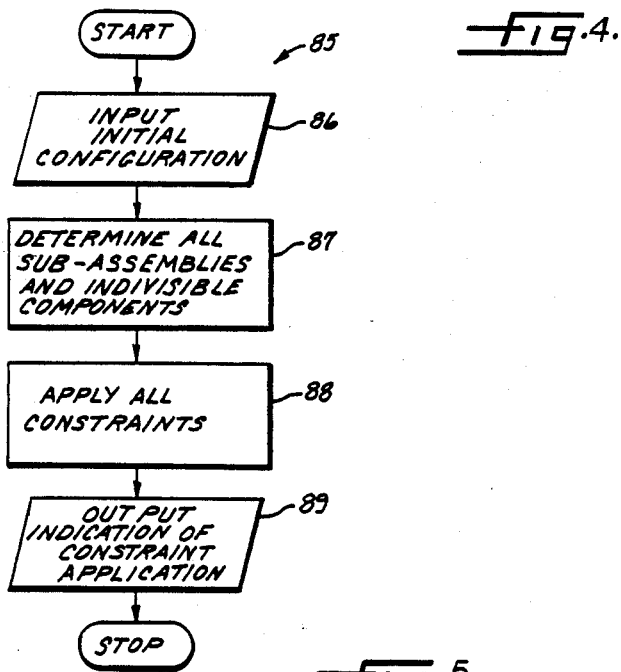
FIG. 5 is a simplified flowchart for the configuration process performed by the knowledge system in FIG. 1.

Shown in FIG. 5 is a flowchart generally designated 85 describing the basic steps in the order checking process. In the first step 86, the order or initial configuration 11 is received by the knowledge system 10 (FIG. 1). Then in step 87 the individual components are determined from the order so that the constraints may be applied in step 88. Once the constraints are applied, in step 89 the indication of the application of the constraints is transmitted to the user. Application of warning constraints may result in warnings to the user, and application of the modification constraints may lead to a production request 12 that differs from the original order 11.

For the MINI-1000 minicomputer, the computer's functional hierarchy, parts catalog, and constraints are relatively simple so that the order checking process in FIG. 5 could easily be implemented using a conventional programming language such as the BASIC language. Since an order for a MINI-1000 computer is merely a list of the indivisible components of the computer, the constraints are easily applied. More importantly, the functional class which each part implements is readily apparent from the type of part. For the M1234 computer described in the knowledge base of Appendices II (A)–(E), however, it would be very difficult to use a conventional programming language to implement an order checking computer system and the computer system would be very difficult to maintain.

Figure 6:
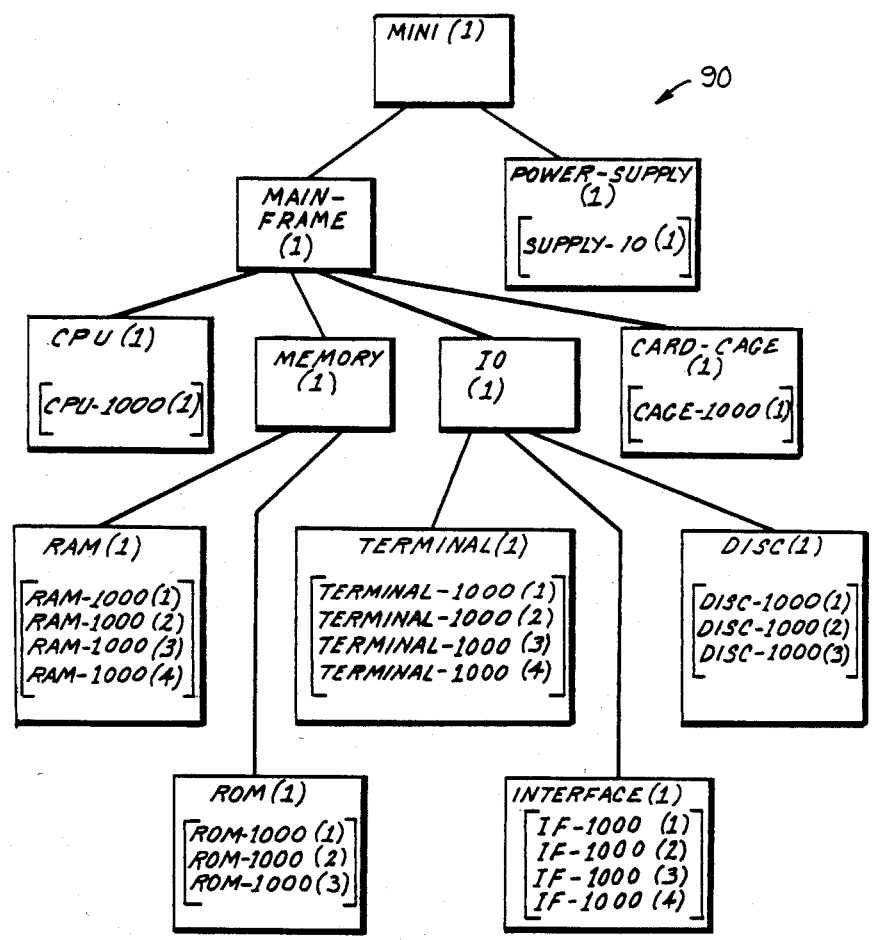
FIG. 6 is a diagram of a bin tree corresponding to the functional hierarchy of FIG. 4 for the mini computer, including the final configuration of parts in the bins for the working example of Appendix III (A)

By using the techniques already described, the components and functionality of a complex product such as a computer can be transparently and explicity represented in the knowledge base. In accordance with another aspect of the present invention, the definition of configuration constraints is clearly separated from the configuration strategies and actions. In particular, a built-in control procedure is provided which permits the constraints to be defined for particular functional components and separately determines which parts are applicable to the respective constraints. At the most basic level, this separation requires a process which builds an explicit representation of the assemblies of the product from the parts in the order. Shown in FIG. 6, for example, is an explicit representation generally designated 90 for the MINI-1000 minicomputer and the example order given above. The explicit representation 90 is a tree of bins corresponding to the functional hierarchy of FIG. 4. In FIG. 6 the name of each bin corresponds to the respective functional component or bin class in the hierarchy of FIG. 4. Moreover, the particular instance of the class is identified by a numeral enclosed in parentheses. Although the examples in the appendices only use a single instance of each functional class, the knowledge engineer may write task blocks which create a specified number of bins for a specified functional class.

The bins are used to hold a set of product instances or parts. The product instances are obtained from the order lines, by application of modification constraints or by EXPANSION operations upon parts initially placed in the bins. The MINI-1000 computer, however, does not have any expandable parts in its parts catalog. Typically for marketing reasons, an order may include packages of parts that are distinguished from orders of the individual parts included in the package. For the MINI-1000 computer, for example, it could be economically desirable to define a basic package including the minimum components. Thus, the basic package would include one CAGE-1000, one SUPPLY-05, one CPU-1000, one RAM-1000, one ROM-1000, one TERMINAL-1000, and one IF-1000. The basic package would be sold at a price less than the total price of the components of the package if the components were ordered separately. Of course, the intention of the manufacturer is not to sell the package at a lower cost, but to sell the packate at market cost and to increase the price of any additional components purchased on top of the basic package.

To apply the constraints, the packages must be expanded into their component parts since the constraints typically apply to individual parts and not packages. The constraints are preferably independent of the product expansions so that the packages may be redefined merely by changing the expansion rules (25 FIG. 1).

Due to the complexity introduced by packages and modification constraints, it is important that the components of the order are properly associated with corresponding constraints. Preferably, this correspondence is obtained by matching the components in the order to predefined assembly descriptions and then applying the constraints to the components which match the respective assembly descriptions. Also, the preferred method of performing the matching is by transferring or sorting the entire order through the bin tree, starting at the initial bin until the elemental parts end up in the terminal bins. For the MINI-1000 order processed in Appendix III (A), the result of the sorting is illustrated in FIG. 6.

The order in which parts are matched to assembly descriptions, sorted and checked by the constraints is all controlled by the steps in the task blocks. The execution of the steps in the task blocks is started by an executive program 100 shown in FIG. 7. In the first step 101, certain program variables are cleared. By clearing these program variables, space in the working memory is cleared so that a new bin tree may be built. Also, the trace memory is cleared in order to record a new trace.

In step 102 an initial bin is created and is given the name "UNASSIGNED". The name "UNASSIGNED" is given denoting that the particular product being configured is not yet known since the order has not yet been received by the knowledge system.

It should be noted that the knowledge base interpreter 13 is always working on a particular bin at any given time. The name of this particular bin is stored in a global variable called "CURRENT.BIN". In step 103 this global variable "CURRENT.BIN" is set to the value "UNASSIGNED" to record that the configuration process is starting in the "UNASSIGNED" bin. In step 104 "UNASSIGNED" task block is found, and it is excecuted in step 105 so that the rest of the configuration process is controlled solely by task blocks.

The task blocks are executed by calling an EXECUTE subroutine generally designated 110 in FIG. 8. In general terms, the EXECUTE subroutine sequentially executes all of the commands in a specified task block. In the first step 111, a pointer (P1) is set to the position of the first command in the task block. In step 112 the command pointed to by the pointer (P1) is executed. In step 113 the pointer (P1) is advanced to that it either points to another command or is at the end of the task block. In step 114, the end of the task block is detected by testing whether the pointer is out of the range of the specified task block. If it is not, execution jumps to step 12 to execute the next command. Otherwise, the EXECUTE subroutine is finished and execution returns to the calling program.

Preferably, the task blocks are written in a well-known imperative programming language such as LISP described in the text P. Winston & V. Horn, *LISP*, Addison-Wesley Publishing Co., Reading, Mass. (1981). The "UNASSIGNED" task block is as follows:

```
(DEFTASKBLOCK UNASSIGNED.TB UNASSIGNED ( )
(INPUT.ORDER)
(DETERMINE '(TODAYS.DATE ORDERED.PARTS ORDERED.PRODUCT.LINE))
(IF CHECKING.ORDER THEN
(CONFIGURE (FETCH 'ORDERED.PRODUCT.LINE)
(FIND 'ALL 'CCS))
(CHECK 'EMPTY.BIN))
(DETERMINE '(FINAL.PARTS))
(OUTPUT.ORDER)
)
```

Translated into English, the UNASSIGNED task block above first inputs the order of parts. Then it determines the current date, the ordered parts or order lines of the order, and the product line corresponding to the ordered parts. It is presumed that the knowledge system is currently checking the order. Thus, the task block for the ordered product line is fetched from the knowledge base. This task block is, for example, the MINICOMPUTER task block in Appendix IVB. Then a FIND operation is performed to obtain a list of all the parts in the order lines, and the CONFIGURE operation is performed to create the initial bin in the bin tree, to transfer all the parts in the order lines into the initial bin, and to temporarily transfer execution to the MINICOMPUTER task block. When execution returns, the parts are configured in the bins as shown in the bin tree 90 of FIG. 6. A final set of EMPTY.BIN constraints are applied to ensure that all of the order lines in the order have been properly configured. If so, the FINAL.-PARTS are determined and a production request is generated by the OUTPUT.ORDER statement.

The UNASSIGNED task block as well as the task blocks in the knowledge base include a mixture of LISP code written by the knowledge engineer, built-in functions supplied by the LISP compiler, and special functions or subroutines comprising the built-in control procedure of the knowledge base interpreter 13 (FIG. 1). The primary built-in subroutines include the EXECUTE subroutine already described in conjunction with FIG. 8, a FIND subroutine shown in FIG. 9, a CONFIGURE subroutine shown in FIG. 10, a CHECK subroutine shown in FIG. 11, an EXPAND subroutine shown in FIG. 12, and a DETERMINE subroutine shown in FIG. 13.

Figures 9, 10:
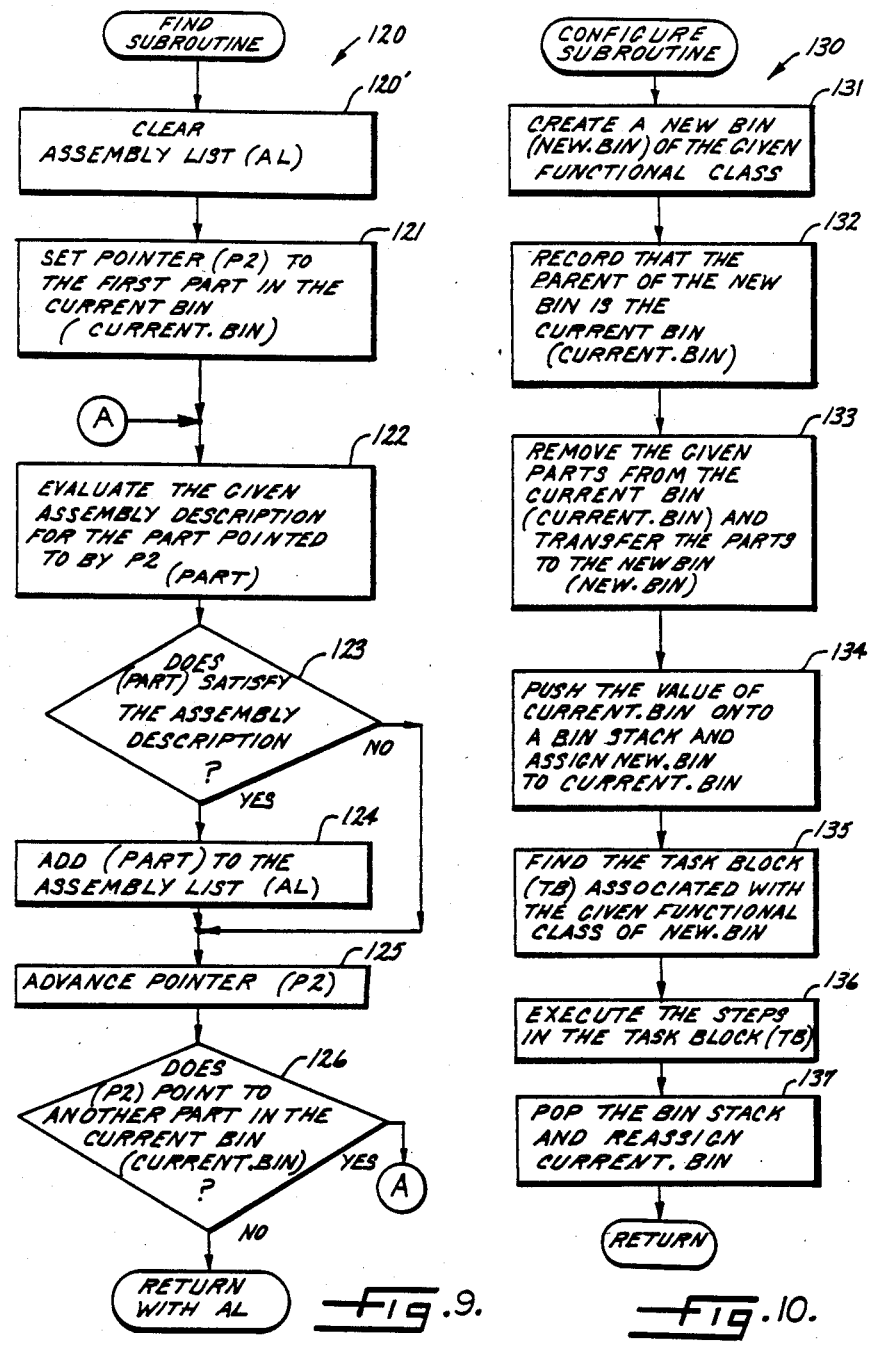
FIG. 9 is a flowchart of a FIND subroutine for obtaining a list of parts included in a specified bin which match or satisfy a specified assembly description.
FIG. 10 is a flowchart of a CONFIGURE subroutine for creating a new bin of a specified functional class, transferring a specified list of parts from a specified current bin to the new bin, and temporarily passing execution to the task block associated with the functional class of the new bin.

The basic matching operation is performed by the FIND subroutine of the FIG. 9. The FIND subroutine generally designated 120 obtains a list of parts included in a specified bin which match or satisfy a specified assembly description. An assembly description is a predicate or Boolean function defining the desired set of parts in terms of a conjunction of part names, part types, or other functions which describe the desired parts. A collection of parts satisfies an assembly description when the parts fit that description. In other words, the assembly description serves as a template to select the desired parts.

In the first step 120' of the FIND subroutine, an assembly list (AL) is cleared in order that it may receive the names of the desired parts once the desired parts are found. In step 121 a pointer (P2) is set to the first part in the specified bin. In particular, the FIND subroutine 120 in FIG. 9 is used to find parts in the current bin to transfer them to offspring bins of the current bin. Hence, in step 121 the specified bin is the value of the global variable "CURRENT.BIN". In step 122, the specified assembly description is evaluated for the part in the current bin pointed to by the pointer (P2). The assembly description, in other words, is a Boolean function of the part pointed to by the pointer (P2). In step 123, the Boolean value of the assembly description indicates whether the part satisfies the assembly description. If the part satisfies the assembly description, then the part is one of the desired parts so that in step 124 the part is added to the assembly list (AL). If the part does not satisfy the assembly description, it is not added to the assembly list (AL). Then in step 125 the pointer (P2) is advanced so that it may point to another part in the current bin. The pointer (P2) might not, however, point to another part in the current bin since all of the parts in the current bin might have been tested. In step 126 the pointer (P2) is tested to determine whether it is out of the range of the current bin. If it is not out of range, then the pointer (P2) does point to another part in the current bin and execution jumps back to step 122. Otherwise, all of the parts in the current bin have been checked and the assembly list (AL) will contain the names of all of the parts that satisfy the specified assembly description. Hence, execution returns to the calling task block.

In order to perform the sorting operation described above, a CONFIGURE operation is performed to create a new bin of a specified functional class, to transfer the matched parts from the current bin to the new bin, and to temporarily pass execution to the task block associated with the functional class of the new bin. A flowchart for the CONFIGURE subroutine generally designated 130 is shown in FIG. 10. In step 131 a new bin of the specified functional class is created by allocating space in the working configuration memory 15 (FIG. 1) for the new bin. Space is allocated, for example, for instances of all the bin variables declared for the bin and the bin variable instances are marked undetermined to indicate that they do not yet have values. Next, in step 132, it is asserted that the parent of the new bin is the current bin specified by the global variable "CURRENT.BIN". In step 133, the specified parts are removed from the current bin and transferred to the new bin. In step 134 the value of the global variable CURRENT.BIN is pushed onto a bin stack and the global variable is assigned the name of the new bin. This is done in anticipation of interrupting the processing for the current bin in order to process the new bin. Specifically, in step 135, the task block associated with the given functional class of the new bin is found. In step 138 the steps in this task block are executed. Upon completion of executing the steps in this task block, in step 137 the bin stack is popped and the popped value is reassigned to the global variable CURRENT.BIN to continue execution of the task block for the current bin. Execution then returns to the task block which called the CONFIGURE subroutine 130.

The fact that a stack was used in the CONFIGURE subroutine 130 suggests that the CONFIGURE subroutine is advantageously used in a recursive fashion. In general, each task block associated with an intermediate node in the functional class hierarchy will have CONFIGURE operations in its associated task block for creating offspring bins preceded by a FIND operation to specify the parts to transfer to the offspring bins. This ensures that the parts initially placed into the root bin or added by product expansions become sorted through the bin tree to the terminal or leaf bins. Once the parts have filtered down to the terminal leaf bins, the most basic and elementary constraints may be applied to determine, for example, if specified parts or a specified number of parts are included in the terminal bins. To apply these constraints, a CHECK operation is provided to apply a specified subset of the constraints applicable to the functional class of the current bin.

Shown in FIG. 11 is a flowchart of the check subroutine 140. In the first step 141 the knowledge base is searched to obtain a list (CL) of the constraints applicable to the functional class of the current bin and which satisfy the given constraint description. Then, in step 142 a pointer (P3) is set to the first constraint in the constraint list (CL). Next, in step 143 the condition portion of the constraint in the list pointed to by the pointer (P3) is evaluated. The condition of the constraint is typically a Boolean function of the conditions of the various parts in the bin. If the condition of the constraint is satisfied, as determined by testing whether the Boolean value of the conditions is true, then in step 145, the action specified by the constraint is executed. Otherwise, the action specified by the constraint is not executed. In step 146 the pointer (P3) is advanced in order to point to the next constraint in the constraint list (CL). The pointer (P3) must be checked, however, in step 147 to determine whether all of the constraints in the list have been applied. If the pointer (P3) is still within the range of the constraint list (CL), then execution jumps to step 143 to apply the next constraint. Otherwise, the CHECK subroutine 140 is finished and execution returns to the current task block.

It should be noted that during certain steps in the sorting or configuring process, certain kits or groups of parts must be expanded into their component parts. An EXPAND operation is provided for expanding the parts in the current bin into their component parts by applying predefined expansion rules associated with the current bin. An EXPAND subroutine generally designated 150 is shown in FIG. 12. In the first step 151, a list (EXL) of all of the expansion rules that apply to the parts in the current bin are obtained from the knowledge base. Next, in step 152 a pointer (P4) is set to the first expansion rule (EX) in the expansion rule list (EXL). Then in step 153 the particular expansion rule (EX) pointed to by the pointer (P4) is obtained. The expansion rule (EX) is checked in step 154 to determine whether it has already been marked expanded. It should be noted that a particular expansion rule may have already been applied since a particular expansion rule may apply to more than one bin. If the expansion rule has not already been applied, then in step 154' the expansion is applied by adding to the current bin the parts included in the composing assembly description of the expansion rule. The composing assembly description is a list of the parts included in the respective kit for the respective expansion rule. Once the expansion rule has been applied, it is marked expanded in step 155. Then, in step 156 the pointer (P4) is advanced in order to point to the next expansion rule in the list. However, in step 157 the value of the pointer (P4) must be checked to determine whether it does point to another expansion rule in the list, or whether all of the expansion rules in the list have been applied. If the point (P4) points to another expansion rule in the list, then execution jumps to step 153. Otherwise, execution returns to the current task block.

Figure 13:
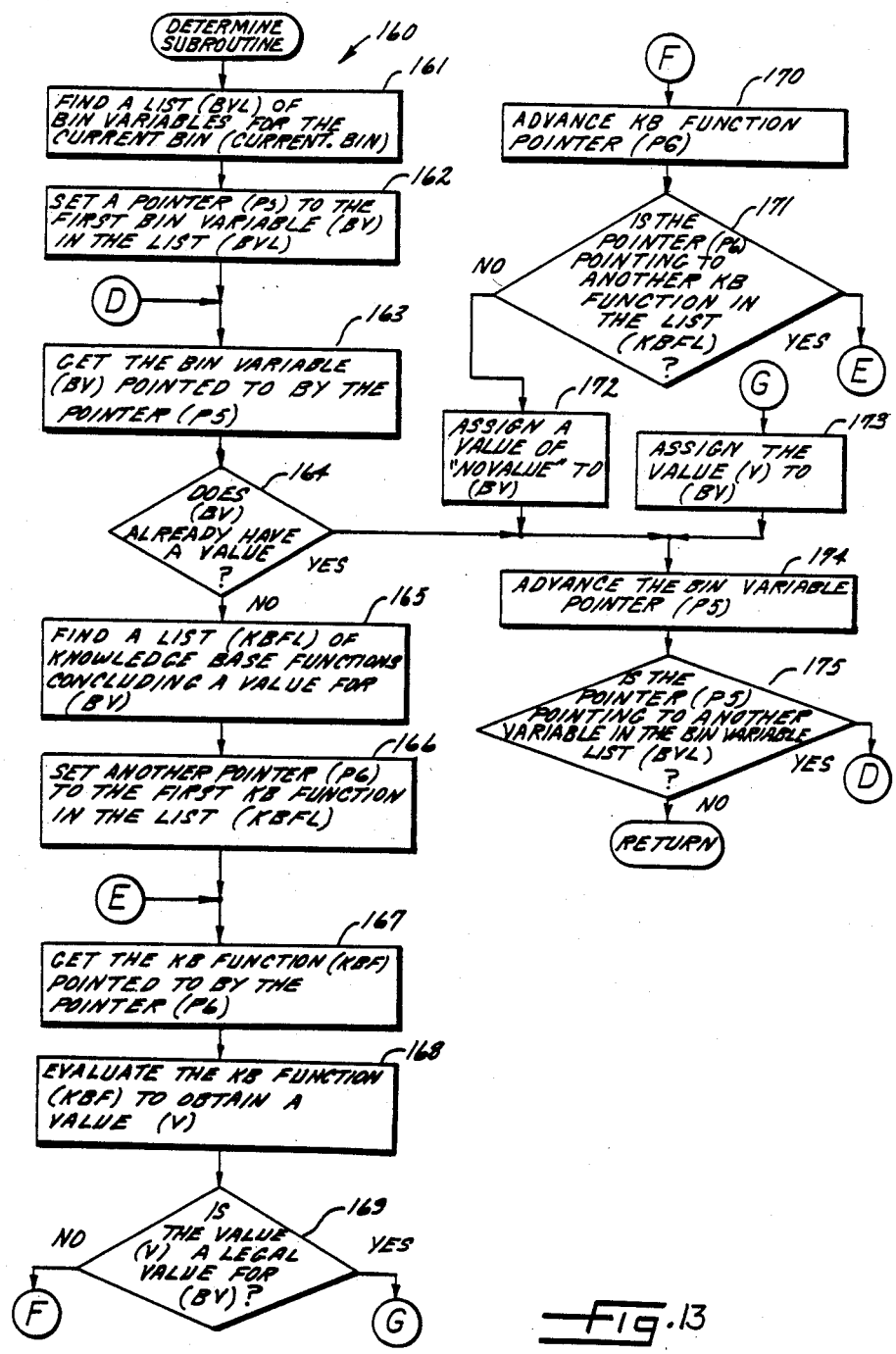
FIG. 13 is a flowchart of a DETERMINE subroutine for determining values for bin variables associated with the current bin by applying knowledge base functions associated with the current bin.

During the execution of task blocks and the application of constraints, it is in many cases desirable to condition the execution of a particular task block step upon the conditions or attributes of the parts included in the bin for the task block. As noted above, bin variables are provided for this purpose and the bin variables may also be included in the condition portions of constraints. A DETERMINE operation is provided for specifying when to determine values for the bin variable instances associated with the current bin by applying the knowledge base functions associated with the current bin. Shown in FIG. 13 is a flowchart of a DETERMINE subroutine generally designated 160. In the first step 161 a list (BVL) of bin variables for the current bin are obtained from the knowledge base. Next, in step 162 a pointer (P5) is set to the first bin variable in the bin variable list (BVL). Then in step 163, the particular bin variable (BV) pointed to by the pointer (P5) is obtained. Before determining a value for the bin variable instance (BV), in step 164 the bin variable instance is inspected to determine whether it already has a value. If not, then in step 165 a list (KBFL) of knowledge base functions concluding a value for the bin variable (BV) is obtained from the knowledge base. Then in step 166 another pointer (P6) is set to the first knowledge base function in the function list (KBFL). In step 167 the particular knowledge base function (KBF) pointed to by the pointer (P6) is obtained. This knowledge base function (KBF) is evaluated in step 168 to obtain a respective value (V). This respective value (V) might not, however, be a legal value for the particular bin variable (BV). In step 169 the declared legal values for the particular bin variable (BV) are obtained from the knowledge base and compared to the particular value (V) to determine whether the value is a legal value for the bin variable (BV). If not, then in step 70 the knowledge base function pointer (P6) is advanced. In step 171 the pointer is compared to the end of the range for the function list (KBFL) to determine whether the pointer (P6) is pointing to another knowledge base function. If so, then execution may jump back to step 167 in an attempt to apply this other knowledge base function. Otherwise, there are no more knowledge base functions to try so that in step 172, a value of "NO VALUE" is assigned to the bin.variable instance (BV).

If in step 169 the value (V) was a legal value for the particular bin variable (BV), then in step 173 the particular value (V) is assigned to the bin variable instance (BV).

Now that a value for the particular bin variable instance (BV) has been determined, the bin variable pointer may be advanced in step 174 in an attempt to point to the next bin variable in the bin variable list (BVL). In step 175 the pointer (P5) is first compared to the end of the bin variables list to determine whether it is pointing to another bin variable. If so, execution jumps back to step 163 to determine the value for the next bin variable instance. Otherwise, all of the bin variables in the bin variable list (BVL) have values and execution may return to the current task block.

The primary operations of EXECUTE, FIND, CONFIGURE, CHECK, EXPAND, and DETERMINE are used in the task blocks to define a specific configuration strategy suited for the particular product. In general, however, it can be said that the task blocks for the interior bins have similar characteristics and also the task blocks for the leaf or terminal bins have similar characteristics. A generalized task block for an interior bin is shown below:

```
(DEFTASKBLOCK INTERIOR.TB INTERIOR ( )
    (CONFIGURE 'OFFSPRING1 (FIND 'ALL 'CCS
    (IMPLEMENTS OFFSPRING1)))
    (CONFIGURE 'OFFSPRING2 (FIND 'ALL 'CCS
    ('IMPLEMENTS OFFSPRING2)))
    .
    .
    .
    (CHECK 'REQUIREMENTS)
    (EXPAND* '(KITS))
)
```

Translated into English, execution of the interior bin task block first finds all of the components in the interior bin which implements the first offspring function. Then a configure operation creates a bin corresponding to the first offspring function and the parts that are found are transferred to this offspring bin. Execution is then temporarily transferred to the offspring bin. Upon returning from the task block of the first offspring, the components implementing a second offspring function are found and another configuration operation is performed to create a second offspring bin. The parts that are found are transferred to the second offspring bin and execution is passed to the task block for the second offspring function. Upon returning, the parts for any other offspring functions are found and offspring bins are configured. Once all of the offspring bins have been configured, the requirements or constraints for the interior bin are applied. Finally, any kits that may have been added by the application of modification constraints are expanded. The EXPAND* operation is similar to the EXPAND operation except that it specifies a type of part to be expanded (such as any kit) so that the particular kits to be expanded need not be specified.

A generalized task block for leaf bins is shown below:

```
(DEFTASKBLOCK LEAF.TB LEAF( )
 (CHECK 'CONTENTS)
 (EXPAND* '(KITS))
 (CHECK 'REQUIREMENTS)
)
```

First, modification constraints are applied in order to ensure that the leaf bin will not be empty. Then, specified kits in the leaf bin are expanded into their component elemental parts. Finally, warning and modification constraints are applied to check that the requirements for the leaf task block have been satisfied.

Once the knowledge engineer encodes a specific configuration strategy into the knowledge base, a test configuration can be run using a "TRACE" option so that the user interface and explanation facility (19 FIG. 1) generates a comprehensible translation of the configuration strategy. For the MINI-1000 minicomputer, for example, the trace in the typescript of Appendix III (A) explains in detail the specific configuration strategy that is followed. This explanation includes the specific task block statements that are executed and any action taken upon application of the constraints. The configuration strategy for the MINI-1000 minicomputer order in Appendix II (A) first looks at the set of ordered parts to determine that the product line is a MINI-1000 minicomputer. These parts are dumped into the root bin MINI(1) in FIG. 6. Then the parts implementing the MAIN-FRAME function are found and the MAIN-FRAME(1) bin is created and these parts are transferred to the MAIN-FRAME(1) bin. In recursive fashion, the parts in the MAIN-FRAME(1) bin are found which implement the CPU function. A CPU(1) bin is created and these parts are transferred to the CPU(1) bin. The requirements for the CPU(1) bin are checked and it is found that a required CPU board is missing. The knowledge system 10 asks the user for permission to add one CPU-1000 circuit board, thereby completing the CPU(1) bin. Execution returns to the MAIN-FRAME task block. The components implementing the MEMORY function are found and a new MEMORY(1) bin is created to receive these parts. In recursive fashion, the parts in the MEMORY(1) bin implementing the RAM function are found and a new RAM(1) is created to receive these parts. The contents of the RAM(1) bin are checked to ensure that at least one RAM-1000 circuit board is included. Execution then returns to the MEMORY task block which finds the parts implementing the ROM function and creates a new ROM(1) bin to receive these parts. The contents of the ROM(1) bin are checked to ensure that at least one ROM-1000 circuit board is included. Then, execution returns to the MEMORY task block which checks the overall requirements for the MEMORY function. In particular, a MEMORY.CT1 constraint is applied which counts the total number of RAM and ROM boards to ensure that the total number does not exceed seven. When this constraint is applied, it is found that the total number does not exceed seven. Execution then returns to the MAIN-FRAME task block. Next, the MAIN-FRAME task block finds all of the parts in the MAIN-FRAME(1) bin which implement the I/O function, creates a new I/O(1) bin and transfers these parts to the new bin. Execution passes to the I/O task block which finds all of the components in the I/O(1) bin implementing the TERMINAL function, and a new TERMINAL(1) bin is created to receive these parts. Upon execution of the TERMINAL task block, the requirements or constraints for the TERMINAL function are applied. It is found that there is at least one terminal in the TERMINAL(1) bin. It is also found that the number of terminals does not exceed four. Execution then returns to the I/O task block.

The I/O task block next configures the DISC function before it configures the INTERFACE function since the interface constraints need to know how may disk drives have been ordered. The DISC function is configured by first finding the components in the I/O(1) bin which implement the DISC function, and creating a new DISC(1) bin to receive these components. Execution is passed to the DISC task block which first checks the requirements for the DISC function. No constraints are found associated with the DISC function. Execution returns to the I/O task block. Since the INTERFACE task block needs to known how may DISC units are included in the order, a bin variable called "IF-CARDS.NEEDED" is defined for the I/O function. A DETERMINE operation is performed to determine the minimum number of interface cards required for the number of terminals and disk drives in the order. After it is determined that there are four terminals and three disk drives so that four interface cards are required, the components in the I/O(1) bin implementing the INTERFACE function are found and a new INTERFACE(1) bin is created to receive these components. Execution then passes to the INTERFACE task block.

The requirements for the INTERFACE function are checked and it is found that no interface cards were ordered. A modification constraint IF.REQ.CT1 is applied which tells the user that the minimum number of interface cards have not been ordered, and ask permission to add four IF-1000 interface cards. These cards are added after permission is received from the user. Execution then returns to the I/O task block which in turn passes execution back to the MAIN-FRAME task block. In the MAIN-FRAME task block, all of the components in the MAIN-FRAME(1) bin are found which implement the CRAD-CAGE function. A new CARD-CAGE(1) is created to receive these components. Execution is passed to the CARD-CAGE task block which checks the CARD-CAGE requirements. The constraint AT-MOST-ONE.CT ensures that no more than one card cage was ordered. The constraint NO-PARTS.CT checks to ensure that at least one card cage was ordered and finds that a card cage was not ordered, and asks permission from the user to add a card cage. After receiving permission from the user, one CAGE-1000 is added to the order. Execution then returns to the MAIN-FRAME task block.

The MAIN-FRAME task block checks the requirements for the MAIN-FRAME function. The MAIN-FRAME.CT1 constraint is applied which ensures that the total number of ROM cards, RAM cards, and IF cards plus one CPU card is no greater than sixteen, so that no action need be taken. Execution then returns to the MINI task block.

In the MINI task block, all of the components in the MINI(1) bin are found that implement the POWER-SUPPLY function, and a new POWER-SUPPLY(1) is created to receive these components. Execution is transferred to the POWER-SUPPLY task block. The initial contents of the POWER-SUPPLY(1) bin are first checked to determine the number of power supplies included in the order. It is found that no power supplies were ordered. Next, the requirements for the POWER-SUPPLY function are checked and a set of modification constraints are applied in order to determine the particular power supply to be added to the order. Thus, several power supply modification constraints are applied which use a bin variable called "POWER.NEEDED".

It should be noted that the task blocks for the minicomputer do not explicity have a DETERMINE operation to determine the value of the "POWER.-NEEDED" bin variable. A DETERMINE operation is implicity performed when a constraint is applied that references a bin variable. Upon determining the value of the bin variable "POWER.NEEDED" it is found that the required power to operate the minicomputer is 8.3 amperes. The application of the power supply modification constraints determines that a 10 ampere power supply is needed and one SUPPLY-10 is automatically added to the order. Execution then returns to the MINI task block which in turn passes execution back to the unassigned task block which is listed above in the specification. The final contents of the UNASSIGNED bin are checked to ensure that all of the original components have been considered during the configuration of the minicomputer. It is possible, for example, that some superfluous parts were included in the order, and at this point in the UNASSIGNED task block the superfluous components would be left in the UNASSIGNED bin. It is found, however, that the UNASSIGNED bin is empty, so that no superfluous components were ordered. Next, the list of final parts are determined for the production request. Finally, the final parts are transmitted to the user.

Inspection of the constraints, bin variable declarations and knowledge base functions for the M1234 computer and the MINI-1000 minicomputer knowledge bases in Appendices II (D) and IV (D) reveal that there are many built-in functions available to the knowledge engineer which simplify the knowledge engineer's task of creating the task blocks, constraints, and knowledge base functions. Moreover, the knowledge base is organized so that the knowledge engineer has ready access to the conditions of the parts upon which the constraints and knowledge base functions are responsive and can manipulate the working configuration in any desired fashion.

An operation (ASSIGN parts bin) moves the parts specified by a list of PRODUCT.IDs from the current bin into the specified bin.

If the operation (BVSET binvar newvalue noerror) assigns (newvalue) as the value of (binvar) after checking the (newvalue) correspondence to the format indicated by the LEGAL.VALUE field of the (binvar). The value (newvalue) is typically computed by a KBFUNCTION defined by the knowledge engineer. If (noerror) is true, the checking that the value (binvar) matches the format prescribed in its LEGAL.VALUES field is not performed.

The function (FETCH binvar noerror) returns the value of (binvar) if (binvar) already has a value. If (binvar) does not have a value, FETCH determines that value using the KBFUNCTIONS specified on its HOW.TO.DETERMINE field. If (noerror) is false, the FETCH function checks to make sure that the value of the (binvar) matches the format prescribed in its LEGAL.VALUE field.

The function (MEMBER element list) tests whether (element) is a member of (list). The function MEMBER returns true (T) if the element is a member of the list, and false (NIL) if not.

The function (FIND number bins description) searches the CONTENTS of (bins) for a certain (number) of parts (PRODUCT.IDs) that satisfy the (description). The FIND function returns a list of PRODUCT.IDs. The (number) of parts defined may be an integer, the word for an integer between ZERO and TEN, or the word ALL; any words must be quoted. The set of (bins) to search are specified by the following set of key words:

| CCS | The current bin; |
| --- | --- |
| SCS | The immediate parent bin; |
| CSCS | The current and immediate parent bins; |
| ACS | The current and all ancestor bins; or |
| ICS | The current and all decendant bins. |

The (description) is a Boolean expression made up of one or more logical clauses and connectors AND and OR. The clause (IMPLEMENT<FUNCTION.-CLASS>) succeeds if the part has an IMPLEMENTS.FN that COMPOSES the <FUNCTION.CLASS> specified. The clause (ISA<-PART>) succeeds if the part matches this <PART> name. The clause (ISA.SPEC<FUNCTION.-CLASS>) succeeds if the part is a PROD.GEN of the <FUNCTION.CLASS> specified.

Many of the built-in functions recognized by the knowledge base interpreter 13 of the knowledge system 10 (FIG. 1) have particular utility in conjunction with constraints. Constraints always apply to a specified set of parts. The parts are specified by a list of BIN.-TYPES, which are the FUNCTION.CLASS entries in the functional hierarchy that the constraint applies to. The constraint also includes a STATEMENT of conditions to test against the parts in those bins. The STATEMENTs often test relationships between values of different bin variables, which must be declared in the BIN.VARS.REQUIRED field of the constraint declaration. Also, a list of CHECK.KEYWORDS may be specified to control when certain constraints are applied. These keywords are used by the CHECK operations in the task block steps to select relevant subsets of constraints to apply at different times in a task block.

The knowledge system provides a number of important specializations of the CONSTRAINT knowledge base type, which are further described below. All product type and specific constraints are defined in terms of these specializations. The system also considers product expansions as a particular kind of CONSTRAINT since they add parts to a bin if certain conditions, such as whether a particular product was ordered, are met. In general, the types of constraints include constraints on specific parts, warning constraints, and modification constraints.

There are five types of constraints on specific parts. The type EXPANSION.CT expands a composite part into its component parts if certain conditions are met. The type ALWAYS.EXPAND.CT unconditionally expands a composite part into its component parts. The type FULLY.EXPAND.CT expands a composite part into its component parts, and then expands all of those parts that are expandable. The type EFFECTIVELY.CT allows the knowledge engineer to specify a date after which the specified part is available for the specified product line. The type PHASE-OUT.CT allows the knowledge engineer to specify a date after which the specified part is no longer available for the specified product line.

There are two types of warning constraints. The type WARN-ON-SUCCESS.CT warns the user if the conditions in the STATEMENT for the constraint succeed. The type WARN-ON-FAILURE.CT warns the user if the conditions in the STATEMENT fail.

There are two types of modification constraints. The type MODIFY-ON-SUCCESS.CT outputs a warning message and modifies the contents of the current bin if the conditions in the STATEMENT succeed. The type MODIFY-ON-FAILURE.CT outputs a warning message and modifies the contents of the current bin if the conditions in the STATEMENT fail.

A constraint STATEMENT expresses a set of conditions that the order must meet to be valid. The STATEMENT of a constraint is a Boolean expression composed of "clauses", separated by the usual logical connectives AND and OR. Individual clauses (or the entire STATEMENT expression) may be negated by using the form (NOT<EXPRESSION>).

In general the STATEMENT clauses test various relationships between expressions of bin variables. The expressions may include the typical numerical relationships <, >, =, >=, <=, and <> (not equal to).

Clauses can also evaluate arbitrary predicates written by the knowledge engineer as KBFUNCTIONs. The system provides several predefined functions such as COUNT.PARTS, ORDERED?, and SYSTEM that enhance the transparency of the constraint statements. Moreover, the system can evaluate clauses expressed in a limited, English-like format. These expressions test whether a specified quantity IS (or IS NOT) ZERO, NULL, ATOMIC, NUMERIC, REAL, or a STRING.

Constraint STATEMENTs typically reference the values of bin variables. The bin variables may be referenced directly by the FETCH function in a STATEMENT. Alternatively, the system can directly interpret references to bin variables when the bin variables are specifically declared in the BIN.VARS.REQUIRED field of the constraint declaration.

The function (COUNT.PARTS part search) returns the number of (parts) in the current bin. If (search) is true (T), the function COUNT.PARTS will search the bin tree below and including the current bin returning the total number of (parts) in these bins.

The function (ORDERED? parts search) returns the value true (T) if there is at least one instance of any of the (parts) in the current bin. If the value of (search) is true (T), ORDERED? will search the bin tree below (and including) the current bin, returning true (T) if it finds instances of (parts) in these bins. The function (SYSTEM system-name1 system-name2 . . . ) tests whether the system type or product model of the order is one of the (system-names) indicated in the argument list. Each (system-name) should be a FUNCTION.CLASS having a PRODUCT.GEN declaration including SYSTEM.

The function (COUNT list) returns the number of elements in the (list).

For constraints that modify the contents of the current bin, the system provides a special form for specifying a list of parts to add to, delete from, or replace the contents of a bin. This special form is called a PRODUCT.QTY or "product quantity". PRODUCT.QTYs are specified in the TO field of the different EXPANSION.CTs, and they are computed by the ADD-PARTS, DEL-PARTS, and SET-PARTS fields of the MODIFY-ON-SUCCESS.CTs and MODIFY-ON-FAILURE.CTs. Special functions described further below can be used to compute these PRODUCT.QTY description for these constraints.

A PRODUCT.QTY consists of a list of lists where each sublist specifies a quantity and a part type.

The function (FIND* number bins description) searches a set of (bins) for a certain (number) of parts that satisfy the (description). FIND* returns a PRODUCT.QTY that describes the quantities of the parts found.

The function (CHOOSE one parts) is given a specified PRODUCT.QTY description of several different parts, and asks the user to select one part from (parts) and returns a PRODUCT.QTY describing a single <SELECTED-PART>.

As noted above, an expansion rule is a kind of constraint that applies to specific parts. Expansion rules are specified by EXPANSION.CT objects in the knowledge base. The FROM field of an EXPANSION.CT specifies the composite part to be expanded; the TO field specifies the list of component parts to add to the bin; the WHEN field specifies the conditions under which this expansion should occur; and the MESSAGE field specifies the messages that should be printed when the expansion succeeds or fails.

Modification constraints are defined in the knowledge base either as MODIFY-ON-SUCCESS.CT objects or a MODIFY-ON-FAILURE.CT objects. A warning message is given to the user and the contents of the current bin are modified if the conditions in the STATEMENT field succeed or fail, respectively. The knowledge engineer may specify a MESSAGE that will warn the user that a modification must be made. The modifications are specified by providing values for one or more of the fields SET-PARTS, ADD-PARTS, and DEL-PARTS. If a list of parts is specified for the field SET-PARTS, the current bin is emptied and the list of parts (in the quantities specified) is placed in the bin. Then, if a list of parts is specified in the ADD-PARTS field, new parts are added to the bin in the quantities specified. If a list of parts is provided in the DEL-PARTS field, existing parts are deleted from the bin in the quantities specified.

In the knowledge base, the BIN.VAR declarations must include a LEGAL.VALUE field indicating the legal value for the bin variable (e.g., integer, string, etc.), a HOW.TO.DETERMINE field including a list of KBFUNCTIONs that can be used to determine the value of the bin variable, and a BIN.TYPES field including the bin types or function classes with which the variable is associated. It should be noted that values of BIN.VAR instances can be referenced by constraints applied by task blocks that are lower in the bin tree than where the BIN.VAR instance is created. Thus, the BIN.TYPES should associate the bin variable with bins high enough in the bin tree so that the bin variables can be referenced by all of the appropriate contraints.

The system provides two built-in KBFUNCTIONS that can be used to ask the user a question to determine the value of specified BIN.VARs. The (ASK.QUESTION) function uses the DESCR field of the BIN.VAR to form the question "What is <DESCR>?" The ASK.QUESTION function uses the optional help field of the BIN.VAR declaration to provide help to the user when the user types a question mark (?) in response to the question. Also, the response to the question is checked against the LEGAL.VALUES expression of the BIN.VAR declaration. The second function (ASK-.BOOLEAN.QUESTION) uses the DESCR field of the BIN.VAR declaration to form the question "Is it the case that <DESCR>?" The ASK-.BOOLEAN.QUESTION function accepts only responses of YES or NO and prints, "Answer YES or NO please" if any other response is given.

It should be noted that the knowledge base itself may be divided into sections so that the sections my be identified and referenced by the task blocks and constraints. The name for each portion of the knowledge base is preferably composed of a knowledge base prefix and a unique suffix identifying the particular portion or file of the knowlege base. In the preferred embodiment of Appendix II (A)–(E) the suffix FH identifies the file containing the functional hierarchy and the product line task blocks. The suffix NCT identifies the file containing the product line constraints, the bin variables, and the knowledge base functions. The suffix BX contains product line descriptions. The suffix AK identifies the file containing product line packages. The suffix FT identifies the file containing product line features. The suffix KT identifies the product line kits. The suffix KV identifies the file containing the product line kit versions. The suffix XT identifies a file containing miscellaneous parts. The suffix EX identifies the file containing product expansions. A knowledge base file with the suffix MODS is used to record all modifications or changes made to the knowledge base since the last modification by the knowledge engineer using the knowledge base maintenance facility 21 (FIG. 1).

The knowledge base maintenance facility 21 preferably has a number of commands used by the knowledge engineer to create, maintain, and augment the knowledge base 14. These commands include, for example, eight commands for knowledge base data and control functions, three commands for knowledge base editing functions, and four commands for knowledge base file maintenance.

The eight knowledge base data and control commands include SELECT, PP, CHANGES, CONTENTS, CONTROL, IGNORE.CHANGES, REMEMBER.CHANGES, and LIST.KBSETS.

The command SELECT selects a knowledge base to be modified and loads the knowledge base into the host computer system so that it may be further manipulated by the knowledge base maintenance facility 21.

The command PP displays the status of the current knowledge base, including whether changes are being recorded, whether the changes will be automatically saved, how many modifications have been made since the last time the knowledge base was saved, (i.e., written back from the working memory of the knowledge base maintenance facility 21 to the more permanent memory from which the knowledge base was loaded), and how many objects are currently in the current knowledge base.

The CHANGES command displays the modifications made to the knowledge base since the most recent migration, (see MIGRATE below) and indicates which objects have been added, changed, or deleted from the knowledge base.

The command CONTENTS displays the names of all of the objects in the current knowledge base.

The command CONTROL controls whether the system automatically saves modifications after a certain number of additions, edits, and deletions have been made to the current knowledge base.

The command IGNORE.CHANGES tells the knowledge base maintenance facility 21 to ignore any subsequent additions, modifications, or deletions.

The command REMEMBER.CHANGES turns off the effect of a previous IGNORE.CHANGES command so that subsequent changes will be recorded.

A command LIST.KBSETS displays the contents of specified main knowledge base sets after asking the user to specify the names of the sets.

The three knowledge base editing commands include ADD, EDIT, and DELETE. The command ADD adds new objects to the current knowledge base and prompts the knowledge engineer for the knowledge base type and the name of the new knowledge base object. The command EDIT modifies existing objects in the current knowledge base and prompts for the name of the knowledge base object. The command DELETE removes objects from the current knowledge base and prompts for the name of an existing knowledge base object.

The four knowledge base file maintenance commands include SAVE, MIGRATE, BUILD, and CREATE. The command SAVE saves the copy of the current knowledge base changes in a modification file. The command MIGRATE distributes the current knowledge base modification into the main knowledge base files and writes out a new, empty copy of the modifications file. The command BUILD saves a copy of the current executable system on a file and prompts the knowledge engineer for the name of the file. The command CREATE creates a new knowledge base for a new product line, and automatically prompts for a knowledge base prefix to identify the new product line.

The preferred embodiment of the user interface and explanation facility 19 has several commands to enable the user to obtain an explanation of the operation of the system 10. The user can select options for either obtaining an explanation as a configuration is being run, or after the completion of a configuration. As a configuration is being run, the user can select one or more of six options. The command SHOW-STEPS instructs the explanation facility 19 to print the task block steps as they are executed. The command SHOW-DETERMINATION causes the explanation facility to print the values of bin variables as they are determined. The command SHOW-EXPANSIONS tells the explanation facility to print a description of the expansions applied to parts in the order. The command SHOW-PARTS causes the explanation facillity to indicate when parts are added to or deleted from a bin's contents. The command SHOW-FULL-TRACE or ALL causes the explanation facility to indicate all of the events described above.

After an order has been configured and the complete trace has been recorded in the trace memory 17, the user may enter commands to access the trace memory 17. The command SHOW-TRACE causes the explanation facility to replay the trace of the most recent order. The command SHOW-VALUE causes the explanation facility to display the values of the bin variables used in the most recent order. The command SHOW-PART-HISTORY displays the parts history of the most recent order. The command FORGET causes the explanation facility to erase the trace memory 17 so that there is no longer a history of the prior consultation.

The knowledge system 10 has been described above primarily for checking and modifying the order lines in an order for a flexibly assembled product. It should be noted, however, that the modification constraints in part redesign the ordered product. The system 10 is equally useful as a design tool. The design procedure is illustrated by the typescript in Appendix III (B) wherein an order for a MINI-1000 minicomputer merely includes the model number of the desired product. The set of modification constraints in the knowledge base for the MINI-1000 product line (Appendices IV (A)–(D)) designs a minimal system consistent with the modification constraints including one CPU-1000 card, one RAM-1000 card, one ROM-1000 card, one TERMINAL-1000 computer terminal, one IF-1000 card, one CAGE-1000 card cage, and one SUPPLY-05 five ampere power supply.

To use the knowledge system 10 as shown in FIG. 1 as an expert design tool, the initial configuration 11 should include not only an initial set of parts but an initial set of values for bin variables to specify the desired parameters of the final configuration. The initial values for bin variables, for example, may specify the desired conditions and relations between the parts being assembled, and may also specify what modification constraints are to be applied as the product is being built in the working configuration memory 15.

It should also be noted that the knowledge engineer has great flexibility in defining the control procedure for the knowledge base interpreter 13. The knowledge engineer, for example, may write specialized knowledge base functions and task blocks to perform specialized configuration operations. The knowledge engineer may also modify the built-in control procedure of the knowledge base interpreter 13 to modify the control procedure in any desired fashion.

In view of the above, a knowledge system has been described for generalized representation and processing of hierarchical assemblies. The configuration strategies and actions are defined in task blocks which are completely separate from the functional hierarchy which describes the generic configuration of the product and the parts catalog which defines the individual elements available for configuration. Moreover, the constraints are completely separate from the task blocks, functional hierarchy, and parts catalog so that the definition of configuration constraints are clearly separated from configuration checking strategies and actions. The knowledge base interpreter has a built-in control procedure and built-in functions which enable the knowledge engineer to design and implement readily a desired configuration checking strategy. Since the imperative language of the task blocks clearly defines the configuration checking strategies and actions, a trace of a configuration operation is easily stored in a trace memory including both the actual steps executed and the resulting actions such as warnings or modifications to the configuration. Thus, an explanation facility can be provided which generates an intelligible and comprehensible explanation of the configuration based on the record in the trace memory.

APPENDICES I–V
TABLE OF CONTENTS

APPENDIX I
 CONSULTATION TYPESCRIPT FOR THE PROCESSING OF AN ORDER FOR AN M1234 COMPUTER
APPENDIX II (A)
 KNOWLEDGE BASE FOR M1234 COMPUTER FUNCTIONAL HIERARCHY
APPENDIX II (B)
 KNOWLEDGE BASE FOR M1234 COMPUTER TASK BLOCKS
APPENDIX II (C)
 KNOWLEDGE BASE FOR M1234 COMPUTER PARTS CATALOG
APPENDIX II (D)
 KNOWLEDGE BASE FOR M1234 COMPUTER CONSTRAINTS & BIN VARIABLES & KNOWLEDGE BASE FUNCTIONS
APPENDIX II (E)
 KNOWLEDGE BASE FOR M1234 COMPUTER EXPANSION RULES
APPENDIX III (A)
 MINICOMPUTER ORDER CHECKING TYPESCRIPT
APPENDIX III (B)
 MINICOMPUTER DESIGN TYPESCRIPT
APPENDIX IV (A)
 KNOWLEDGE BASE FOR MINICOMPUTER FUNCTIONAL HIERARCHY
APPENDIX IV (B)
 KNOWLEDGE BASE FOR MINICOMPUTER TASK BLOCKS
APPENDIX IV (C)
 KNOWLEDGE BASE FOR MINICOMPUTER PARTS CATALOG
APPENDIX IV (D)
 KNOWLEDGE BASE FOR MINICOMPUTER CONSTRAINTS & BIN VARIABLES & KNOWLEDGE BASE FUNCTIONS
APPENDIX V
 GLOSSARY

APPENDIX I

CONSULTATION TYPESCRIPT FOR THE
PROCESSING OF AN ORDER FOR
AN M1234 COMPUTER

```
The following is an example M1234 consultation with OCEAN.
Welcome to OCEAN
OCEAN executive> RUN
Processing new order...
Enter name of order file: T
```

```
Reading order information...
Order information> ORDER NUMBER: 6330-82-0261
Order information> BRANCH: 1815
Order information> METHOD: SURFACE
Order information>
Reading parts to check...
Order line> M1234
=>   1 M1234                    The M1234 product line
Order line> 1234-3003-0690
=>   1 1234-3003-0690           Class model for M1234 system
Order line> 1234-F010
=>   1 1234-F010                Firmware
Order line> 1234-F290
=>   1 1234-F290                Memory 2M, 2 way
Order line> 1234-F361
=>   1 1234-F361                Common trunk
Order line> 1234-F691
=>   1 1234-F691                BSLA
Order line> 1234-F680
=>   1 1234-F680                MFG.PLANT BYTE MULTIPLEX TRUNK
Order line>
Reading parts to be shipped F/S...
F/S order line>
Enter order processing options: ?
Please select from among CHECK, DON'T-CHECK, EDIT-ORDER,
QUIETLY, SHOW-COMPILATION, SHOW-CONSTRAINTS, SHOW-
DETERMINATION, SHOW-EXPANSIONS, SHOW-FULL-TRACE, SHOW-PARTS,
SHOW-STEPS, or other
Enter order processing options: SHOW-FULL-TRACE
    Adding the following parts: 1 M1234, 1 1234-3003-0690, 1
    1234-F010, 1   1234-F290, 1 1234-F361, 1 1234-F691 and 1
    1234-F680
Evaluating: (DETERMINE '(TODAYS.DATE ORDERED.PARTS
ORDERED.PRODUCT.LINE))  Today's date of original
components is set to: 15-Mar-84 The ordered set of parts
of original components is set to: M1234, 1234-3003-0690,
1234-F010, 1234-F290, 1234-F361, 1234-F691 and 1234-F680
The ordered product line of original components is set
to: M1234 product line components Evaluating: (IF CHECKING.ORDER
            THEN    COMMENT
                  (CONFIGURE (FETCH
                       'ORDERED.PRODUCT.LINE)
                        (FIND 'ALL 'CCS))
                  (CHECK 'EMPTY.BIN))

Configuring M1234 product line components
Initial parts are: 1 M1234, 1 1234-3003-0690, 1 1234-
F010, 1 1234-F290, 1 1234-F361, 1 1234-F691 and 1 1234-
F680
Evaluating: (BVSET 'SYSTEM.TYPE
(COMPUTE.M1234.SYSTEM.TYPE))
The M1234 system type of original components is set to:
M1234 system components
```

Evaluating: (CONFIGURE (FETCH 'SYSTEM.TYPE)
                      (FIND 'ALL 'CCS))

Configuring M1234 system components
    Initial parts are: 1 M1234, 1 1234-3003-0690, 1
    1234-F010, 1 1234-F290, 1 1234-F361, 1 1234-F691
    and 1 1234-F680

Evaluating: (EXPAND* '(BG BU.M12))
    Checking constraint: 1234-3003-0690.ECT.1
      (a ALWAYS.EXPAND.CT)
    Expanding 1234-3003-0690 to 1 1234-F262, 1 1234-
    F113, 1 1234-K915, 1 1234-K450, 1 1234-K917, 1
    1234-K416 and 1 1234-K941 in M1234 system
    components.
    Adding the following parts: 1 1234-F262, 1 1234-
    F113, 1 1234-K915, 1 1234-K450, 1 1234-K917, 1
    1234-K416 and 1 1234-K941

Evaluating: (DETERMINE '(CLASS.MODEL.EXPANSION
    BASIC.TO.PRICED
                                          MP.ORDER))
    The class model parts of M1234 system components is
    set to: 1 1234-F262, 1 1234-F113, 1 1234-K915, 1
    1234-K450, 1 1234-K917, 1 1234-K416 and 1 1234-K941
    The basic-to-priced parts of M1234 system
    components is set to: 1 1234-K416, 1 1234-K920, 2
    1234-K924, 1 1234-K940 and 1 1234-K941
    This is a multi-processing order of M1234 system
    components is set to: False Evaluating: [CONFIGURE 'MULTIPROCESSING
                (FIND 'ALL 'CCS '(IMPLEMENTS
                                      MULTIPROCESSING]

Configuring multi-processing components
      No initial parts

Evaluating: (CHECK 'CONTENTS)
        Checking CONTENTS constraints in multi-
          processing components
          No CONTENTS constraints were found.
        Evaluating: (EXPAND* '(AK FT KT))

Evaluating: (DETERMINE '(MP.PIBS))
        PIBS required for MP kits of M1234 system
          components is set to: 0

Evaluating: [CONFIGURE 'MAINFRAME (FIND 'ALL 'CCS
                                   '(IMPLEMENTS
                                          MAINFRAME]
    Configuring mainframe components
      Initial parts are: 1 1234-F010, 1 1234-F290, 1
    1234-F361, 1 1234-F691, 1 1234-F680, 1 1234-F262, 1
    1234-F113, 1 1234-K915, 1 1234-K450, 1 1234-K917
    and 1 1234-K941

Evaluating: [CONFIGURE 'PROCESSOR (FIND 'ALL 'CCS
                                 '(IMPLEMENTS
                                              PROCESSOR]

Configuring processor components
  Initial parts are: 1 1234-K941

Evaluating: (EXPAND* '(AK FT KT))

Evaluating: [CONFIGURE 'MEMORY (FIND 'ALL 'CCS
                              '(IMPLEMENTS
                                         MEMORY]
Configuring main memory components
  Initial parts are: 1 1234-F290 and 1 1234-F262
  Evaluating: (CHECK 'CONTENTS)
  Checking CONTENTS constraints in main memory
  components
    The following constraints apply: AT-MOST-
  ONE-MEMORY-FT.CT
  Checking constraint: AT-MOST-ONE-MEMORY-FT.CT
  (a MODIFY-ON-SUCCESS.CT)

The statement: ((SYSTEM M1234.SYSTEM)
                    AND
                    [COUNT (FIND 'ALL 'CCS
                           '(ISA FT]
                     > 1)
    succeeded with value T when applied to main
  memory components
    Removing the following parts: 1 1234-F262

Evaluating: (EXPAND* '(AK FT KT))
  Checking constraint: 1234-F290.ECT.1 (a
    ALWAYS.EXPAND.CT)
  Expanding 1234-F290 to 4 1234-K920, 2 1234-
  K921, 8 1234-K924 and 2 1234-K940 in main
  memory components.
  Adding the following parts: 4 1234-K920, 2
  1234-K921, 8 1234-K924 and 2 1234-K940

Evaluating: (DETERMINE '(MAIN-MEMORY.SUPPLIED
                          MEMORY.INTERLEAVING
                          MEMORY.PIBS))
  The main memory supplied with this order (in
  kb) of M1234 system components is set to: 2048
  The memory interleaving for this order of
  M1234 system components is set to: 2-WAY
  PIBS required for main memory w/o extra
  plenums of M1234 system components is set to:
  16

Evaluating: (CHECK 'INTERLEAVING)
  Checking INTERLEAVING constraints in main
  memory components
    The following constraints apply:  2-WAY-
    INTERLEAVING Checking constraint: 2-WAY-INTERLEAVING (a
  INTERLEAVING.CT)
  The statement: [(SYSTEM M1234.SYSTEM)
                AND
                (NOT (MEMORY.INTERLEAVING =
                    '2-WAY]
failed with value NIL when applied to main
  memory components
Evaluating: (CHECK 'MEMORY-CAPACITY)

Checking MEMORY-CAPACITY constraints in main
memory components
    No MEMORY-CAPACITY constraints were found.
Evaluating: (CHECK 'MEMORY-INCREMENT)
Checking MEMORY-INCREMENT constraints in main
memory components The following constraints apply: 1024-
INCREMENT
Checking constraint: 1024-INCREMENT (a
MEMORY-INCREMENT.CT)

The statement: ((SYSTEM M1234.SYSTEM)
               AND
               (NOT (INCREMENT MAIN-
                   MEMORY.SUPPLIED 1024)))
    failed with value NIL when applied to
    main memory components Evaluating: [CONFIGURE 'ISU (FIND 'ALL 'CCS
                        '(IMPLEMENTS ISU]

Configuring ISU memory components
   Initial parts are: 1 1234-F113, 1 1234-K915
    and 1 1234-K917

Evaluating: (CHECK 'CONTENTS)
Checking CONTENTS constraints in ISU memory
components
   The following constraints apply: AT-LEAST-
     ONE-FT.CT AT-MOST-ONE-FT.CT
Checking constraint: AT-LEAST-ONE-FT.CT (a
     WARN-ON-SUCCESS.CT)

The statement: ([COUNT (FIND 'ALL 'CCS '(ISA
    FT]
               IS ZERO)
   failed with value NIL when applied to ISU
    mmory components
 Checking constraint: AT-MOST-ONE-FT.CT (a
     MODIFY-ON-SUCCESS.CT)

The statement: ([COUNT (FIND 'ALL 'CCS
                  '(ISA FT]
                 > 1)
   failed with value NIL when applied to ISU
    memory components Evaluating: (EXPAND* '(AK FT KT))
Checking constraint: 1234-F113.ECT.1 (a
    ALWAYS.EXPAND.CT)

Expanding 1234-F113 to 2 1234-K940 and 3
      1234-K913 in ISU memory components.
  Adding the following parts: 2 1234-K940 and 3
      1234-K913

Evaluating: (DETERMINE '(ISU-
      MEMORY.SUPPLIED))
  The isu memory supplied with this order (in
      kb) of M1234
  system components is set to: 24

Evaluating: (CHECK 'REQUIREMENTS)
  Checking REQUIREMENTS constraints in ISU
      memory components
    The following constraints apply: MP.ISU.CT
  Checking constraint: MP.ISU.CT (a WARN-ON-
      SUCCESS.CT)

The statement: ((SYSTEM M1234.SYSTEM)
                    AND MP.ORDER AND (ISU-
                   -MEMORY.SUPPLIED < 40))
    failed with value NIL when applied to ISU
      memory components Evaluating: [CONFIGURE 'FIRMWARE (FIND 'ALL 'CCS
                                   '(IMPLEMENTS
                                       FIRMWARE]

Configuring firmware components
  Initial parts are: 1 1234-F010

Evaluating: (CHECK 'REQUIREMENTS)
  Checking REQUIREMENTS constraints in firmware
      components
    The following constraints apply:
    I9050.FIRMWARE.CT1
    MP.FIRMWARE.CT FIRMWARE.CT
  Checking constraint: I9050.FIRMWARE.CT1 (a
  MODIFY-ON-SUCCESS.CT)

The statement: [(SYSTEM I9050-1.SYSTEM
      I9050-2.SYSTEM I9050-3.SYSTEM)
                   AND
                     (NOT (ORDERED? '(1234-F018
                       1234-K018]
    failed with value NIL when applied to
      firmware components
  Checking constraint: MP.FIRMWARE.CT (a
  MODIFY-ON-SUCCESS.CT)

```
The statement: [(SYSTEM M1234:SYSTEM)
              AND MP.ORDER AND (NOT
   (ORDERED? '5640-F400]
   failed with value NIL when applied to
      firmware components
Checking constraint: FIRMWARE.CT (a MODIFY-
   ON-SUCCESS.CT)

The statement: [(SYSTEM M1234.SYSTEM)
              AND
              (NOT MP.ORDER)
              AND
              (NOT (ORDERED? '(1234-F010
                 1234-K010 1234-F011
                 1234-K011]
   failed with value NIL when applied to
      firmware components Evaluating: (CHECK 'CONTENTS)
Checking CONTENTS constraints in firmware
      components
   The following constraints apply: AT-LEAST-
      ONE-FT.CT
AT-MOST-ONE-FT.CT
Checking constraint: AT-LEAST-ONE-FT.CT (a
   WARN-ON-SUCCESS.CT)

The statement: ([COUNT (FIND 'ALL 'CCS
      '(ISA FT]
                  IS ZERO)
   failed with value NIL when applied to
      firmware components
Checking constraint: AT-MOST-ONE-FT.CT (a
   MODIFY-ON-SUCCESS.CT)

The statement: ([COUNT (FIND 'ALL 'CCS
      '(ISA FT]
                  > 1)
   failed with value NIL when applied to
      firmware components Evaluating: (EXPAND* '(AK FT KT))
Expanding 1234-F010 to 1234-K010 in firmware
      components.
Adding the following parts: 1 1234-K010

Evaluating: [CONFIGURE 'IO (FIND 'ALL 'CCS
                              '(IMPLEMENTS IO]
Configuring IO components
   Initial parts are: 1 1234-F361, 1 1234-F691
         and 1 1234-F680
      Evaluating: [CONFIGURE 'IDC (FIND 'ALL 'CCS
                                 '(IMPLEMENTS IDC]

Configuring IDC components
      No initial parts
```

```
  Evaluating: (CHECK 'CONTENTS)
  Checking CONTENTS constraints in IDC
    components
    The following constraints apply: NO-
      FTS.CT
  Checking constraint: NO-FTS.CT (a MODIFY-
    ON-SUCCESS.CT)

The statement: ([COUNT (FIND 'ALL 'CCS
      '(ISA FT]
                IS NOT ZERO)
    failed with value NIL when applied to
      IDC components Evaluating: (EXPAND* '(AK FT KT))

Evaluating: [CONFIGURE 'CLC/MLA
                     (FIND 'ALL 'CCS
                              '(IMPLEMENTS
                                      CLC/MLA]

Configuring CLC/MLA components
  No initial parts

Evaluating: [CONFIGURE 'FICS
                       (FIND 'ALL 'CCS
                                '(IMPLEMENTS
                                        FICS]

Configuring fast ICS components
    No initial parts

Evaluating: (CHECK 'CONTENTS)
      Checking CONTENTS constraints in fast
        ICS components
        No CONTENTS constraints were found.
      Evaluating: (EXPAND* '(AK FT KT))

Evaluating: [CONFIGURE 'ICS (FIND 'ALL
                   'CCS
                              '(IMPLEMENTS
                                      ICS]

Configuring ICS components
    No initial parts

Evaluating: (CHECK 'CONTENTS)
      Checking CONTENTS constraints in ICS
        components
        No CONTENTS constraints were found.

Evaluating: (EXPAND* '(AK FT KT))

Evaluating: (DETERMINE '(#CLC.MLA.LINES
    ICS.PIBS))
  The number of clc's of M1234 system
    components is set to: 0
```

The number of mla's of M1234 system
    components is set to: 0
The number of clc/mla lines for this order
    of M1234 system
components is set to: 0
PIBS required for CLC/MLA of M1234 system
    components is set to: 0

Evaluating: (CHECK 'IO-CAPACITY)
Checking IO-CAPACITY constraints in
    CLC/MLA components
  The following constraints apply:
        #CLC.MLA-LINES
Checking constraint: #CLC.MLA-LINES (a
WARN-ON-SUCCESS.CT)

The statement: ((SYSTEM M1234.SYSTEM)
                 AND
                 (#CLC.MLA.LINES > 20))
    failed with value NIL when applied to
    CLC/MLA components Evaluating: [CONFIGURE '2STAGE-IO
                      (FIND 'ALL 'CCS
                            '(IMPLEMENTS
                                2STAGE-IO]
Configuring two-stage IO components
  Initial parts are: 1 1234-F361, 1 1234-F691
    and 1 1234-F680

Evaluating: [CONFIGURE 'ITB-MODULES
                        (FIND 'ALL 'CCS
                              '(IMPLEMENTS
                                  ITB-MODULES]

Configuring ITB components
    Initial parts are: 1 1234-F361

Evaluating: (CHECK 'CONTENTS)
    Checking CONTENTS constraints in ITB
        components
      No CONTENTS constraints were found.

Evaluating: (EXPAND* '(AK FT KT))
    Checking constraint: 1234-F361.ECT1 (a
        ALWAYS.EXPAND.CT)
    Expanding 1234-F361 to 2 1234-K931 in
        ITB components.
    Adding the following parts: 2 1234-K931

Evaluating: (DETERMINE '(#TRUNK.LINES
        IO.PIBS))
    The number of standard io lines for
        this order of M1234
    system components is set to: 2
    PIBS required for IOLC and common trunk
        of M1234 system
    components is set to: 4

Evaluating: [CONFIGURE 'IO-PANEL-MODULES
            (FIND 'ALL 'CCS
               (IMPLEMENTS
                    IO-PANEL-MODULES]
Configuring IO panel components
  Initial parts are: 1 1234-F691 and 1
      1234-F680

Evaluating: (CHECK 'CONTENTS)
  Checking CONTENTS constraints in IO
      panel components
   No CONTENTS constraints were found.

Evaluating: (EXPAND* '(AK FT KT))
  Checking constraint: 1234-F691.ECT1 (a
      ALWAYS.EXPAND.CT)
  Expanding 1234-F691 to 2 1234-K935, 2
      1234-K936 and 2 1234-K937 in IO
       panel components.
  Adding the following parts: 2 1234-
      K935, 2 1234-K936 and 2 1234-K937
  Checking constraint: 1234-F680.ECT.1 (a
      ALWAYS.EXPAND.CT)
  Expanding 1234-F680 to 1 1234-K930 in
      IO panel components.
  Adding the following parts: 1 1234-K930

Evaluating: (DETERMINE '(#CT.LINES
      #IOLC.LINES))

The number of common trunk interface
                lines of M1234
            system components is set to: 1
            The number of iolc interface lines of
                M1234 system
            components is set to: 2

Evaluating: (CHECK 'IO-CAPACITY)
       Checking IO-CAPACITY constraints in two-
           stage IO components
          The following constraints apply: CT.IO
          CT.IOLC.IO CT-LINES IOLC-LINES
       Checking constraint: CT.IO (a WARN-ON-
           FAILURE.CT)

The statement: (#CT.LINES <=
              TRUNK.LINES)
          succeeded with value T when applied to
              two-stage IO components
       Checking constraint: CT.IOLC.IO (a WARN-
           ON-FAILURE.CT)

The statement: (#TRUNK.LINES =
              #IOLC.LINES + #CT.LINES)

failed with value NIL when applied to
two-stage IO components
*** WARNING - The number of IOLC and common trunk I/F lines
does not match the number of HS, MS, and LS IO lines.

Checking constraint: CT-LINES (a IO-
       LINES.CT)

The statement: ((SYSTEM M1234.SYSTEM)
                       AND
                       (NOT (BETWEEN #CT.LINES
                            0 6)))
    failed with value NIL when applied to
      two-stage IO components
    Checking constraint: IOLC-LINES (a IO-
       LINES.CT)

The statement: ((SYSTEM STSYSTEM )
                       AND
                       (NOT (BETWEEN
                          #IOLC.LINES 0 6)))
    failed with value NIL when applied to
      two-stage IO components
Evaluating: [CONFIGURE 'PLENUM (FIND 'ALL 'CCS
                                      '(IMPLEMENTS
                                          PLENUM]

Configuring plenum components
  No initial parts

Evaluating: (CHECK 'CONTENTS)
    Checking CONTENTS constraints in plenum
       components
      The following constraints apply: AT-MOST-
         ONE-FT.CT
    Checking constraint: AT-MOST-ONE-FT.CT (a
       MODIFY-ON-SUCCESS.CT)

The statement: ([COUNT (FIND 'ALL 'CCS
      '(ISA FT]
             > 1)
    failed with value NIL when applied to
      plenum components Evaluating: (EXPAND* '(AK FT KT))

Evaluating: [CONFIGURE 'POWER-SUPPLY
                         (FIND 'ALL 'CCS
                              '(IMPLEMENTS
                                 POWER-SUPPLY]
Configuring power supply components
  No initial parts Evaluating: (CHECK 'REQUIREMENTS)
    Checking REQUIREMENTS constraints in power
       supply components The following constraints apply: MP.POWER-
    SUPPLY.CT
  Checking constraint: MP.POWER-SUPPLY.CT (a
  MODIFY-ON-SUCCESS.CT)
    The statement: [(SYSTEM M1234.SYSTEM)
                    AND MP.ORDER AND
                    (NOT (ORDERED? '(1234-F400
                        1234-K400]
    failed with value NIL when applied to power
      supply components
  Evaluating: (EXPAND* '(AK FT KT))
Evaluating: [CONFIGURE 'REST (FIND 'ALL 'CCS
                            '(IMPLEMENTS REST]
Configuring remaining components
  Initial parts are: 1 1234-K416
  Evaluating: [CONFIGURE 'CABLE (FIND 'ALL 'CCS
                            '(IMPLEMENTS CABLE]

Configuring cable components
    No initial parts
    Evaluating: (EXPAND* '(AK FT KT))
  Evaluating: [CONFIGURE 'CONSOLE (FIND 'ALL 'CCS
                            '(IMPLEMENTS
                                CONSOLE]

Configuring console components
    Initial parts are: 1 1234-K416
    Evaluating: (EXPAND* '(AK FT KT))
  Evaluating: [CONFIGURE 'MISC (FIND 'ALL 'CCS
                            '(IMPLEMENTS MISC]
  Configuring miscellaneous components
    No initial parts
    Evaluating: (EXPAND* '(AK FT KT))

Evaluating: (CHECK 'REQUIREMENTS)
    Checking REQUIREMENTS constraints in
      miscellaneous components
      The following constraints apply: CLC/MLA-
        DISPLAY
    Checking constraint: CLC/MLA-DISPLAY (a
    MODIFY-ON-SUCCESS.CT)

The statement: ((SYSTEM M1234.SYSTEM)
                      AND
                      ((COUNT.PARTS '1234-K545 T)
                        = 1)
                      AND
                      (BETWEEN #CLC.MLA.LINES 11
                        20))
      failed with value NIL when applied to
        miscellaneous components
      Evaluating: (EXPAND* '(AK FT KT))

Evaluating: (CHECK 'POWER)
Checking POWER constraints in M1234 system
  components
  The following constraints apply: EXTRA.MINUS5
EXTRA.PLUS5 MINUS5 PLUS5
Checking constraint: EXTRA.MINUS5 (a WARN-ON-
                                          SUCCESS.CT)
The power used by this order of M1234 system
  components is set to:  +5V: 33 -2V: 0 -5V: 226
    The statement: ((SYSTEM M1234.SYSTEM )
                    AND
                    (NOT MP.ORDER)
                    AND
                    (ORDERED? '1234-F400 T)
                    AND
                    (POWER.USED:MINUS.5 <= 250))
    failed with value NIL when applied to M1234
      system components
Checking constraint: EXTRA.PLUS5 (a WARN-ON-
                                         SUCCESS.CT)
    The statement: ((SYSTEM M1234.SYSTEM )
                    AND
                    (ORDERED? '1234-F413 T)
                    AND
                    (POWER.USED:PLUS.5 <= 60))
    failed with value NIL when applied to M1234
      system components
Checking constraint: MINUS5 (a MODIFY-ON-
                                    SUCCESS.CT)
The power supplied for this order of M1234 system
  components is set to:  +5V: 0 -2V: 0 -5V: 0
    The statement: ((SYSTEM M1234.SYSTEM)
                    AND
                    (POWER.USED:MINUS.5 -
                       POWER.SUPPLIED:MINUS.5)
                    > 250)
    failed with value NIL when applied to M1234
      system components
Checking constraint: PLUS5 (a MODIFY-ON-SUCCESS.CT)

The statement: ((SYSTEM M1234.SYSTEM )
                    AND
                    (POWER.USED:PLUS.5 -
                     POWER.SUPPLIED:PLUS.5)
                    > 60)
    failed with value NIL when applied to M1234
        system components
Evaluating: (CHECK 'PIBS)
Checking PIBS constraints in M1234 system
        components
    The following constraints apply: ICS.PIBS.CT
IO.PIBS.CT PIBS.CT1 PIBS.CT2
Checking constraint: ICS.PIBS.CT (a WARN-ON-
                                          SUCCESS.CT)

The statement: ((SYSTEM M1234.SYSTEM )
              AND
              (ICS.PIBS > 8))
   failed with value NIL when applied to M1234
      system components
Checking constraint: IO.PIBS.CT (a WARN-ON-
                                      SUCCESS.CT)

The statement: ((SYSTEM M1234.SYSTEM)
              AND
              (IO.PIBS + ICS.PIBS > 12))
   failed with value NIL when applied to M1234
      system components
Checking constraint: PIBS.CT1 (a WARN-ON-
                                      SUCCESS.CT)

The statement: ((SYSTEM M1234.SYSTEM)
              AND
              (ORDERED? '1234-K926)
              AND
              (TOTAL.PIBS > 38))
   failed with value NIL when applied to M1234
      system components
Checking constraint: PIBS.CT2 (a MODIFY-ON-
                                      SUCCESS.CT)

The statement: ((SYSTEM M1234.SYSTEM)
              AND
              (NOT (ORDERED? '1234-K926))
              AND
              (TOTAL.PIBS > 38))
   failed with value NIL when applied to M1234
      system components
Evaluating: (EXPAND* '(AK FT KT))

Evaluating: (CHECK 'EFFECTIVITY)
Checking EFFECTIVITY constraints in M1234 system
      components
 No EFFECTIVITY constraints were found.

Evaluating: (CHECK 'PHASE-OUT)
Checking PHASE-OUT constraints in M1234 system
      components
 No PHASE-OUT constraints were found.
Checking EMPTY.BIN constraints in M1234 system
      components
   The following constraints apply:
        UNASSIGNED.EMPTY.CT
Checking constraint: UNASSIGNED.EMPTY.CT (a WARN-
                                      ON-SUCCESS.CT)

The statement: (BIN:CONTENTS IS NOT NULL)
            failed with value NIL when applied to original
               components Evaluating: (DETERMINE '(FINAL.PARTS))
     The final set of parts of original components is set to: M1234, 1234-3003-0690, 1234-K450, 1234-K941, 1234-F290, 1234-K920, 1234-K921, 1234-K924, 1234-K940, 1234-F113, 1234-K915, 1234-K917, 1234-K913, 1234-F010, 1234-K010, 1234-F361, 1234-K931, 1234-F691, 1234-F680, 1234-K935, 1234-K936, 1234-K937, 1234-K930 and 1234-K416

Evaluating: (IF (MEMBER (FETCH 'ORDERED.PRODUCT.LINE)
                       '(PRODUCT.LINE
                         I9050.PRODUCT.LINE))
              THEN (OUTPUT.ORDER))

What type of output form would you like:
PRODUCTION.WORKSHEET
Order number: 6330-82-0261
Branch: 1815
Method: SURFACE
Remarks:

*** WARNING - The number of IOLC and common trunk I/F lines does not match the
number of HS, MS, and LS IO lines.

| | | | |
|---|---|---|---|
| 1 | 1234-3003-0690 | Class model for M1234 system | F/S |

Basic To Priced

| | | | |
|---|---|---|---|
| 1 | 1234-K416 | CONSOLE INDICATOR INTERFACE | F/A |
| 1 | 1234-K920 | MSU EXPANSION MODULE | F/A |
| 2 | 1234-K924 | MSU 256K ARRAY | F/A |
| 1 | 1234-K940 | ISU/MSU RESISTOR | F/A |
| 1 | 1234-K941 | CRYSTAL 84/56 NS | F/A |

Customer BTO

| | | | |
|---|---|---|---|
| 1 | 1234-K450 | VS HARDWARE | F/A |
| 3 | 1234-K920 | MSU EXPANSION MODULE | F/A |
| 2 | 1234-K921 | MSU, INTERFACE | F/A |
| 6 | 1234-K924 | MSU 256K ARRAY | F/A |
| 3 | 1234-K940 | ISU/MSU RESISTOR | F/A |
| 1 | 1234-K915 | READ-ONLY MEMORY AND TERMINATOR | F/A |
| 1 | 1234-K917 | SERVICE PROCESSOR, ISU NO.1 | F/A |
| 3 | 1234-K913 | ISU, 8K FAST | F/A |
| 1 | 1234-K010 | Firmware | F/A |
| 2 | 1234-K931 | DIRECT MEMORY ACCESS TRUNK | F/A |
| 2 | 1234-K935 | BIT SERIAL LINK CABLES | F/A |
| 2 | 1234-K936 | CONNECTOR MODULE | F/A |
| 2 | 1234-K937 | CT BSL ADAPTER | F/A |
| 1 | 1234-K930 | COMMON TRUNK DATA INTERFACE | F/A |

What type of output form would you like:

OCEAN executive>

APPENDIX II (A)

KNOWLEDGE BASE FOR M1234 COMPUTER FUNCTIONAL HIERARCHY

```
(* XTEST-FHS definition)
(DEFINSTANCE XTEST-FHS FHS
   SET.OF XTESTKB
   FILED.ON XTESTFH
   ELEMENTS         (2STAGE-IO CABLE CLC/MLA CONSOLE FICS
                    FIRMWARE ICS IDC IO IO-PANEL-MODULES ISU
                    ITB-MODULES MAINFRAME MEMORY MISC MULTI-
                    PROCESSING PLENUM POWER-SUPPLY PROCESSOR
                    PRODUCT.LINE REST SP M1234.SYSTEM))

(DEFCLASS 2STAGE-IO (BIN)
   ()
   (METACLASS FUNCTION.CLASS
    DESCR "two-stage IO"
    COMPOSES (IO))
   )

(DEFCLASS CABLE (BIN)
   ()
   (METACLASS FUNCTION.CLASS
    DESCR "cable"
    COMPOSES (REST))
   )

(DEFCLASS CLC/MLA (BIN)
   ()
   (METACLASS FUNCTION.CLASS
    DESCR "CLC/MLA"
    COMPOSES (IO))
   )

(DEFCLASS CONSOLE (BIN)
   ()
   (METACLASS FUNCTION.CLASS
    DESCR "console"
    COMPOSES (REST))
   )

(DEFCLASS FICS (BIN)
   ()
   (METACLASS FUNCTION.CLASS
    DESCR "fast ICS"
    COMPOSES (CLC/MLA))
   )

(DEFCLASS FIRMWARE (BIN)
   ()
   (METACLASS FUNCTION.CLASS
    DESCR "firmware"
    COMPOSES (MAINFRAME))
   )
```

```
(DEFCLASS ICS (BIN)
   ()
   (METACLASS FUNCTION.CLASS
    DESCR "ICS"
    COMPOSES (CLC/MLA))
   )

(DEFCLASS IDC (BIN)
   ()
   (METACLASS FUNCTION.CLASS
    DESCR "IDC"
    COMPOSES (IO))
   )

(DEFCLASS IO (BIN)
   ()
   (METACLASS FUNCTION.CLASS
    DESCR "IO"
    COMPOSES (MAINFRAME))
   )

(DEFCLASS IO-PANEL-MODULES (BIN)
   ()
   (METACLASS FUNCTION.CLASS
    DESCR "IO panel"
    COMPOSES (2STAGE-IO))
   )

(DEFCLASS ISU (BIN)
   ()
   (METACLASS FUNCTION.CLASS
    DESCR "ISU memory"
    COMPOSES (MAINFRAME))
   )

(DEFCLASS ITB-MODULES (BIN)
   ()
   (METACLASS FUNCTION.CLASS
    DESCR "ITB"
    COMPOSES (2STAGE-IO))
   )

(DEFCLASS MAINFRAME (BIN)
   ()
   (METACLASS FUNCTION.CLASS
    DESCR "mainframe"
    COMPOSES (SYSTEM))
   )

(DEFCLASS MEMORY (BIN)
   ()
   (METACLASS FUNCTION.CLASS
    DESCR "main memory"
    COMPOSES (MAINFRAME))
   )

(DEFCLASS MISC (BIN)
```

```
  ()
  (METACLASS FUNCTION.CLASS
   DESCR "miscellaneous"
   COMPOSES (REST))
  )

(DEFCLASS MULTIPROCESSING (BIN)
   ()
   (METACLASS FUNCTION.CLASS
    DESCR "multi-processing"
    COMPOSES (SYSTEM))
   )

(DEFCLASS PLENUM (BIN)
   ()
   (METACLASS FUNCTION.CLASS
    DESCR "plenum"
    COMPOSES (MAINFRAME))
   )

(DEFCLASS POWER-SUPPLY (BIN)
   ()
   (METACLASS FUNCTION.CLASS
    DESCR "power supply"
    COMPOSES (MAINFRAME))
   )

(DEFCLASS PROCESSOR (BIN)
   ()
   (METACLASS FUNCTION.CLASS
    DESCR "processor"
    COMPOSES (MAINFRAME))
   )

(DEFCLASS PRODUCT.LINE (BIN)
   ()
   (METACLASS FUNCTION.CLASS
    DESCR "M1234 product line"
    PROD.GEN (PRODUCT.LINE))
   )

(DEFCLASS REST (BIN)
   ()
   (METACLASS FUNCTION.CLASS
    DESCR "remaining"
    COMPOSES (SYSTEM))
   )

(DEFCLASS SP (BIN)
   ()
   (METACLASS FUNCTION.CLASS
    DESCR "SP"
    COMPOSES (MAINFRAME))
   )
```

```
(DEFCLASS M1234.SYSTEM (BIN)
   ()
   (METACLASS FUNCTION.CLASS
    PROD.GEN (SYSTEM))
   )

(* XTEST-TBS definition)
(DEFINSTANCE XTEST-TBS TBS
   SET.OF XTESTKB
   FILED.ON XTESTFH
   ELEMENTS          (2STAGE-IO.TB CABLE.TB CLC/MLA.TB
                     CONSOLE.TB FICS.TB FIRMWARE.TB ICS.TB
                     IDC.TB IO-PANEL-MODULES.TB IO.TB ISU.TB
                     ITB-MODULES.TB MAINFRAME.TB MEMORY.TB
                     MISC.TB MULTIPROCESSING.TB PLENUM.TB
                     POWER-SUPPLY.TB PROCESSOR.TB
                     PRODUCT.LINE.TB REST.TB SP.TB SYSTEM.TB))
```

APPENDIX II (B)

KNOWLEDGE BASE FOR M1234 COMPUTER
TASK BLOCKS

```
(DEFTASKBLOCK 2STAGE-IO.TB 2STAGE-IO ()
                                     (* jsb: " 4-Aug-83 23:17")
   (CONFIGURE 'ITB-MODULES (FIND 'ALL 'CCS '(IMPLEMENTS ITB-
MODULES)))
   (CONFIGURE 'IO-PANEL-MODULES (FIND 'ALL 'CCS '(IMPLEMENTS
IO-PANEL-MODULES)))
   (CHECK 'IO-CAPACITY))

(DEFTASKBLOCK CABLE.TB CABLE ()    (* jsb: " 4-Aug-83 23:13")
   (EXPAND* '(AK FT KT)))

(DEFTASKBLOCK CLC/MLA.TB CLC/MLA ()
                                     (* jsb: " 7-AUG-83 20:32")
   (CONFIGURE 'FICS (FIND 'ALL 'CCS '(IMPLEMENTS FICS)))
   (CONFIGURE 'ICS (FIND 'ALL 'CCS '(IMPLEMENTS ICS)))
   (DETERMINE '(#CLC.MLA.LINES ICS.PIBS))
   (CHECK 'IO-CAPACITY))

(DEFTASKBLOCK CONSOLE.TB CONSOLE ()
                                     (* jsb: " 4-Aug-83 23:13")
   (EXPAND* '(AK FT KT)))

(DEFTASKBLOCK FICS.TB FICS ()      (* jsb: " 4-Aug-83 23:16")
   (CHECK 'CONTENTS)
   (EXPAND* '(AK FT KT)))

(DEFTASKBLOCK FIRMWARE.TB FIRMWARE ()
                                     (* jsb: " 7-AUG-83 17:24")
   (CHECK 'REQUIREMENTS)
   (CHECK 'CONTENTS)
   (EXPAND* '(AK FT KT)))
```

```
(DEFTASKBLOCK ICS.TB ICS ()           (* jsb: " 4-Aug-83 23:17")
   (CHECK 'CONTENTS)
   (EXPAND* '(AK FT KT))])

(DEFTASKBLOCK IDC.TB IDC ()           (* jsb: " 4-Aug-83 23:14")
   (CHECK 'CONTENTS)
   (EXPAND* '(AK FT KT)))

(DEFTASKBLOCK IO-PANEL-MODULES.TB IO-PANEL-MODULES ()
                                      (* jsb: " 7-AUG-83 20:30")
   (CHECK 'CONTENTS)
   (EXPAND* '(AK FT KT))
   (DETERMINE '(#CT.LINES #IOLC.LINES)))
(DEFTASKBLOCK IO.TB IO ()             (* jsb: " 4-Aug-83 23:12")
   (CONFIGURE 'IDC (FIND 'ALL 'CCS '(IMPLEMENTS IDC)))

(CONFIGURE 'CLC/MLA (FIND 'ALL 'CCS '(IMPLEMENTS
CLC/MLA)))
   (CONFIGURE '2STAGE-IO (FIND 'ALL 'CCS '(IMPLEMENTS 2STAGE-
IO))))

(DEFTASKBLOCK ISU.TB ISU ()           (* jst: "11-AUG-83 08:49")
   (CHECK 'CONTENTS)
   (EXPAND* '(AK FT KT))
   (DETERMINE '(ISU-MEMORY.SUPPLIED))
   (CHECK 'REQUIREMENTS))

(DEFTASKBLOCK ITB-MODULES.TB ITB-MODULES ()
                                      (* jsb: " 7-AUG-83 20:29")
   (CHECK 'CONTENTS)
   (EXPAND* '(AK FT KT))
   (DETERMINE '(#TRUNK.LINES IO.PIBS)))

(DEFTASKBLOCK MAINFRAME.TB MAINFRAME ()
                                      (* jsb: " 4-Aug-83 23:07")
   (CONFIGURE 'PROCESSOR (FIND 'ALL 'CCS '(IMPLEMENTS
PROCESSOR)))
   (CONFIGURE 'MEMORY (FIND 'ALL 'CCS '(IMPLEMENTS MEMORY)))
   (CONFIGURE 'ISU (FIND 'ALL 'CCS '(IMPLEMENTS ISU)))
   (CONFIGURE 'FIRMWARE (FIND 'ALL 'CCS '(IMPLEMENTS
FIRMWARE)))
   (CONFIGURE 'IO (FIND 'ALL 'CCS '(IMPLEMENTS IO)))
   (CONFIGURE 'PLENUM (FIND 'ALL 'CCS '(IMPLEMENTS PLENUM)))
   (CONFIGURE 'POWER-SUPPLY (FIND 'ALL 'CCS '(IMPLEMENTS
POWER-SUPPLY))))

(DEFTASKBLOCK MEMORY.TB MEMORY ()
                                      (* jsb: " 7-AUG-83 20:28")
   (CHECK 'CONTENTS)
   (EXPAND* '(AK FT KT))
   (DETERMINE '(MAIN-MEMORY.SUPPLIED MEMORY.INTERLEAVING
MEMORY.PIBS))
   (CHECK 'INTERLEAVING)
   (CHECK 'MEMORY-CAPACITY)
   (CHECK 'MEMORY-IEMENT))
```

```
(DEFTASKBLOCK MISC.TB MISC ()        (* jsb: " 9-AUG-83 14:45")
   (EXPAND* '(AK FT KT))
   (CHECK 'REQUIREMENTS)
   (EXPAND* '(AK FT KT)))

(DEFTASKBLOCK MULTIPROCESSING.TB MULTIPROCESSING ()
                                     (* jsb: " 7-AUG-83 20:31")
   (CHECK 'CONTENTS)
   (EXPAND* '(AK FT KT))
   (DETERMINE '(MP.PIBS)))
(DEFTASKBLOCK PLENUM.TB PLENUM ()
                                     (* jsb: " 4-Aug-83 23:13")
   (CHECK 'CONTENTS)
   (EXPAND* '(AK FT KT)))

(DEFTASKBLOCK POWER-SUPPLY.TB POWER-SUPPLY ()
                                     (* jsb: " 7-AUG-83 17:24")
   (CHECK 'REQUIREMENTS)
   (EXPAND* '(AK FT KT)))

(DEFTASKBLOCK PROCESSOR.TB PROCESSOR ()
                                     (* jsb: " 4-Aug-83 23:08")
   (EXPAND* '(AK FT KT)))

(DEFTASKBLOCK PRODUCT.LINE.TB PRODUCT.LINE ()
                                     (* jsb: " 3-AUG-83 18:17")
   (BVSET 'SYSTEM.TYPE (COMPUTE.SYSTEM.TYPE))
   (CONFIGURE (FETCH 'SYSTEM.TYPE)
        (FIND 'ALL 'CCS)))

(DEFTASKBLOCK REST.TB REST ()        (* jsb: " 4-Aug-83 23:14")
   (CONFIGURE 'CABLE (FIND 'ALL 'CCS '(IMPLEMENTS CABLE)))
   (CONFIGURE 'CONSOLE (FIND 'ALL 'CCS '(IMPLEMENTS
CONSOLE)))
   (CONFIGURE 'MISC (FIND 'ALL 'CCS '(IMPLEMENTS MISC))))

(DEFTASKBLOCK SP.TB SP ()            (* jsb: " 4-Aug-83 23:08")
   (EXPAND* '(AK FT KT)))

(DEFTASKBLOCK SYSTEM.TB SYSTEM ()
                                     (* jst: "11-AUG-83 09:11")
   (EXPAND* '(BG BU.V85))
   (DETERMINE '(CLASS.MODEL.EXPANSION BASIC.TO.PRICED
MP.ORDER))
   (CONFIGURE 'MULTIPROCESSING (FIND 'ALL 'CCS '(IMPLEMENTS
MULTIPROCESSING)))
   (CONFIGURE 'MAINFRAME (FIND 'ALL 'CCS '(IMPLEMENTS
MAINFRAME)))
   (CONFIGURE 'REST (FIND 'ALL 'CCS '(IMPLEMENTS REST)))
   (CHECK 'POWER)
   (CHECK 'PIBS)
   (EXPAND* '(AK FT KT))
   (CHECK 'EFFECTIVITY)
   (CHECK 'PHASE-OUT))
```

APPENDIX II (C)

KNOWLEDGE BASE FOR M1234 COMPUTER PARTS CATALOG

```
(* XTEST-BSS definition)
(DEFINSTANCE XTEST-BSS BSS
   SET.OF XTESTKB
   FILED.ON XTESTBX
   ELEMENTS (M1234))

(DEFCLASS M1234 (PRODUCT.ID)
   ()
   (METACLASS BS
    DESCR "The M1234 product line"
    MFG.PLANT 1804
    IMPLEMENTS.FN PRODUCT.LINE
    BASIC.GROUPS NIL)
   )

(* XTEST-BGS definition)
(DEFINSTANCE XTEST-BGS BGS
   SET.OF XTESTKB
   FILED.ON XTESTBX
   ELEMENTS (M1234-II))

(DEFCLASS M1234-II (PRODUCT.ID)
   ()
   (METACLASS BG
    DESCR "M1234-II SYSTEM "
    IMPLEMENTS.FN M1234.SYSTEM
    BASIC.UNITS NIL)
   )

(* XTEST-BUS definition)
(DEFINSTANCE XTEST-BUS BUS
   SET.OF XTESTKB
   FILED.ON XTESTBX
   ELEMENTS (1234-0066-0690 1234-3003-0690))

(DEFCLASS 1234-0066-0690 (PRODUCT.ID)
   ()
   (METACLASS BU
    DESCR "Vanilla model for M1234 system"
    MFG.PLANT 1804
    IMPLEMENTS.FN SYSTEM
    ACCESSORIES NIL
    REQUIRED.IVARS NIL)
   )
(DEFCLASS 1234-3003-0690 (PRODUCT.ID)
   ()
   (METACLASS BU.M12
    DESCR "Class model for M1234 system"
```

```
    IMPLEMENTS.FN M1234.SYSTEM
    BASIC.TO.PRICED ((1 . 1234-K416)
                    (1 . 1234-K920)
                    (2 . 1234-K924)
                    (1 . 1234-K940)
                    (1 . 1234-K941))
    VANILLA.MODEL 1234-0066-0690)
)

(* XTEST-AKS definition)
(DEFINSTANCE XTEST-AKS AKS
   SET.OF XTESTKB
   FILED.ON XTESTAK
   ELEMENTS (1234-P413 1234-P723 1234-P724 1234-P742 1234-
            P743 1234-P954 1234-P955))

(DEFCLASS 1234-P413 (PRODUCT.ID)
   ()
   (METACLASS AK
    MFG.PLANT 1804
    DESCR "Additional Power Supply"
    IMPLEMENTS.FN POWER-SUPPLY)
)

(DEFCLASS 1234-P723 (PRODUCT.ID)
   ()
   (METACLASS AK
    DESCR "1024K TO 2048K MEM ADD (CONT  TWO 1234-K920, FOUR
                                  1234-K924)"
    MFG.PLANT 1804
    IMPLEMENTS.FN MEMORY)
)

(DEFCLASS 1234-P724 (PRODUCT.ID)
   ()
   (METACLASS AK
    DESCR "2048K TO 3072 MEMORY ADDITION (CONTAINS FOUR 1234-
                                          K924)"
    MFG.PLANT 1804
    IMPLEMENTS.FN MEMORY)
)

(DEFCLASS 1234-P742 (PRODUCT.ID)
   ()
   (METACLASS AK
    DESCR "VHST (INCL. 1234-K930 & K931) "
    MFG.PLANT 1804
    IMPLEMENTS.FN 2STAGE-IO)
)

(DEFCLASS 1234-P743 (PRODUCT.ID)
    ()
    (METACLASS AK
     DESCR "I/O LINK CONTROL         "
     MFG.PLANT 1804
```

```
      COMMENT (NOTE CRIT-KITS-0006-NOTE-09)
      IMPLEMENTS.FN 2STAGE-IO)
    )

(DEFCLASS 1234-P954 (PRODUCT.ID)
   ()
   (METACLASS AK
    DESCR "FIRST CLC/MLA COMB (CONTAINS   1234-K905, K901 AND
                                           K903)"
    MFG.PLANT 1804
    IMPLEMENTS.FN CLC/MLA)
   )

(DEFCLASS 1234-P955 (PRODUCT.ID)
   ()
   (METACLASS AK
    DESCR "SECOND CLC/MLA COMB (CONTAINS 1234-K905, K901 AND
                                          K903)"
    MFG.PLANT 1804
    IMPLEMENTS.FN CLC/MLA)
   )

(* XTEST-FTS definition)
(DEFINSTANCE XTEST-FTS FTS
   SET.OF XTESTKB
   FILED.ON XTESTFT
   ELEMENTS     (1234-F010 1234-F113 1234-F262 1234-F290 1234-
                F360 1234-F361 1234-F362 1234-F400 1234-F413
                1234-F504 1234-F510 1234-F545 1234-F680 1234-
                F690 1234-F691 1234-K010))

(DEFCLASS 1234-F010 (PRODUCT.ID)
   ()
   (METACLASS FT
    DESCR "Firmware"
    IMPLEMENTS.FN FIRMWARE
    UNIQUE.EXPANSION 1234-K010)
   )

(DEFCLASS 1234-F113 (PRODUCT.ID)
   ()
   (METACLASS FT
    IMPLEMENTS.FN ISU
    DESCR "ISU 113K"
    PIBS (0 0)
    POWER (0.0 8.0 33.0))
   )

(DEFCLASS 1234-F262 (PRODUCT.ID)
   ()
   (METACLASS FT
    DESCR "Memory 1M, 2 way"
    IMPLEMENTS.FN MEMORY
    POWER (6.0 0.0 34.0)
    PIBS (4 0))
   )
```

```
(DEFCLASS 1234-F290 (PRODUCT.ID)
   ()
   (METACLASS FT
    DESCR "Memory 2M, 2 way"
    IMPLEMENTS.FN MEMORY
    POWER (44.0 0.0 12.0)
    PIBS (8 0))
   )

(DEFCLASS 1234-F360 (PRODUCT.ID)
   ()
   (METACLASS FT
    DESCR "MFG.PLANT COMMON TRUNK  "
    IMPLEMENTS.FN ITB-MODULES
    POWER (0.0 8.6 13.5)
    PIBS (2 2))
   )

(DEFCLASS 1234-F361 (PRODUCT.ID)
   ()
   (METACLASS FT
    DESCR "Common trunk"
    IMPLEMENTS.FN ITB-MODULES
    POWER (0.0 17.2 27.0))
   )

(DEFCLASS 1234-F362 (PRODUCT.ID)
   ()
   (METACLASS FT
    DESCR "Common trunk"
    IMPLEMENTS.FN ITB-MODULES
    POWER (0.0 25.8 40.5))
   )

(DEFCLASS 1234-F400 (PRODUCT.ID)
   ()
   (METACLASS FT
    IMPLEMENTS.FN POWER-SUPPLY
    MFG.PLANT 1804
    DESCR "-5V power supply")
   )

(DEFCLASS 1234-F413 (PRODUCT.ID)
   ()
   (METACLASS FT
    DESCR "MFG.PLANT POWER SUPPLY   "
    IMPLEMENTS.FN POWER-SUPPLY
    POWER (0 0 -62)
    PIBS (0 0))
   )

(DEFCLASS 1234-F504 (PRODUCT.ID)
   ()
   (METACLASS FT
    DESCR "MFG.PLANT FIRST CLC/MLA  "
```

```
     IMPLEMENTS.FN CLC/MLA
     POWER (2 1 5.5)
     PIBS (2 2))
   )

(DEFCLASS 1234-F510 (PRODUCT.ID)
   ()
   (METACLASS FT
    DESCR "Fast ICS, 2CLC, 2MLA"
    IMPLEMENTS.FN FICS
    POWER (11.0 2.0 4.0)
    PIBS (4 4))
   )

(DEFCLASS 1234-F545 (PRODUCT.ID)
   ()
   (METACLASS FT
    DESCR "MFG.PLANT ICS LIGHT DISPLAY  "
    IMPLEMENTS.FN MISC)
   )

(DEFCLASS 1234-F680 (PRODUCT.ID)
   ()
   (METACLASS FT
    DESCR "MFG.PLANT BYTE MULTIPLEX TRUNK      "
    IMPLEMENTS.FN IO-PANEL-MODULES
    POWER (7 .4 .5)
    PIBS (0 0))
   )
(DEFCLASS 1234-F690 (PRODUCT.ID)
   ()
   (METACLASS FT
    DESCR "MFG.PLANT BSLA"
    IMPLEMENTS.FN IO-PANEL-MODULES
    POWER (7.8 .4 .5)
    PIBS (0 0))
   )

(DEFCLASS 1234-F691 (PRODUCT.ID)
   ()
   (METACLASS FT
    DESCR "BSLA"
    IMPLEMENTS.FN IO-PANEL-MODULES
    POWER (15.6 .8 1.0))
   )

(DEFCLASS 1234-K010 (PRODUCT.ID)
   ()
   (METACLASS FT
    DESCR "Firmware"
    IMPLEMENTS.FN FIRMWARE)
   )
```

```
(* XTEST-KTS definition)
(DEFINSTANCE XTEST-KTS KTS
   SET.OF XTESTKB
   FILED.ON XTESTKT
   ELEMENTS    (1234-K010 1234-K400 1234-K413 1234-K416 1234-
               K450 1234-K901 1234-K903 1234-K905 1234-K913
               1234-K915 1234-K917 1234-K920 1234-K921 1234-
               K924 1234-K930 1234-K931 1234-K935 1234-K936
               1234-K937 1234-K939 1234-K940 1234-K941))

(DEFCLASS 1234-K010 (PRODUCT.ID)
   ()
   (METACLASS FT
    DESCR "Firmware"
    IMPLEMENTS.FN FIRMWARE)
   )

(DEFCLASS 1234-K400 (PRODUCT.ID)
   ()
   (METACLASS KT
    IMPLEMENTS.FN POWER-SUPPLY
    MFG.PLANT 1804
    DESCR "-5V power supply")
   )

(DEFCLASS 1234-K413 (PRODUCT.ID)
   ()
   (METACLASS KT
    DESCR "+5V ADD. POWER SUPPLY    "
    MFG.PLANT 1804
    IMPLEMENTS.FN POWER-SUPPLY)
   )

(DEFCLASS 1234-K416 (PRODUCT.ID)
   ()
   (METACLASS KT
    DESCR "CONSOLE INDICATOR INTERFACE   "
    MFG.PLANT 1804
    IMPLEMENTS.FN CONSOLE)
   )

(DEFCLASS 1234-K450 (PRODUCT.ID)
   ()
   (METACLASS KT
    DESCR "VS HARDWARE     "
    MFG.PLANT 1804
    IMPLEMENTS.FN MAINFRAME)
   )

(DEFCLASS 1234-K901 (PRODUCT.ID)
   ()
   (METACLASS KT
    DESCR "MULTILINE ADAPTER     "
    MFG.PLANT 1804
    IMPLEMENTS.FN CLC/MLA)
   )
```

```
(DEFCLASS 1234-K903 (PRODUCT.ID)
  ()
  (METACLASS KT
   DESCR "CLC EXPANSION MODULE"
   MFG.PLANT 1804
   IMPLEMENTS.FN CLC/MLA)
  )

(DEFCLASS 1234-K905 (PRODUCT.ID)
   ()
   (METACLASS KT
    DESCR "FAST CLC   "
    MFG.PLANT 1804
    IMPLEMENTS.FN CLC/MLA)
   )

(DEFCLASS 1234-K913 (PRODUCT.ID)
   ()
   (METACLASS KT
    DESCR "ISU, 8K FAST    "
    MFG.PLANT 1804
    IMPLEMENTS.FN ISU)
   )

(DEFCLASS 1234-K915 (PRODUCT.ID)
   ()
   (METACLASS KT
    DESCR "?? Mystery kit ?? "
    MFG.PLANT 1804
    IMPLEMENTS.FN ISU)
   )

(DEFCLASS 1234-K917 (PRODUCT.ID)
   ()
   (METACLASS KT
    DESCR "SERVICE PROCESSOR, ISU NO.1    "
    MFG.PLANT 1804
    IMPLEMENTS.FN ISU)
   )

(DEFCLASS 1234-K920 (PRODUCT.ID)
   ()
   (METACLASS KT
    DESCR "MSU EXPANSION MODULE"
    MFG.PLANT 1804
    IMPLEMENTS.FN MEMORY)
   )

(DEFCLASS 1234-K921 (PRODUCT.ID)
   ()
   (METACLASS KT
    DESCR "MSU, INTERFACE "
    MFG.PLANT 1804
    IMPLEMENTS.FN MEMORY)
   )
```

```
(DEFCLASS 1234-K924 (PRODUCT.ID)
   ()
   (METACLASS KT
    DESCR "MSU 256K ARRAY "
    MFG.PLANT 1804
    IMPLEMENTS.FN MEMORY)
   )

(DEFCLASS 1234-K930 (PRODUCT.ID)
   ()
   (METACLASS KT
    DESCR "COMMON TRUNK DATA INTERFACE   "
    MFG.PLANT 1804
    IMPLEMENTS.FN IO-PANEL-MODULES)
   )

(DEFCLASS 1234-K931 (PRODUCT.ID)
   ()
   (METACLASS KT
    DESCR "DIRECT MEMORY ACCESS TRUNK    "
    MFG.PLANT 1804
    IMPLEMENTS.FN ITB-MODULES)
   )

(DEFCLASS 1234-K935 (PRODUCT.ID)
   ()
   (METACLASS KT
    DESCR "BIT SERIAL LINK CABLES   "
    MFG.PLANT 1804
    IMPLEMENTS.FN IO-PANEL-MODULES)
   )

(DEFCLASS 1234-K936 (PRODUCT.ID)
   ()
   (METACLASS KT
    DESCR "CONNECTOR MODULE       "
    MFG.PLANT 1804
    IMPLEMENTS.FN IO-PANEL-MODULES)
   )

(DEFCLASS 1234-K937 (PRODUCT.ID)
   ()
   (METACLASS KT
    DESCR "CT BSL ADAPTER "
    MFG.PLANT 1804
    IMPLEMENTS.FN IO-PANEL-MODULES)
   )

(DEFCLASS 1234-K939 (PRODUCT.ID)
   ()
   (METACLASS KT
    DESCR "BSL ENTRY MODULE     "
    MFG.PLANT 1804
    IMPLEMENTS.FN IO-PANEL-MODULES)
   )
```

```
(DEFCLASS 1234-K940 (PRODUCT.ID)
   ()
   (METACLASS KT
    DESCR "ISU/MSU RESISTOR      "
    MFG.PLANT 1804
    IMPLEMENTS.FN MEMORY)
   )

(DEFCLASS 1234-K941 (PRODUCT.ID)
   ()
   (METACLASS KT
    DESCR "CRYSTAL 84/56 NS      "
    MFG.PLANT 1804
    IMPLEMENTS.FN PROCESSOR)
   )

(* XTEST-KVS definition)
(DEFINSTANCE XTEST-KVS KVS
   SET.OF XTESTKB
   FILED.ON XTESTKV
   ELEMENTS (1234-K400-V001))

(DEFCLASS 1234-K400-V001 (PRODUCT.ID)
   ()
   (METACLASS KV
    IMPLEMENTS.FN POWER-SUPPLY
    MFG.PLANT 1804
    DESCR "-5V power supply")
   )
```

APPENDIX II (D)

KNOWLEDGE BASE FOR M1234 COMPUTER
CONSTRAINTS & BIN VARIABLES
KNOWLEDGE BASE FUNCTIONS

```
(* XTEST-CTS definition)
(DEFINSTANCE XTEST-CTS CTS
   SET.OF XTESTKB
   FILED.ON XTESTNCT
   ELEMENTS (AT-LEAST-ONE-FT.CT AT-MOST-ONE-FT.CT AT-MOST-
                ONE-MEMORY-FT.CT NO-FTS.CT NO-MP-
                FTS.CT #CLC.MLA-LINES CLC/MLA-
                DISPLAY CT.IO CT.IOLC.IO
                EXTRA.MINUS5 EXTRA.PLUS5 FIRMWARE.CT
                ICS.PIBS.CT IO.PIBS.CT MINUS5
                MP.FIRMWARE.CT MP.ISU.CT MP.POWER-
                SUPPLY.CT PLUS5 M1234.PIBS.CT1
                M1234.PIBS.CT2
                ))

(DEFCLASS AT-LEAST-ONE-FT.CT (CTI)
   ()
   (METACLASS WARN-ON-SUCCESS.CT
    BIN.TYPES (ISU FIRMWARE)
```

```
        STATEMENT ((COUNT (FIND 'ALL 'CCS '(ISA FT)))
              IS ZERO)
        MESSAGE ("The customer must order some part that
                  implements              " (SAND CURRENT.BIN
                                              'GET.TRANSLATION)
                                        "; this order is
              incorrect.")
        CHECK.KEYWORDS (CONTENTS))
  )
(DEFCLASS AT-MOST-ONE-FT.CT (CTI)
  ()
  (METACLASS MODIFY-ON-SUCCESS.CT
    BIN.TYPES (CLC/MLA PLENUM ISU, FIRMWARE)
    CHECK.KEYWORDS (CONTENTS)
    STATEMENT ((COUNT (FIND 'ALL 'CCS '(ISA FT)))
              > 1)
    DEL-PARTS (ELIMINATE.BTP (FIND* 'ALL 'CCS '(ISA FT))))
  )
(DEFCLASS AT-MOST-ONE-MEMORY-FT.CT (CTI)
  ()
  (METACLASS MODIFY-ON-SUCCESS.CT
    CHECK.KEYWORDS (CONTENTS)
    BIN.TYPES (MEMORY)
    STATEMENT ((SYSTEM M1234.SYSTEM)
              AND
              (COUNT (FIND 'ALL 'CCS '(ISA FT)))
              > 1)
    DEL-PARTS (ELIMINATE.BTP (FIND* 'ALL 'CCS '(ISA FT))))
  )
(DEFCLASS NO-FTS.CT (CTI)
  ()
  (METACLASS MODIFY-ON-SUCCESS.CT
    BIN.TYPES (IDC)
    CHECK.KEYWORDS (CONTENTS)
    STATEMENT ((COUNT (FIND 'ALL 'CCS '(ISA FT)))
              IS NOT ZERO)
    MESSAGE ("The customer is not allowed to order products
              which implement " -
              (SAND CURRENT.BIN 'GET.TRANSLATION)
          ". This order is not correct.")
    DEL-PARTS (FIND* 'ALL 'CCS '(ISA FT)))
  )
(DEFCLASS NO-MP-FTS.CT (CTI)
  ()
  (METACLASS MODIFY-ON-SUCCESS.CT
    CHECK.KEYWORDS (CONTENTS)
    BIN.TYPES (MULTIPROCESSING)
    STATEMENT ((SYSTEM)
              AND
              (COUNT (FIND 'ALL 'CCS '(ISA FT)))
              IS NOT ZERO)
    DEL-PARTS (FIND* 'ALL 'CCS '(ISA FT)))
  )
```

```
(DEFCLASS #CLC.MLA-LINES (CTI)
   ()
   (METACLASS WARN-ON-SUCCESS.CT
    BIN.TYPES (CLC/MLA)
    BIN.VARS.REQUIRED (#CLC.MLA.LINES)
    STATEMENT ((SYSTEM M1234.SYSTEM)
           AND
           (#CLC.MLA.LINES > 20))
    MESSAGE ("The order specifies too many CLC/MLA lines.")
    CHECK.KEYWORDS (IO-CAPACITY))
   )
(DEFCLASS CLC/MLA-DISPLAY (CTI)
   ()
   (METACLASS MODIFY-ON-SUCCESS.CT
    BIN.TYPES (MISC)
    BIN.VARS.REQUIRED (#CLC.MLA.LINES)
    STATEMENT ((SYSTEM M1234.SYSTEM)
           AND
           ((COUNT.PARTS '1234-K545 T)
            = 1)
           AND
           (BETWEEN #CLC.MLA.LINES 11 20))
    MESSAGE (
"This order uses more than 10 CLC/MLA lines. However, the
customer only ordered 1 Remote ICS display (1234-F545)."
         )
    ADD-PARTS (QUOTE ((1 . 1234-F545)))
    CHECK.KEYWORDS (REQUIREMENTS))
   )

(DEFCLASS CT.IO (CTI)
   ()
   (METACLASS WARN-ON-FAILURE.CT
    BIN.VARS.REQUIRED (#TRUNK.LINES #CT.LINES)
    CHECK.KEYWORDS (IO-CAPACITY)
    BIN.TYPES (2STAGE-IO)
    STATEMENT (#CT.LINES <= #TRUNK.LINES)
    MESSAGE ("There are not enough common trunk I/F lines for
the HS, MS, and LS lines ordered.")
   )
   )

(DEFCLASS CT.IOLC.IO (CTI)
   ()
   (METACLASS WARN-ON-FAILURE.CT
    BIN.VARS.REQUIRED (#TRUNK.LINES #CT.LINES #IOLC.LINES)
    CHECK.KEYWORDS (IO-CAPACITY)
    BIN.TYPES (2STAGE-IO)
    STATEMENT (#TRUNK.LINES = #IOLC.LINES + #CT.LINES)
    MESSAGE (
"The number of IOLC and common trunk I/F lines does not
match the number of HS, MS, and LS IO lines."))
   )
```

```
(DEFCLASS EXTRA.MINUS5 (CTI)
   ()
   (METACLASS WARN-ON-SUCCESS.CT
    BIN.TYPES (SYSTEM)
    BIN.VARS.REQUIRED (POWER.USED MP.ORDER)
    STATEMENT ((SYSTEM M1234.SYSTEM)
          AND
          (NOT MP.ORDER)
          AND
          (ORDERED? '1234-F400 T)
          AND
          (POWER.USED:MINUS.5 <= 250))
    MESSAGE ("The customer ordered a -5V power supply which
is not required to run this system.")
    CHECK.KEYWORDS (POWER))
   )

(DEFCLASS EXTRA.PLUS5 (CTI)
   ()
   (METACLASS WARN-ON-SUCCESS.CT
    BIN.TYPES (SYSTEM)
    BIN.VARS.REQUIRED (POWER.USED)
    STATEMENT ((SYSTEM M1234.SYSTEM)
          AND
          (ORDERED? '1234-F413 T)
          AND
          (POWER.USED:PLUS.5 <= 60))
    MESSAGE ("The customer ordered a +5V power supply which
is not required to run this system.")
    CHECK.KEYWORDS (POWER))
   )

(DEFCLASS FIRMWARE.CT (CTI)
   ()
   (METACLASS MODIFY-ON-SUCCESS.CT
    BIN.TYPES (FIRMWARE)
    BIN.VARS.REQUIRED (MP.ORDER)
    CHECK.KEYWORDS (REQUIREMENTS)
    STATEMENT ((SYSTEM M1234.SYSTEM)
          AND
          (NOT MP.ORDER)
          AND
          (NOT (ORDERED? '(1234-F010 1234-K010 1234-F011
1234-K011))))
    MESSAGE (
"No firmware has been ordered for this non-MP system. Please
check with the customer and determine what operating system
will be used with this system. If it is VS-1, they should
order 1 1234-F011; otherwise if it is RS-1, they should
order 1 1234-F010. Please select one of these features for
this order.")
    SET-PARTS (CHOOSE.ONE '((1. 1234-F010) (1 . 1234-F011))))
   )
```

```
(DEFCLASS ICS.PIBS.CT (CTI)
   ()
   (METACLASS WARN-ON-SUCCESS.CT
    BIN.TYPES (SYSTEM)
    BIN.VARS.REQUIRED (ICS.PIBS)
    STATEMENT ((SYSTEM M1234.SYSTEM)
           AND
           (ICS.PIBS > 8))
    MESSAGE ("The order uses more ICS PIBS than is allowed
for this system.")
    CHECK.KEYWORDS (PIBS))
   )

(DEFCLASS IO.PIBS.CT (CTI)
   ()
   (METACLASS WARN-ON-SUCCESS.CT
    BIN.TYPES (SYSTEM)
    BIN.VARS.REQUIRED (IO.PIBS ICS.PIBS)
    STATEMENT ((SYSTEM M1234.SYSTEM)
           AND
           (IO.PIBS + ICS.PIBS > 12))
    MESSAGE ("The order uses more IO and ICS PIBS combined
than is allowed for this system.")
    CHECK.KEYWORDS (PIBS))
   )

(DEFCLASS MINUS5 (CTI)
   ()
   (METACLASS MODIFY-ON-SUCCESS.CT
    BIN.TYPES (SYSTEM)
    BIN.VARS.REQUIRED (POWER.SUPPLIED POWER.USED)
    STATEMENT ((SYSTEM M1234.SYSTEM)
           AND
           (POWER.USED:MINUS.5 - POWER.SUPPLIED:MINUS.5)
           > 250)
    MESSAGE ("The order uses more -5V power than is
supplied.")
    ADD-PARTS (QUOTE ((1 . 1234-F400)))
    CHECK.KEYWORDS (POWER))
   )

(DEFCLASS MP.FIRMWARE.CT (CTI)
   ()
   (METACLASS MODIFY-ON-SUCCESS.CT
    BIN.TYPES (FIRMWARE)
    BIN.VARS.REQUIRED (MP.ORDER)
    STATEMENT ((SYSTEM M1234.SYSTEM)
           AND MP.ORDER AND (NOT (ORDERED? '5640-F400)))
    MESSAGE ("All MP orders require MP firmware.")
    SET-PARTS (QUOTE ((1 . 5640-F400)))
    CHECK.KEYWORDS (REQUIREMENTS))
   )

(DEFCLASS MP.ISU.CT (CTI)
   ()
   (METACLASS WARN-ON-SUCCESS.CT
```

```
   BIN.TYPES (ISU)
   CHECK.KEYWORDS (REQUIREMENTS)
   STATEMENT ((SYSTEM M1234.SYSTEM )
         AND MP.ORDER AND (ISU-MEMORY.SUPPLIED < 40))
   BIN.VARS.REQUIRED (MP.ORDER ISU-MEMORY.SUPPLIED)
   MESSAGE (
"This MP order requires at least 40KB of ISU memory.
If this system will be running VS2 V03, please select 1234-
F122 or F132; otherwise, if it will be running VS2 V04,
please select 1234-F123 or F128."))
   )

(DEFCLASS MP.POWER-SUPPLY.CT (CTI)
   ()
   (METACLASS MODIFY-ON-SUCCESS.CT
    BIN.TYPES (POWER-SUPPLY)
    CHECK.KEYWORDS (REQUIREMENTS)
    STATEMENT ((SYSTEM M1234.SYSTEM)
         AND MP.ORDER AND (NOT (ORDERED? '(1234-F400 1234-
           K400))))
    BIN.VARS.REQUIRED (MP.ORDER)
    ADD-PARTS (QUOTE ((1 . 1234-F400)))
    MESSAGE ("This MP order requires an additional +5V power
supply."))
   )

(DEFCLASS PLUS5 (CTI)
   ()
   (METACLASS MODIFY-ON-SUCCESS.CT
    BIN.TYPES (SYSTEM)
    BIN.VARS.REQUIRED (POWER.SUPPLIED POWER.USED)
    STATEMENT ((SYSTEM M1234.SYSTEM)
         AND
         (POWER.USED:PLUS.5 - POWER.SUPPLIED:PLUS.5)
         > 60)
    MESSAGE ("The order uses more +5V power than is
supplied.")
    ADD-PARTS (QUOTE ((1 . 1234-F413)))
    CHECK.KEYWORDS (POWER))
   )

(DEFCLASS M1234.PIBS.CT1 (CTI)
   ()
   (METACLASS WARN-ON-SUCCESS.CT
    BIN.TYPES (SYSTEM)
    BIN.VARS.REQUIRED (TOTAL.PIBS)
    CHECK.KEYWORDS (PIBS)
    STATEMENT ((SYSTEM M1234.SYSTEM)
         AND
         (ORDERED? '1234-K926)
         AND
         (TOTAL.PIBS > 38))
    MESSAGE (
"The order includes a LH plenum and uses more than 38 PIBS;
this is not a legal order."))
   )
```

```
(DEFCLASS M1234.PIBS.CT2 (CTI)
   ()
   (METACLASS MODIFY-ON-SUCCESS.CT
    BIN.TYPES (SYSTEM)
    BIN.VARS.REQUIRED (TOTAL.PIBS)
    CHECK.KEYWORDS (PIBS)
    STATEMENT ((SYSTEM M1234.SYSTEM)
           AND
           (NOT (ORDERED? '1234-K926))
           AND
           (TOTAL.PIBS > 38))
    MESSAGE ("The order uses more than 38 PIBS; must add LH
 plenum.")
    ADD-PARTS (QUOTE ((1 . 1234-F441))))
   )
(* XTEST-NCTS definition)
(DEFINSTANCE XTEST-NCTS NCTS
   SET.OF XTESTKB
   FILED.ON XTESTNCT
   ELEMENTS (1024-INCREMENT 2-WAY-INTERLEAVING CT-LINES IOLC-
             LINES))
(DEFCLASS 1024-INCREMENT (CTI)
   ()
   (METACLASS MEMORY-INCREMENT.CT
    BIN.TYPES (MEMORY)
    STATEMENT ((SYSTEM M1234.SYSTEM)
           AND
           (NOT (INCREMENT MAIN-MEMORY.SUPPLIED 1024))))
   )
(DEFCLASS 2-WAY-INTERLEAVING (CTI)
   ()
   (METACLASS INTERLEAVING.CT
    BIN.TYPES (MEMORY)
    STATEMENT ((SYSTEM M1234.SYSTEM)
           AND
           (NOT (MEMORY.INTERLEAVING = '2-WAY))))
   )
(DEFCLASS CT-LINES (CTI)
   ()
   (METACLASS IO-LINES.CT
    BIN.TYPES (2STAGE-IO)
    STATEMENT ((SYSTEM M1234.SYSTEM)
           AND
           (NOT (BETWEEN #CT.LINES 0 6))))
   )
(DEFCLASS IOLC-LINES (CTI)
   ()
   (METACLASS IO-LINES.CT
    BIN.TYPES (2STAGE-IO)
    STATEMENT ((SYSTEM M1234.SYSTEM )
           AND
           (NOT (BETWEEN #IOLC.LINES 0 6))))
   )
```

```
(* XTEST-BVS definition)
(DEFINSTANCE XTEST-BVS BVS
   SET.OF XTESTKB
   FILED.ON XTESTNCT
   ELEMENTS (#CLC #CLC.MLA.LINES #CT.LINES #IOLC.LINES #MLA
             #TRUNK.LINES 59.POSITION.BACKPANEL
             BASIC.TO.PRICED CAP.PROCESSOR
             CLASS.MODEL.EXPANSION ICS.PIBS IO.PIBS
             ISU-MEMORY.SUPPLIED MAIN-MEMORY.SUPPLIED
             MEMORY.INTERLEAVING MEMORY.PIBS
             MP.ORDER MP.PIBS OPERATING.SYSTEM
             POWER.SUPPLIED POWER.USED TOTAL.PIBS))

(DEFCLASS #CLC (BVI)
   ()
   (METACLASS BIN.VAR
    BIN.TYPES (SYSTEM)
    DESCR "the number of CLC's"
    HOW.TO.DETERMINE (COMPUTE.#CLC)
    LEGAL.VALUES INTEGER)
   )

(DEFCLASS #CLC.MLA.LINES (BVI)
   ()
   (METACLASS BIN.VAR
    BIN.TYPES (SYSTEM)
    DESCR "the number of CLC/MLA lines for this order"
    HOW.TO.DETERMINE (COMPUTE.#CLC.MLA.LINES)
    LEGAL.VALUES (AND INTEGER (SATISFIES (LAMBDA (value)
                                         (BETWEEN value 0 20)))))
   )

(DEFCLASS #CT.LINES (BVI)
   ()
   (METACLASS BIN.VAR
    BIN.TYPES (SYSTEM)
    DESCR "the number of common trunk interface lines"
    HOW.TO.DETERMINE (COMPUTE.#CT.LINES)
    LEGAL.VALUES (AND INTEGER (SATISFIES (LAMBDA (value)
                                         (BETWEEN value 0 8)))))
   )

(DEFCLASS #IOLC.LINES (BVI)
   ()
   (METACLASS BIN.VAR
    BIN.TYPES (SYSTEM)
    DESCR "the number of IOLC interface lines"
    HOW.TO.DETERMINE (COMPUTE.#IOLC.LINES)
    LEGAL.VALUES (AND INTEGER (SATISFIES (LAMBDA (value)
                                         (BETWEEN value 0 8)))))
   )

(DEFCLASS #MLA (BVI)
   ()
   (METACLASS BIN.VAR
    BIN.TYPES (SYSTEM)
```

```
       DESCR "the number of MLA's"
       HOW.TO.DETERMINE (COMPUTE.#MLA)
       LEGAL.VALUES INTEGER)
    )

(DEFCLASS #TRUNK.LINES (BVI)
   ()
   (METACLASS BIN.VAR
    BIN.TYPES (SYSTEM)
    DESCR "the number of standard IO lines for this order"
    HOW.TO.DETERMINE (COMPUTE.#TRUNK.LINES)
    LEGAL.VALUES (AND INTEGER (SATISFIES (LAMBDA (value)
                                       (BETWEEN value 0 8))))
   )

(DEFCLASS 59.POSITION.BACKPANEL (BVI)
   ()
   (METACLASS BIN.VAR
    BIN.TYPES (SYSTEM)
    DESCR "this order will use a 59-position backpanel (T/N >
          1762)"
    HOW.TO.DETERMINE (COMPUTE.59.POSITION.BACKPANEL)
    LEGAL.VALUES BOOLEAN)
   )

(DEFCLASS BASIC.TO.PRICED (BVI)
   ()
   (METACLASS BIN.VAR
    BIN.TYPES (SYSTEM)
    DESCR "the basic-to-priced parts"
    HOW.TO.DETERMINE (COMPUTE.BASIC.TO.PRICED)
    LEGAL.VALUES PRODUCT.QTYS)
   )

(DEFCLASS CAP.PROCESSOR (BVI)
   ()
   (METACLASS BIN.VAR
    BIN.TYPES (SYSTEM)
    DESCR "this is a CAP processor"
    HOW.TO.DETERMINE (ASK.BOOLEAN.QUESTION)
    LEGAL.VALUES BOOLEAN)
   )

(DEFCLASS CLASS.MODEL.EXPANSION (BVI)
   ()
   (METACLASS BIN.VAR
    BIN.TYPES (SYSTEM)
    DESCR "the class model parts"
    HOW.TO.DETERMINE (COMPUTE.CLASS.MODEL.EXPANSION)
    LEGAL.VALUES PRODUCT.QTYS)
   )
```

```
(DEFCLASS ICS.PIBS (BVI)
   ()
   (METACLASS BIN.VAR
    BIN.TYPES (SYSTEM)
    DESCR "PIBS required for CLC/MLA"
    HOW.TO.DETERMINE (COMPUTE.ICS.PIBS)
    LEGAL.VALUES INTEGER)
   )

(DEFCLASS IO.PIBS (BVI)
   ()
   (METACLASS BIN.VAR
    BIN.TYPES (SYSTEM)
    DESCR "PIBS required for IOLC and common trunk"
    HOW.TO.DETERMINE (COMPUTE.IO.PIBS)
    LEGAL.VALUES INTEGER)
   )

(DEFCLASS ISU-MEMORY.SUPPLIED (BVI)
   ()
   (METACLASS BIN.VAR
    BIN.TYPES (SYSTEM)
    DESCR "the ISU memory supplied with this order (in KB)"
    HOW.TO.DETERMINE (COMPUTE.ISU-MEMORY.SUPPLIED)
    LEGAL.VALUES INTEGER)
   )

(DEFCLASS MAIN-MEMORY.SUPPLIED (BVI)
   ()
   (METACLASS BIN.VAR
    BIN.TYPES (SYSTEM)
    DESCR "the main memory supplied with this order (in KB)"
    HOW.TO.DETERMINE (COMPUTE.MAIN-MEMORY.SUPPLIED)
    LEGAL.VALUES INTEGER)
   )

(DEFCLASS MEMORY.INTERLEAVING (BVI)
   ()
   (METACLASS BIN.VAR
    BIN.TYPES (SYSTEM)
    DESCR "the memory interleaving for this order"
    HOW.TO.DETERMINE (COMPUTE.MEMORY.INTERLEAVING)
    LEGAL.VALUES (AND ATOM (MEMBEROF (1-WAY 2-WAY 4-WAY))))
   )

(DEFCLASS MEMORY.PIBS (BVI)
   ()
   (METACLASS BIN.VAR
    BIN.TYPES (SYSTEM)
    DESCR "PIBS required for main memory w/o extra plenums"
    HOW.TO.DETERMINE (COMPUTE.MEMORY.PIBS)
    LEGAL.VALUES INTEGER)
   )
```

```
(DEFCLASS MP.ORDER (BVI)
   ()
   (METACLASS BIN.VAR
    BIN.TYPES (SYSTEM)
    DESCR "this is a multi-processing order"
    HOW.TO.DETERMINE (COMPUTE.MP.ORDER)
    LEGAL.VALUES BOOLEAN)
   )
(DEFCLASS MP.PIBS (BVI)
   ()
   (METACLASS BIN.VAR
    BIN.TYPES (SYSTEM)
    DESCR "PIBS required for MP kits"
    HOW.TO.DETERMINE (COMPUTE.MP.PIBS)
    LEGAL.VALUES INTEGER)
   )

(DEFCLASS OPERATING.SYSTEM (BVI)
   ()
   (METACLASS ENUMERATED.BIN.VAR
    BIN.TYPES (SYSTEM)
    DESCR "the operating system for this order"
    ENUMERATED.SET (RS-1 VS-1 MP))
   )

(DEFCLASS POWER.SUPPLIED (BVI)
   ()
   (METACLASS BIN.VAR
    BIN.TYPES (SYSTEM)
    DESCR "the power supplied for this order"
    HOW.TO.DETERMINE (COMPUTE.POWER.SUPPLIED)
    LEGAL.VALUES POWER.SPEC)
   )

(DEFCLASS POWER.USED (BVI)
   ()
   (METACLASS BIN.VAR
    BIN.TYPES (SYSTEM)
    DESCR "the power used by this order"
    HOW.TO.DETERMINE (COMPUTE.POWER.USED)
    LEGAL.VALUES POWER.SPEC)
   )

(DEFCLASS TOTAL.PIBS (BVI)
   ()
   (METACLASS BIN.VAR
    BIN.TYPES (SYSTEM)
    DESCR "the total PIBS required for this order"
    HOW.TO.DETERMINE (COMPUTE.TOTAL.PIBS)
    LEGAL.VALUES INTEGER)
   )
```

```
(* XTEST-BVMS definition)
(DEFINSTANCE XTEST-BVMS BVMS
   SET.OF XTESTKB
   FILED.ON XTESTNCT
   ELEMENTS (COMPUTE.#CLC COMPUTE.#CLC.MLA.LINES
             COMPUTE.#CT.LINES COMPUTE.#IOLC.LINES
             COMPUTE.#MLA COMPUTE.#TRUNK.LINES
               COMPUTE.59.POSITION.BACKPANEL
             COMPUTE.BASIC.TO.PRICED
               COMPUTE.CLASS.MODEL.EXPANSION
                 COMPUTE.ICS.PIBS
             COMPUTE.IO.PIBS COMPUTE.ISU-MEMORY.SUPPLIED
             COMPUTE.MAIN-MEMORY.SUPPLIED
               COMPUTE.MEMORY.INTERLEAVING
             COMPUTE.MEMORY.PIBS COMPUTE.MP.ORDER
               COMPUTE.MP.PIBS
               COMPUTE.POWER.SUPPLIED COMPUTE.POWER.USED
               COMPUTE.TOTAL.PIBS
             COMPUTE.SYSTEM.TYPE ELIMINATE.BTP INCREMENT))

(DEFKBFUN COMPUTE.#CLC ()                  (* edited: "10-AUG-83
                                                         20:34")
   ((COUNT.PARTS '1234-K905 T)+(COUNT.PARTS '1234-K900 T)))

(DEFKBFUN COMPUTE.#CLC.MLA.LINES ()        (* edited: "10-AUG-83
                                                         20:41")
   ((FETCH '#CLC)+ 4*(FETCH '#MLA)))

(DEFKBFUN COMPUTE.#CT.LINES ()             (* jst: " 3-AUG-83
                                                         10:57")
   (COUNT.PARTS '1234-K930))

(DEFKBFUN COMPUTE.#IOLC.LINES ()           (* jst: " 3-AUG-83
                                                         10:57")
   (COUNT.PARTS '1234-K935))

(DEFKBFUN COMPUTE.#MLA ()                  (* edited: "10-AUG-83
                                                         20:34")
   (COUNT.PARTS '1234-K901 T))

(DEFKBFUN COMPUTE.#TRUNK.LINES ()          (* jst: " 3-AUG-83
                                                         10:57")
   ((COUNT.PARTS '1234-K931)+(COUNT.PARTS '1234-
          K932)+(COUNT.PARTS '1234-K933)))

(DEFKBFUN COMPUTE.59.POSITION.BACKPANEL (BVI)   (* jsb: "31-
                                                       DEC-00 17:14")
     (IF (FETCH 'TRACER.NUMBER T) IS NUMERIC
         THEN (IF (FETCH 'TRACER.NUMBER) > 1762
             THEN T
           ELSE NIL)
       ELSE (ASK.BOOLEAN.QUESTION BVI)))

(DEFKBFUN COMPUTE.BASIC.TO.PRICED ()            (* jsb: "31-
                                                       DEC-00 17:14")
```

```
(SANDC (FIND 'ONE 'CCS '(ISA BU.M12))
   'GET.BASIC.TO.PRICED))

(DEFKBFUN COMPUTE.CLASS.MODEL.EXPANSION ()         (* edited:
                                                   "11-AUG-83 06:02")
   (PROG (CTS:(LISTOF CONSTRAINT)
      CT:CONSTRAINT)
         (CTS :=(SANDC (FIND 'ONE 'CCS '(ISA BU.M12))
            'GET.EXPANSION.CTS))
         (IF CTS
          THEN (CT :=(SAND (CAR CTS)
             'GET.TO)))
         (RETURN CT)))
(DEFKBFUN COMPUTE.ICS.PIBS ()   (* edited: "10-AUG-83 20:39")
   (PROG (ANS:INTEGER)
         (ANS :=(FETCH '#CLC)+(FETCH '#MLA))
         (IF (IREMAINDER ANS 2)= 1
          THEN (ANS := ANS + 1))
         (RETURN ANS)))

(DEFKBFUN COMPUTE.IO.PIBS ()    (* edited: "11-AUG-83 02:12")
   (2*(FETCH '#TRUNK.LINES)))

(DEFKBFUN COMPUTE.ISU-MEMORY.SUPPLIED ()       (* jst: " 3-AUG-
                                                  83 10:57")
   (2*(COUNT.PARTS '1234-K912)+ 8*(COUNT.PARTS '1234-K913)+
                        32*(COUNT.PARTS '1234-K909)))

(DEFKBFUN COMPUTE.MAIN-MEMORY.SUPPLIED ()      (* jst: " 3-AUG-
                                                  83 10:57")
   (256*(COUNT.PARTS '1234-K924)+ 64*(COUNT.PARTS '1234-
                                                  K922)))

(DEFKBFUN COMPUTE.MEMORY.INTERLEAVING ()       (* edited: "11-
                                                  AUG-83 06:19")
   (SELECTQ (COUNT.PARTS '1234-K921)
         (1 '1-WAY)
         (2 '2-WAY)
         ((4 0)
           '4-WAY)
         (SHOULDNT)))

(DEFKBFUN COMPUTE.MEMORY.PIBS ()  (* jst: "26-JUL-83 02:02")
   (2*(COUNT.PARTS '1234-K924)))

(DEFKBFUN COMPUTE.MP.ORDER ()     (* jst: "11-AUG-83 07:39")
   (IF (FIND 'ONE 'CCS '(IMPLEMENTS MULTIPROCESSING)) OR
(ORDERED? '5640-F400 T)
       THEN T
    ELSE NIL))

(DEFKBFUN COMPUTE.MP.PIBS ()    (* edited: "11-AUG-83 01:11")
   ((COUNT.PARTS '1234-K917)+(COUNT.PARTS '1212-C003-0091)+
2*(COUNT.PARTS '1401-C058-0090)))
```

```
(DEFKBFUN COMPUTE.POWER.SUPPLIED ()    (* edited: "10-AUG-83
                                                   07:54")
   (PROG (POWER.PART:POWER.SPEC SUM:POWER.SPEC)
         (SUM :=(SEND SUM NEW.SELF))
         (FOR POWER.SUPPLY IN '(1234-F400 1234-F413 1234-
               F396) WHEN (ORDERED? POWER.SUPPLY T)
             DO (SUM +(SAND POWER.SUPPLY 'GET.POWER)))
         (RETURN SUM:INVERTED)))

(DEFKBFUN COMPUTE.POWER.USED ()    (* jst: "11-AUG-83 07:42")
   (PROG (SUM:POWER.SPEC IO:NUMBER MEM:NUMBER CLC:NUMBER
               MLA:NUMBER FUDGE:NUMBER)
         (SUM :=(SEND SUM NEW.SELF))
         (MEM :=(FETCH 'MAIN-MEMORY.SUPPLIED)/ 256)
         (IO  :=(FETCH '#TRUNK.LINES))
         (CLC :=(FETCH '#CLC))
         (MLA :=(FETCH '#MLA))

(FUDGE :=(SELECTQ (FETCH 'SYSTEM.TYPE)
                       (M1234.SYSTEM 180.0)
                       (SHOULDNT)))
         (SUM:MINUS.5 := FUDGE + 2.0*MEM + 15.0*IO + 2.0*CLC
                 + 0.0*MLA)
         (SUM:PLUS.5 := 6.0 + 1.5*MEM + 7.5*IO + 2.0*CLC +
                 4.0*MLA)
         (RETURN SUM)))

(DEFKBFUN COMPUTE.TOTAL.PIBS ()    (* edited: "11-AUG-83
                                                   05:42")
   (PROG (BASIC:NUMBER MEM:NUMBER PERF:BOOLEAN LH:BOOLEAN
                     RH:BOOLEAN)
         (MEM :=(COUNT.PARTS '1234-K924 T))
         (BASIC :=(FETCH 'MP.PIBS)+(FETCH 'IO.PIBS)+(FETCH
                 'ICS.PIBS))
         (PERF :=(ORDERED? '1234-K941 T))
         (LH  :=(ORDERED? '1234-K926 T))
         (RH  :=(ORDERED? '1234-K928 T))
         (RETURN (SELECTQ (FETCH 'SYSTEM.TYPE)
                   ((M1234.SYSTEM)
                       (10 + BASIC +(IF LH
                                       THEN 0
                                       ELSE MEM)))
                   (SHOULDNT)))))

(DEFKBFUN COMPUTE.SYSTEM.TYPE ()   (* jsb: " 7-AUG-83 20:04")
   (PROG (SYSTEM:FUNCTION!CLASS)
         (IF (SYSTEM :=(FIND 'ONE 'CCS '(AND (ISA BG)
                                       (IMPLEMENTS SYSTEM))))
            THEN (SYSTEM :=(SANDC SYSTEM 'GET.IMPLEMENTS.FN))
          ELSEIF (SYSTEM :=(FIND 'ONE 'CCS '(ISA BU.M12)))
            THEN (SYSTEM :=(SANDC SYSTEM 'GET.IMPLEMENTS.FN)))
         (IF SYSTEM IS NULL
            THEN (printout T
```

```
              "I can't find either a basic group or a class model.
            I will configure this order as a generic M1234 system."
                                          T)
                    (SYSTEM := 'SYSTEM))
          (RETURN SYSTEM)))

(DEFKBFUN ELIMINATE.BTP (CURRENT.CONTENTS:PRODUCT.QTYS)
                                         (* jsb: "26-JAN-84 09:34")
    (PROG (CMPARTS:PRODUCT.QTYS REMOVE.PARTS:PRODUCT.QTYS
           REMAINING.PARTS:PRODUCT.QTYS
        PART:PRODUCT.QTY CMPART:PRODUCT.QTY WORKING.PARTS:
           PRODUCT.QTYS)
        (CMPARTS :=(FETCH 'CLASS.MODEL.EXPANSION T))
        (REMOVE.PARTS :=(FOR PART IN CURRENT.CONTENTS WHEN
             (CMPART :=(SEND CMPARTS MEMBER PART))
      COLLECT (A PRODUCT.QTY WITH NAME = PART:NAME QTY
             =(MAX PART:QTY
              CMPART:QTY))))
       (WORKING.PARTS :=(COPY CURRENT.CONTENTS))
       (REMAINING.PARTS :=(SEND WORKING.PARTS SUBTRACT
             REMOVE.PARTS))
       (PART :=(CAR REMAINING.PARTS))
       (IF (CDR REMAINING.PARTS) IS NULL AND PART:QTY = 1
             THEN (RETURN REMOVE.PARTS)
        ELSE (WORKING.PARTS :=(COPY CURRENT.CONTENTS))
             (RETURN (SEND WORKING.PARTS SUBTRACT (CHOOSE.ONE
              REMAINING.PARTS))))))

(DEFKBFUN INCREMENT (VALUE:INTEGER INCREMENT:INTEGER)
                                          (* jsb: " 3-AUG-83 10:57")
    ((IREMAINDER VALUE INCREMENT)
     IS ZERO))
```

APPENDIX II (E)

KNOWLEDGE BASE FOR M1234 COMPUTER
EXPANSION RULES

```
(* XTEST-ECTS definition)
(DEFINSTANCE XTEST-ECTS ECTS
   SET.OF XTESTKB
   FILED.ON XTESTEX
   ELEMENTS (1234-0066-0690.ECT1 1234-3003-0690.ECT.1 1234-
           F113.ECT.1 1234-F262.E CT.1 1234-F290.ECT.1
           1234-F360.ECT.1 1234-F361.ECT1 1234-F362.ECT1
           1234-F400.ECT 1234-F413.ECT.1 1234-F504.ECT.1
           1234-F510.ECT1 1234-F545.ECT1 1234-F680.ECT.1
           1234-F690.ECT.1 1234-F690.ECT.2 1234-F691.ECT1
           1234-K400.ECT1 1234-P413.ECT 1234-P723.ECT.1
           1234-P724.ECT.1 1234-P742.ECT.1 1234-
           P743.ECT.1 1234-P954.ECT.1 1234-P955.ECT.1
           M1234-II.ECT.1))
```

```
(DEFCLASS 1234-0066-0690.ECT1 (CTI)
   ()
   (METACLASS ALWAYS.EXPAND.CT
    FROM 1234-0066-0690
    TO ((3 . 1234-K913-V001)
        (1 . 1234-K920-V002)
        (1 . 1234-K450-V001)
        (1 . 1234-K915-V001)
        (1 . 1234-K917-V001)
        (1 . 1234-K921-V003)
        (2 . 1234-K924-V001)
        (3 . 1234-K940-V001)))
   )

(DEFCLASS 1234-3003-0690.ECT.1 (CTI)
   ()
   (METACLASS ALWAYS.EXPAND.CT
    FROM 1234-3003-0690
    TO ((1 . 1234-F262)
        (1 . 1234-F113)
        (1 . 1234-K915)
        (1 . 1234-K450)
        (1 . 1234-K917)
        (1 . 1234-K416)
        (1 . 1234-K941)))
   )

(DEFCLASS 1234-F113.ECT.1 (CTI)
   ()
   (METACLASS ALWAYS.EXPAND.CT
    FROM 1234-F113
    TO ((2 . 1234-K940)
        (3 . 1234-K913)))
   )

(DEFCLASS 1234-F262.ECT.1 (CTI)
   ()
   (METACLASS ALWAYS.EXPAND.CT
    FROM 1234-F262
    TO ((2 . 1234-K920)
        (2 . 1234-K921)
        (4 . 1234-K924)
        (2 . 1234-K940)))
   )

(DEFCLASS 1234-F290.ECT.1 (CTI)
   ()
   (METACLASS ALWAYS.EXPAND.CT
    FROM 1234-F290
    TO ((4 . 1234-K920)
        (2 . 1234-K921)
        (8 . 1234-K924)
        (2 . 1234-K940)))
   )
```

```
(DEFCLASS 1234-F360.ECT.1 (CTI)
   ()
   (METACLASS ALWAYS.EXPAND.CT
    FROM 1234-F360
    TO ((1 . 1234-K931)))
   )

(DEFCLASS 1234-F361.ECT1 (CTI)
   ()
   (METACLASS ALWAYS.EXPAND.CT
    FROM 1234-F361
    TO ((2 . 1234-K931)))
   )

(DEFCLASS 1234-F362.ECT1 (CTI)
   ()
   (METACLASS ALWAYS.EXPAND.CT
    FROM 1234-F362
    TO ((3 . 1234-K931)))
   )

(DEFCLASS 1234-F400.ECT (CTI)
   ()
   (METACLASS ALWAYS.EXPAND.CT
    TO ((1 . 1234-K400))
    FROM 1234-F400)
   )

(DEFCLASS 1234-F413.ECT.1 (CTI)
   ()
   (METACLASS ALWAYS.EXPAND.CT
    FROM 1234-F413
    TO ((1 . 1234-K413)))
   )

(DEFCLASS 1234-F504.ECT.1 (CTI)
   ()
   (METACLASS ALWAYS.EXPAND.CT
    FROM 1234-F504
    TO ((1 . 1234-K905)
        (1 . 1234-K901)
        (1 . 1234-K903)))
   )

(DEFCLASS 1234-F510.ECT1 (CTI)
   ()
   (METACLASS ALWAYS.EXPAND.CT
    FROM 1234-F510
    TO ((2 . 1234-K905)
        (2 . 1234-K901)
        (2 . 1234-K903)))
   )
```

```
(DEFCLASS 1234-F545.ECT1 (CTI)
   ( )
   (METACLASS ALWAYS.EXPAND.CT
    FROM 1234-F545
    TO ((1 . 1234-K545)))
   )

(DEFCLASS 1234-F680.ECT.1 (CTI)
   ( )
   (METACLASS ALWAYS.EXPAND.CT
    FROM 1234-F680
    TO ((1 . 1234-K930)))
   )

(DEFCLASS 1234-F690.ECT.1 (CTI)
   ( )
   (METACLASS ALWAYS.EXPAND.CT
    FROM 1234-F690
    TO ((1 . 1234-K935)
        (1 . 1234-K936)
        (1 . 1234-K937)))
   )

(DEFCLASS 1234-F690.ECT.2 (CTI)
   ( )
   (METACLASS EXPANSION.CT
    FROM 1234-F690
    TO ((1 . 1234-K935)
        (1 . 1234-K936)
        (1 . 1234-K939))
    BIN.VARS.REQUIRED (TRACER.NUMBER)
    WHEN (TRACER.NUMBER <= 1769))
   )

(DEFCLASS 1234-F691.ECT1 (CTI)
   ( )
   (METACLASS ALWAYS.EXPAND.CT
    FROM 1234-F691
    TO ((2 . 1234-K935)
        (2 . 1234-K936)
        (2 . 1234-K937)))
   )

(DEFCLASS 1234-K400.ECT1 (CTI)
   ( )
   (METACLASS ALWAYS.EXPAND.CT
    TO ((1 . 1234-K400-V001))
    FROM 1234-K400)
   )
```

```
(DEFCLASS 1234-P413.ECT (CTI)
  ()
  (METACLASS ALWAYS.EXPAND.CT
   FROM 1234-P413
   TO ((1 . 1234-F413)))
  )

(DEFCLASS 1234-P723.ECT.1 (CTI)
  ()
  (METACLASS ALWAYS.EXPAND.CT
   FROM 1234-P723
   TO ((1 . 1234-F290)))
  )

(DEFCLASS 1234-P724.ECT.1 (CTI)
  ()
  (METACLASS ALWAYS.EXPAND.CT
   FROM 1234-P724
   TO ((1 . 1234-F295)))
  )

(DEFCLASS 1234-P742.ECT.1 (CTI)
  ()
  (METACLASS ALWAYS.EXPAND.CT
   FROM 1234-P742
   TO ((1 . 1234-F360)
       (1 . 1234-F680)))
  )

(DEFCLASS 1234-P743.ECT.1 (CTI)
  ()
  (METACLASS ALWAYS.EXPAND.CT
   FROM 1234-P743
   TO ((1 . 1234-F360)
       (1 . 1234-F690)))
  )

(DEFCLASS 1234-P954.ECT.1 (CTI)
  ()
  (METACLASS ALWAYS.EXPAND.CT
   FROM 1234-P954
   TO ((1 . 1234-F504)))
  )

(DEFCLASS 1234-P955.ECT.1 (CTI)
  ()
  (METACLASS ALWAYS.EXPAND.CT
   FROM 1234-P955
   TO ((1 . 1234-F504)))
  )
```

```
(DEFCLASS M1234-II.ECT.1 (CTI)
  ()
  (METACLASS ALWAYS.EXPAND.CT
   FROMM1234-II
   TO ((1 . 1234-3003-0690)))
  )
```

APPENDIX III (A)

MINICOMPUTER ORDER CHECKING TYPESCRIPT (MINI) COAST executive> RUN

Evaluating: (INPUT.ORDER)

Processing new order...
Enter name of order file: T
Reading order information...
Order information>
Reading parts to check...
Order line> 1 MINI-1000
Order line> 4 RAM-1000
Order line> 3 ROM-1000
Order line> 4 TERMINAL-1000
Order line> 3 DISC-1000
Order line>
Reading parts to be shipped F/S...
F/S order line>
Enter order processing options: SHOW-FULL-TRACE
   Adding the following parts: 1 MINI-1000, 4 RAM-1000, 3 ROM-1000, 4 TERMINAL-1000 and 3 DISC-1000

Evaluating: (DETERMINE '(TODAYS.DATE ORDERED.PARTS ORDERED.PRODUCT.LINE))
Today's date of original components is set to: 20-Jun-84
The ordered set of parts of original components is set to: MINI-1000, RAM-1000, ROM-1000, TERMINAL-1000 and DISC-1000
The ordered product line of original components is set to: minicomputer components Evaluating: (IF CHECKING.ORDER
           THEN   COMMENT
                (CONFIGURE (FETCH
                  'ORDERED.PRODUCT.LINE)
                      (FIND 'ALL 'CCS))
              (CHECK 'EMPTY.BIN))

Configuring minicomputer components
    Initial parts are: 1 MINI-1000, 4 RAM-1000, 3 ROM-1000, 4 TERMINAL-1000 and 3 DISC-1000

Evaluating: [CONFIGURE 'MAIN-FRAME (FIND 'ALL 'CCS
            '(IMPLEMENTS MAIN-FRAME]

Configuring mainframe components
   Initial parts are: 4 RAM-1000, 3 ROM-1000, 4
   TERMINAL-1000 and 3 DISC-1000

Evaluating: [CONFIGURE 'CPU (FIND 'ALL 'CCS
                  '(IMPLEMENTS CPU]

Configuring cpu components
      No initial parts

Evaluating: (CHECK 'REQUIREMENTS)
         Checking REQUIREMENTS constraints in cpu
            components
            The following constraints apply: AT-MOST-
               ONE.CT NO-PARTS.CT
         Checking constraint: AT-MOST-ONE.CT (a MODIFY-
            ON-SUCCESS.CT)

The statement: ((COUNT CONTENTS)
                         > 1)
         failed with value NIL when applied to cpu
            components
         Checking constraint: NO-PARTS.CT (a MODIFY-ON-
            SUCCESS.CT)

The statement: ((COUNT CONTENTS)
                         IS ZERO)
         succeeded with value T when applied to cpu
            components
Adding required component to CPU.1
Adding 1 CPU-1000 to cpu components ; OK? YES
         Adding the following parts: 1 CPU-1000

Evaluating: [CONFIGURE 'MEMORY (FIND 'ALL 'CCS
                  '(IMPLEMENTS MEMORY]

Configuring memory components
      Initial parts are: 4 RAM-1000 and 3 ROM-1000

Evaluating: [CONFIGURE 'RAM (FIND 'ALL 'CCS
                     '(IMPLEMENTS RAM]

Configuring random access memory components
         Initial parts are: 4 RAM-1000

Evaluating: (CHECK 'REQUIREMENTS)
            Checking REQUIREMENTS constraints in random
               access memory components
               The following constraints apply: NO-
                  PARTS.CT Checking constraint: NO-PARTS.CT (a MODIFY-ON-SUCCESS.CT)

The statement: ((COUNT CONTENTS)
                 IS ZERO)
failed with value NIL when applied to random access memory components.

Evaluating: [CONFIGURE 'ROM (FIND 'ALL 'CCS
            '(IMPLEMENTS ROM]

Configuring read-only memory components
  Initial parts are: 3 ROM-1000

Evaluating: (CHECK 'REQUIREMENTS)
    Checking REQUIREMENTS constraints in read-only memory components
      The following constraints apply: NO-PARTS.CT
    Checking constraint: NO-PARTS.CT (a MODIFY-ON-SUCCESS.CT)

The statement: ((COUNT CONTENTS)
                       IS ZERO)
      failed with value NIL when applied to read-only memory components Evaluating: (CHECK 'REQUIREMENTS)
Checking REQUIREMENTS constraints in memory components
  The following constraints apply: MEMORY.CT1
Checking constraint: MEMORY.CT1 (a WARN-ON-SUCCESS.CT)
The number of ram boards ordered of minicomputer components is set to: 4
The number of rom boards ordered of minicomputer components is set to: 3

The statement: (#RAM + #ROM > 7)
  failed with value NIL when applied to memory components Evaluating: [CONFIGURE 'IO (FIND 'ALL 'CCS
            '(IMPLEMENTS IO]

Configuring I/O components
  Initial parts are: 4 TERMINAL-1000 and 3 DISC-1000

Evaluating: [CONFIGURE 'TERMINAL (FIND 'ALL 'CCS
                '(IMPLEMENTS TERMINAL]

Configuring terminal components
   Initial parts are: 4 TERMINAL-1000

Evaluating: (CHECK 'REQUIREMENTS)
   Checking REQUIREMENTS constraints in terminal
      components
      The following constraints apply: NO-
         PARTS.CT MAX.TERMINALS.CT
   Checking constraint: NO-PARTS.CT (a MODIFY-
      ON-SUCCESS.CT)

The statement: ((COUNT CONTENTS)
                    IS ZERO)
      failed with value NIL when applied to
      terminal components
   Checking constraint: MAX.TERMINALS.CT (a
      MODIFY-ON-SUCCESS.CT)

The statement: ((COUNT CONTENTS)
                    > 4)
      failed with value NIL when applied to
      terminal components Evaluating: [CONFIGURE 'DISC (FIND 'ALL 'CCS
             '(IMPLEMENTS DISC]

Configuring disk drive components
   Initial parts are: 3 DISC-1000

Evaluating: (CHECK 'REQUIREMENTS)
   Checking REQUIREMENTS constraints in disk
      drive components
      No REQUIREMENTS constraints were found.

Evaluating: (DETERMINE '(IF-CARDS.NEEDED))
The number of discs ordered of I/O components is
   set to: 3
The number of interface cards required for this
   order of I/O components is set to: 4

Evaluating: [CONFIGURE 'INTERFACE (FIND 'ALL
             'CCS '(IMPLEMENTS INTERFACE]

Configuring interface components
   No initial parts

Evaluating: (CHECK 'REQUIREMENTS)
   Checking REQUIREMENTS constraints in
      interface components
      The following constraints apply: IF.REQ.CT1

Checking constraint: IF.REQ.CT1 (a MODIFY-ON-SUCCESS.CT)

The statement: (IF-CARDS.NEEDED = CONTENTS)
succeeded with value T when applied to interface components
You have not ordered the minimum number of interface cards.
Replacing contents of interface components with 4 IF-1000
; OK? YES
Removing the following parts:
Adding the following parts: 4 IF-1000

Evaluating: [CONFIGURE 'CARD-CAGE (FIND 'ALL 'CCS '(IMPLEMENTS CARD-CAGE]

Configuring card cage components
  No initial parts

Evaluating: (CHECK 'REQUIREMENTS)
    Checking REQUIREMENTS constraints in card cage components
      The following constraints apply: AT-MOST-ONE.CT NO-PARTS.CT
    Checking constraint: AT-MOST-ONE.CT (a MODIFY-ON-SUCCESS.CT)

The statement:_((COUNT CONTENTS)
                    > 1)
    failed with value NIL when applied to card cage components
    Checking constraint: NO-PARTS.CT (a MODIFY-ON-SUCCESS.CT)

The statement: ((COUNT CONTENTS)
                    IS ZERO)
    succeeded with value T when applied to card cage components
Adding required component to CARD-CAGE.1
Adding 1 CAGE-1000 to card cage components ; OK? YES
    Adding the following parts: 1 CAGE-1000

Evaluating: (CHECK 'REQUIREMENTS)
    Checking REQUIREMENTS constraints in mainframe components
      The following constraints apply: MAINFRAME.CT.1
    Checking constraint: MAINFRAME.CT.1 (a WARN-ON-SUCCESS.CT)
    The number of interface cards of minicomputer components is set to: 3

The statement: (#ROM + #RAM + #IF-CARDS + 1 > 16)
    failed with value NIL when applied to mainframe components Evaluating: [CONFIGURE 'POWER-SUPPLY (FIND 'ALL 'CCS
          '(IMPLEMENTS POWER-SUPPLY]

Configuring power supply components
    No initial parts

Evaluating: (CHECK 'CONTENTS)
      Checking CONTENTS constraints in power supply
          components
        The following constraints apply: PS.AMBIGUOUS.CT
      Checking constraint: PS.AMBIGUOUS.CT (a MODIFY-ON-
            SUCCESS.CT)

The statement: ((COUNT CONTENTS)
                        > 1)
          failed with value NIL when applied to power
            supply components Evaluating: (CHECK 'REQUIREMENTS)
      Checking REQUIREMENTS constraints in power supply
          components
        The following constraints apply: PS.REQ.CT1
          PS.REQ.CT2 PS.REQ.CT3
      Checking constraint: PS.REQ.CT1 (a MODIFY-ON-
            SUCCESS.CT)
      The power required to operate this order of
          minicomputer components is set to: 8.3

The statement: (POWER.NEEDED <= 5 AND (NOT
                            (ORDERED? 'SUPPLY-05 T)))
          failed with value NIL when applied to power
            supply components
      Checking constraint: PS.REQ.CT2 (a MODIFY-ON-
            SUCCESS.CT)

The statement: [POWER.NEEDED > 5 AND POWER.NEEDED
                    <= 10 AND (NOT (ORDERED? 'SUPPLY-10]
          succeeded with value T when applied to power
            supply components
  Adding 1 SUPPLY-10 to power supply components ; OK? YES
        Adding the following parts: 1 SUPPLY-10
        Checking constraint: PS.REQ.CT3 (a MODIFY-ON-
            SUCCESS.CT)

The statement: [POWER.NEEDED > 10 AND
          POWER.NEEDED <= 15 AND (NOT
            (ORDERED? 'SUPPLY-15]
          failed with value NIL when applied to power
            supply components
      Checking EMPTY.BIN constraints in power supply
          components
        The following constraints apply:
          UNASSIGNED.EMPTY.CT
      Checking constraint: UNASSIGNED.EMPTY.CT (a WARN-
          ON-SUCCESS.CT)

The statement: (BIN:CONTENTS IS NOT NULL)
failed with value NIL when applied to original
components Evaluating: (DETERMINE '(FINAL.PARTS))
The final set of parts of original components is set to:
MINI-1000, CPU-1000, RAM-1000, ROM-1000, TERMINAL-1000,
DISC-1000, IF-1000, CAGE-1000 and SUPPLY-10

Evaluating: (OUTPUT.ORDER)
What type of output form would you like: FINAL.PARTS

| | |
|---|---|
| 1 | CPU-1000 |
| 4 | RAM-1000 |
| 3 | ROM-1000 |
| 4 | TERMINAL-1000 |
| 3 | DISC-1000 |
| 4 | IF-1000 |
| 1 | CAGE-1000 |
| 1 | SUPPLY-10 |

What type of output form would you like:
Do you want to use this order to reconfigure something in finished goods?
Would you like an explanation of this order?

APPENDIX III (B)

MINICOMPUTER DESIGN TYPESCRIPT (MINI) COAST executive> RUN

Evaluating: (INPUT.ORDER)

Processing new order...
Enter name of order file: T
Reading order information...
Order information>
Reading parts to check...
Order line> 1 MINI-1000
Order line>
Reading parts to be shipped F/S...
F/S order line>
Enter order processing options: SHOW-FULL-TRACE
  Adding the following parts: 1 MINI-1000

Evaluating: (DETERMINE '(TODAYS.DATE ORDERED.PARTS
                          ORDERED.PRODUCT.LINE))
  Today's date of original components is set to: 20-Jun-84
  The ordered set of parts of original components is set
      to: MINI-1000
  The ordered product line of original components is set
      to: minicomputer components

```
Evaluating: (IF CHECKING.ORDER
            THEN   COMMENT
                     (CONFIGURE (FETCH
                        'ORDERED.PRODUCT.LINE)
                                (FIND 'ALL 'CCS))
                   (CHECK 'EMPTY.BIN))
```

Configuring minicomputer components
   Initial parts are: 1 MINI-1000

Evaluating: [CONFIGURE 'MAIN-FRAME (FIND 'ALL 'CCS
               '(IMPLEMENTS MAIN-FRAME]

Configuring mainframe components
      No initial parts

Evaluating: [CONFIGURE 'CPU (FIND 'ALL 'CCS
                  '(IMPLEMENTS CPU]
      Configuring cpu components
         No initial parts Evaluating: (CHECK 'REQUIREMENTS)
         Checking REQUIREMENTS constraints in cpu
            components
            The following constraints apply: AT-MOST-
               ONE.CT NO-PARTS.CT
         Checking constraint: AT-MOST-ONE.CT (a MODIFY-
               ON-SUCCESS.CT)

The statement: ((COUNT CONTENTS)
                            > 1)
            failed with value NIL when applied to cpu
               components
         Checking constraint: NO-PARTS.CT (a MODIFY-ON-
               SUCCESS.CT)

The statement: ((COUNT CONTENTS)
                            IS ZERO)
            succeeded with value T when applied to cpu
               components
Adding required component to CPU.1
Adding 1 CPU-1000 to cpu components ; OK? YES
         Adding the following parts: 1 CPU-1000

Evaluating: [CONFIGURE 'MEMORY (FIND 'ALL 'CCS
                  '(IMPLEMENTS MEMORY]

Configuring memory components
         No initial parts

Evaluating: [CONFIGURE 'RAM (FIND 'ALL 'CCS
                     '(IMPLEMENTS RAM]

Configuring random access memory components
  No initial parts

Evaluating: (CHECK 'REQUIREMENTS)
    Checking REQUIREMENTS constraints in random
      access memory components
    The following constraints apply: NO-PARTS.CT
    Checking constraint: NO-PARTS.CT (a MODIFY-
      ON-SUCCESS.CT)

The statement: ((COUNT CONTENTS)
                    IS ZERO)
      succeeded with value T when applied to
      random access memory components Adding required component to RAM.1
Adding 1 RAM-1000 to random access memory components ; OK?
YES
      Adding the following parts: 1 RAM-1000

Evaluating: [CONFIGURE 'ROM (FIND 'ALL 'CCS
                '(IMPLEMENTS ROM]

Configuring read-only memory components
      No initial parts

Evaluating: (CHECK 'REQUIREMENTS)
      Checking REQUIREMENTS constraints in read-
        only memory components
      The following constraints apply: NO-
        PARTS.CT
      Checking constraint: NO-PARTS.CT (a MODIFY-
        ON-SUCCESS.CT)

The statement: ((COUNT CONTENTS)
                      IS ZERO)
        succeeded with value T when applied to
        read-only memory components
Adding required component to ROM.1
Adding 1 ROM-1000 to read-only memory components ; OK? YES
        Adding the following parts: 1 ROM-1000

Evaluating: (CHECK 'REQUIREMENTS)
      Checking REQUIREMENTS constraints in memory
          components
        The following constraints apply: MEMORY.CT1
      Checking constraint: MEMORY.CT1 (a WARN-ON-
          SUCCESS.CT)
      The number of ram boards ordered of minicomputer
          components is set to: 1
      The number of rom boards ordered of minicomputer
          components is set to: 1

```
    The statement: (#RAM + #ROM > 7)
    failed with value NIL when applied to memory
        components Evaluating: [CONFIGURE 'IO (FIND 'ALL 'CCS
            '(IMPLEMENTS IO]

Configuring I/O components
  No initial parts

Evaluating: [CONFIGURE 'TERMINAL (FIND 'ALL 'CCS
                '(IMPLEMENTS TERMINAL]

Configuring terminal components
      No initial parts

Evaluating: (CHECK 'REQUIREMENTS)
        Checking REQUIREMENTS constraints in terminal
            components
          The following constraints apply: NO-
            PARTS.CT MAX.TERMINALS.CT
        Checking constraint: NO-PARTS.CT (a MODIFY-
            ON-SUCCESS.CT)

The statement: ((COUNT CONTENTS)
                            IS ZERO)
          succeeded with value T when applied to
            terminal components
Adding required component to TERMINAL.1
Adding 1 TERMINAL-1000 to terminal components ; OK? YES
            Adding the following parts: 1 TERMINAL-1000
        Checking constraint: MAX.TERMINALS.CT (a
            MODIFY-ON-SUCCESS.CT)

The statement: ((COUNT CONTENTS)
                            > 4)
          failed with value NIL when applied to
            terminal components Evaluating: [CONFIGURE 'DISC (FIND 'ALL 'CCS
                '(IMPLEMENTS DISC]

Configuring disk drive components
      No initial parts

Evaluating: (CHECK 'REQUIREMENTS)
        Checking REQUIREMENTS constraints in disk
            drive components
          No REQUIREMENTS constraints were found.

Evaluating: (DETERMINE '(IF-CARDS.NEEDED))
    The number of discs ordered of I/O components is
        set to: 0
```

The number of interface cards required for this
      order of I/O components is set to: 1

Evaluating: [CONFIGURE 'INTERFACE (FIND 'ALL
            'CCS '(IMPLEMENTS INTERFACE]

Configuring interface components
  No initial parts

Evaluating: (CHECK 'REQUIREMENTS)
    Checking REQUIREMENTS constraints in
        interface components
      The following constraints apply: IF.REQ.CT1
    Checking constraint: IF.REQ.CT1 (a MODIFY-ON-
        SUCCESS.CT)

The statement: (IF-CARDS.NEEDED =
          CONTENTS)
        succeeded with value T when applied to
        interface components
You have not ordered the minimum number of interface cards.
Replacing contents of  interface components  with  1 IF-1000
; OK? YES
        Removing the following parts:
        Adding the following parts: 1 IF-1000

Evaluating: [CONFIGURE 'CARD-CAGE (FIND 'ALL 'CCS
                '(IMPLEMENTS CARD-CAGE]

Configuring card cage components
  No initial parts

Evaluating: (CHECK 'REQUIREMENTS)
    Checking REQUIREMENTS constraints in card cage
        components
      The following constraints apply: AT-MOST-
          ONE.CT NO-PARTS.CT
    Checking constraint: AT-MOST-ONE.CT (a MODIFY-
        ON-SUCCESS.CT)

The statement: ((COUNT CONTENTS)
                > 1)
        failed with value NIL when applied to card
          cage components
    Checking constraint: NO-PARTS.CT (a MODIFY-ON-
        SUCCESS.CT)

The statement: ((COUNT CONTENTS)
                IS ZERO)
        succeeded with value T when applied to card
          cage components
Adding required component to CARD-CAGE.1
Adding 1 CAGE-1000 to card cage components ; OK? YES
        Adding the following parts: 1 CAGE-1000

Evaluating: (CHECK 'REQUIREMENTS)
Checking REQUIREMENTS constraints in mainframe
        components
    The following constraints apply: MAINFRAME.CT.1
Checking constraint: MAINFRAME.CT.1 (a WARN-ON-
        SUCCESS.CT)
The number of interface cards of minicomputer
        components is set to: 1

The statement: (#ROM + #RAM + #IF-CARDS + 1 > 16)
    failed with value NIL when applied to mainframe
        components Evaluating: [CONFIGURE 'POWER-SUPPLY (FIND 'ALL 'CCS
        '(IMPLEMENTS POWER-SUPPLY]

Configuring power supply components
    No initial parts

Evaluating: (CHECK 'CONTENTS)
    Checking CONTENTS constraints in power supply
            components
        The following constraints apply: PS.AMBIGUOUS.CT
    Checking constraint: PS.AMBIGUOUS.CT (a MODIFY-ON-
            SUCCESS.CT)

The statement: ((COUNT CONTENTS)
                        > 1)
        failed with value NIL when applied to power
            supply components Evaluating: (CHECK 'REQUIREMENTS)
    Checking REQUIREMENTS constraints in power supply
            components
        The following constraints apply: PS.REQ.CT1
            PS.REQ.CT2 PS.REQ.CT3
    Checking constraint: PS.REQ.CT1 (a MODIFY-ON-
            SUCCESS.CT)
    The power required to operate this order of
            minicomputer components is set to: 3.7

The statement: (POWER.NEEDED <= 5 AND (NOT
            (ORDERED? 'SUPPLY-05 T)))
        succeeded with value T when applied to power
            supply components
Adding 1 SUPPLY-05 to power supply components ; OK? YES
    Adding the following parts: 1 SUPPLY-05
    Checking constraint: PS.REQ.CT2 (a MODIFY-ON-
            SUCCESS.CT)

The statement: [POWER.NEEDED > 5 AND POWER.NEEDED
            <= 10 AND (NOT (ORDERED? 'SUPPLY-10]
        failed with value NIL when applied to power
            supply components
    Checking constraint: PS.REQ.CT3 (a MODIFY-ON-
            SUCCESS.CT)

```
        The statement: [POWER.NEEDED > 10 AND
                POWER.NEEDED <= 15 AND (NOT (ORDERED?
                'SUPPLY-15]
        failed with value NIL when applied to power
                supply components
    Checking EMPTY.BIN constraints in power supply
                components
    The following constraints apply:
            UNASSIGNED.EMPTY.CT
    Checking constraint: UNASSIGNED.EMPTY.CT (a WARN-
            ON-SUCCESS.CT)

The statement: (BIN:CONTENTS IS NOT NULL)
        failed with value NIL when applied to original
                components Evaluating: (DETERMINE '(FINAL.PARTS))
    The final set of parts of original components is set to:
MINI-1000, CPU-1000, RAM-1000, ROM-1000, TERMINAL-1000, IF-
1000, CAGE-1000 and SUPPLY-05

Evaluating: (OUTPUT.ORDER)
What type of output form would you like: FINAL.PARTS

1       CPU-1000
1       RAM-1000
1       ROM-1000
1       TERMINAL-1000
1       IF-1000
1       CAGE-1000
1       SUPPLY-05

What type of output form would you like:
Do you want to use this order to reconfigure something in
finished goods?
Would you like an explanation of this order?
```

APPENDIX IV (A)

KNOWLEDGE BASE FOR MINICOMPUTER FUNCTIONAL HIERARCHY

```
(* MINI-FHS definition)
(DEFINSTANCE MINI-FHS FHS
   SET.OF MINIKB
   FILED.ON MINIFH
   ELEMENTS (CARD-CAGE CPU DISC INTERFACE IO MAIN-FRAME
MEMORY MINICOMPUTER POWER-SUPPLY RAM ROM TERMINAL))

(DEFCLASS CARD-CAGE (BIN)
   ()
   (METACLASS FUNCTION.CLASS
    COMPOSES (MAIN-FRAME)
    DESCR "card cage")
)
```

```
(DEFCLASS CPU (BIN)
   ()
   (METACLASS FUNCTION.CLASS
    COMPOSES (MAIN-FRAME)
    DESCR "cpu")
   )

(DEFCLASS DISC (BIN)
   ()
   (METACLASS FUNCTION.CLASS
    COMPOSES (IO)
    DESCR "disk drive")
   )

(DEFCLASS INTERFACE (BIN)
   ()
   (METACLASS FUNCTION.CLASS
    COMPOSES (IO)
    DESCR "interface")
   )

(DEFCLASS IO (BIN)
   ()
   (METACLASS FUNCTION.CLASS
    COMPOSES (MAIN-FRAME)
    DESCR "I/O")
   )

(DEFCLASS MAIN-FRAME (BIN)
   ()
   (METACLASS FUNCTION.CLASS
    COMPOSES (MINICOMPUTER)
    DESCR "mainframe")
   )

(DEFCLASS MEMORY (BIN)
   ()
   (METACLASS FUNCTION.CLASS
    COMPOSES (MAIN-FRAME)
    DESCR "memory")
   )

(DEFCLASS MINICOMPUTER (BIN)
   ()
   (METACLASS FUNCTION.CLASS
    PROD.GEN (PRODUCT.LINE)
    DESCR "minicomputer")
   )

(DEFCLASS POWER-SUPPLY (BIN)
   ()
   (METACLASS FUNCTION.CLASS
    COMPOSES (MINICOMPUTER)
    DESCR "power supply")
   )
```

```
(DEFCLASS RAM (BIN)
   ()
   (METACLASS FUNCTION.CLASS
    COMPOSES (MEMORY)
    DESCR "random access memory")
   )

(DEFCLASS ROM (BIN)
   ()
   (METACLASS FUNCTION.CLASS
    COMPOSES (MEMORY)
    DESCR "read-only memory")
   )

(DEFCLASS TERMINAL (BIN)
   ()
   (METACLASS FUNCTION.CLASS
    COMPOSES (IO)
    DESCR "terminal")
   )
```

APPENDIX IV (B)

KNOWLEDGE BASE FOR MINICOMPUTER TASK BLOCKS

```
(* MINI-TBS definition)
(DEFINSTANCE MINI-TBS TBS
   SET.OF MINIKB
   FILED.ON MINIFH
   ELEMENTS (CARD-CAGE.TB CPU.TB DISC.TB INTERFACE.TB IO.TB
MAIN-FRAME.TB MEMORY.TB
              MINICOMPUTER.TB POWER-SUPPLY.TB RAM.TB ROM.TB
              TERMINAL.TB))

(DEFTASKBLOCK CARD-CAGE.TB CARD-CAGE () (CHECK
            'REQUIREMENTS)
   )

(DEFTASKBLOCK CPU.TB CPU () (CHECK 'REQUIREMENTS)
   )

(DEFTASKBLOCK DISC.TB DISC () (CHECK 'REQUIREMENTS)
   )

(DEFTASKBLOCK INTERFACE.TB INTERFACE () (CHECK
            'REQUIREMENTS)
   )

(DEFTASKBLOCK IO.TB IO ()

(* The order of the CONFIGURE statements is
              significant below.
        In particular, INTERFACE should be configured last!)
```

```
       (CONFIGURE 'TERMINAL (FIND 'ALL 'CCS '(IMPLEMENTS
                 TERMINAL)))
       (CONFIGURE 'DISC (FIND 'ALL 'CCS '(IMPLEMENTS DISC)))
       (DETERMINE '(IF-CARDS.NEEDED))
       (CONFIGURE 'INTERFACE (FIND 'ALL 'CCS '(IMPLEMENTS
                 INTERFACE))))

(DEFTASKBLOCK MAIN-FRAME.TB MAIN-FRAME () (CONFIGURE 'CPU
(FIND 'ALL 'CCS '(IMPLEMENTS CPU)))
    (CONFIGURE 'MEMORY (FIND 'ALL 'CCS '(IMPLEMENTS MEMORY)))
    (CONFIGURE 'IO (FIND 'ALL 'CCS '(IMPLEMENTS IO)))
    (CONFIGURE 'CARD-CAGE (FIND 'ALL 'CCS '(IMPLEMENTS CARD-
                CAGE)))
    (CHECK 'REQUIREMENTS))

(DEFTASKBLOCK MEMORY.TB MEMORY () (CONFIGURE 'RAM (FIND 'ALL
                'CCS '(IMPLEMENTS RAM)))
     (CONFIGURE 'ROM (FIND 'ALL 'CCS '(IMPLEMENTS ROM)))
     (CHECK 'REQUIREMENTS))

(DEFTASKBLOCK MINICOMPUTER.TB MINICOMPUTER () (CONFIGURE
                'MAIN-FRAME
       (FIND 'ALL 'CCS '(IMPLEMENTS

MAIN-FRAME)))
     (CONFIGURE 'POWER-SUPPLY (FIND 'ALL 'CCS '(IMPLEMENTS
                POWER-SUPPLY))))

(DEFTASKBLOCK POWER-SUPPLY.TB POWER-SUPPLY () (CHECK
                'CONTENTS)
     (CHECK 'REQUIREMENTS))

(DEFTASKBLOCK RAM.TB RAM () (CHECK 'REQUIREMENTS)
     )

(DEFTASKBLOCK ROM.TB ROM () (CHECK 'REQUIREMENTS)
     )

(DEFTASKBLOCK TERMINAL.TB TERMINAL () (CHECK 'REQUIREMENTS)
     )
```

APPENDIX IV (C)

KNOWLEDGE BASE FOR MINICOMPUTER
PARTS CATALOG

```
(* MINI-PRODS definition)
(DEFINSTANCE MINI-PRODS PRODS
   SET.OF MINIKB
   FILED.ON MINIPROD
   ELEMENTS (CAGE-1000 CPU-1000 DISC-1000 IF-1000 MINI-1000
RAM-1000 ROM-1000 SUPPLY-05 SUPPLY-10 SUPPLY-15 TERMINAL-
1000))
```

```
(DEFCLASS CAGE-1000 (PRODUCT.ID)
   ()
   (METACLASS PID
    IMPLEMENTS.FN CARD-CAGE)
   )

(DEFCLASS CPU-1000 (PRODUCT.ID)
   ()
   (METACLASS PID
    IMPLEMENTS.FN CPU)
   )

(DEFCLASS DISC-1000 (PRODUCT.ID)
   ()
   (METACLASS PID
    IMPLEMENTS.FN DISC)
   )

(DEFCLASS IF-1000 (PRODUCT.ID)
   ()
   (METACLASS PID
    IMPLEMENTS.FN INTERFACE)
   )

(DEFCLASS MINI-1000 (PRODUCT.ID)
   ()
   (METACLASS PID
    IMPLEMENTS.FN MINICOMPUTER)
   )

(DEFCLASS RAM-1000 (PRODUCT.ID)
   ()
   (METACLASS PID
    IMPLEMENTS.FN RAM)
   )

(DEFCLASS ROM-1000 (PRODUCT.ID)
   ()
   (METACLASS PID
    IMPLEMENTS.FN ROM)
   )

(DEFCLASS SUPPLY-05 (PRODUCT.ID)
   ()
   (METACLASS PID
    IMPLEMENTS.FN POWER-SUPPLY)
   )

(DEFCLASS SUPPLY-10 (PRODUCT.ID)
   ()
   (METACLASS PID
    IMPLEMENTS.FN POWER-SUPPLY)
   )
```

```
(DEFCLASS SUPPLY-15 (PRODUCT.ID)
  ()
  (METACLASS PID
   IMPLEMENTS.FN POWER-SUPPLY)
  )

(DEFCLASS TERMINAL-1000 (PRODUCT.ID)
  ()
  (METACLASS PID
   IMPLEMENTS.FN TERMINAL)
  )

(* MINI-ECTS definition)
(DEFINSTANCE MINI-ECTS ECTS
  SET.OF MINIKB
  FILED.ON MINIPROD
  ELEMENTS NIL)
```

APPENDIX IV (D)

KNOWLEDGE BASE FOR MINICOMPUTER
CONSTRAINTS & BIN VARIABLES
KNOWLEDGE BASE FUNCTIONS

```
(* MINI-CTS definition)
(DEFINSTANCE MINI-CTS CTS
  SET.OF MINIKB
  FILED.ON MINICT
  ELEMENTS (AT-MOST-ONE.CT IF.REQ.CT1 MAINFRAME.CT.1
MAX.TERMINALS.CT MEMORY.CT1 NO-PARTS.CT PS.AMBIGUOUS.CT
PS.REQ.CT1 PS.REQ.CT2 PS.REQ.CT3))

(DEFCLASS AT-MOST-ONE.CT (CTI)
  ()
  (METACLASS MODIFY-ON-SUCCESS.CT
   SET-PARTS (LIST (A PRODUCT.QTY WITH QTY = 1 NAME =
(GETCLASS (CAR (CURRENT.BIN:CONTENTS)))))
   STATEMENT ((COUNT CONTENTS)
         > 1)
   BIN.TYPES (CPU CARD-CAGE)
   CHECK.KEYWORDS (REQUIREMENTS))
  )

(DEFCLASS IF.REQ.CT1 (CTI)
  ()
  (METACLASS MODIFY-ON-SUCCESS.CT
   SET-PARTS (LIST (A PRODUCT.QTY WITH QTY = (FETCH 'IF-
           CARDS.NEEDED)
              NAME = 'IF-1000))
   MESSAGE ("You have not ordered the minimum number of
interface cards.")
```

```
    BIN.VARS.REQUIRED (IF-CARDS.NEEDED)
    STATEMENT (IF-CARDS.NEEDED = CONTENTS)
    BIN.TYPES (INTERFACE)
    CHECK.KEYWORDS (REQUIREMENTS))
  )

(DEFCLASS MAINFRAME.CT.1 (CTI)
  ()
  (METACLASS WARN-ON-SUCCESS.CT
    MESSAGE ("You have ordered more than 16 cards for this
              mainframe.")
    BIN.VARS.REQUIRED (#ROM #RAM #IF-CARDS)
    STATEMENT (#ROM + #RAM + #IF-CARDS + 1 > 16)
    BIN.TYPES (MAIN-FRAME)
    CHECK.KEYWORDS (REQUIREMENTS))
  )

(DEFCLASS MAX.TERMINALS.CT (CTI)
  ()
  (METACLASS MODIFY-ON-SUCCESS.CT
    SET-PARTS (LIST (A PRODUCT.QTY WITH QTY = 4 NAME =
'TERMINAL-1000))
    MESSAGE ("You have ordered too many terminals; the
              maximum is 4.")
    STATEMENT ((COUNT CONTENTS)
            > 4)
    BIN.TYPES (TERMINAL)
    CHECK.KEYWORDS (REQUIREMENTS))
  )

(DEFCLASS MEMORY.CT1 (CTI)
  ()
  (METACLASS WARN-ON-SUCCESS.CT
    MESSAGE ("You have ordered too many memory (RAM and ROM)
              cards.")
    BIN.VARS.REQUIRED (#RAM #ROM)
    STATEMENT (#RAM + #ROM > 7)
    BIN.TYPES (MEMORY)
    CHECK.KEYWORDS (REQUIREMENTS))
  )

(DEFCLASS NO-PARTS.CT (CTI)
  ()
  (METACLASS MODIFY-ON-SUCCESS.CT
    ADD-PARTS (LIST (A PRODUCT.QTY WITH QTY = 1 NAME =
            (SELECTQ (GETCLASS CURRENT.BIN)
            (RAM 'RAM-1000)
            (ROM 'ROM-1000)
            (TERMINAL 'TERMINAL-1000)
            (INTERFACE 'IF-1000)
            (CARD-CAGE 'CAGE-1000)
            (CPU 'CPU-1000)
            (SHOULDNT))))
    MESSAGE ("Adding required component to " CURRENT.BIN)
```

```
   STATEMENT ((COUNT CONTENTS)
            IS ZERO)
   BIN.TYPES (RAM ROM TERMINAL CPU CARD-CAGE)
   CHECK.KEYWORDS (REQUIREMENTS))
  )

(DEFCLASS PS.AMBIGUOUS.CT (CTI)
   ()
   (METACLASS MODIFY-ON-SUCCESS.CT
    SET-PARTS (MAKE.PRODUCT.QTYS CURRENT.BIN:CONTENTS)
    STATEMENT ((COUNT CONTENTS)
            > 1)
    BIN.TYPES (POWER-SUPPLY)
    CHECK.KEYWORDS (CONTENTS))
   )

(DEFCLASS PS.REQ.CT1 (CTI)
   ()
   (METACLASS MODIFY-ON-SUCCESS.CT
    ADD-PARTS (LIST (A PRODUCT.QTY WITH QTY = 1 NAME =
                'SUPPLY-05))
    BIN.VARS.REQUIRED (POWER.NEEDED)
    STATEMENT (POWER.NEEDED <= 5 AND (NOT (ORDERED? 'SUPPLY-
                05 T)))
    BIN.TYPES (POWER-SUPPLY)
    CHECK.KEYWORDS (REQUIREMENTS))
   )

(DEFCLASS PS.REQ.CT2 (CTI)
   ()
   (METACLASS MODIFY-ON-SUCCESS.CT
    ADD-PARTS (LIST (A PRODUCT.QTY WITH QTY = 1 NAME =
                'SUPPLY-10))
    BIN.VARS.REQUIRED (POWER.NEEDED)
    STATEMENT (POWER.NEEDED > 5 AND POWER.NEEDED <= 10 AND
                (NOT (ORDERED? 'SUPPLY-10)))
    BIN.TYPES (POWER-SUPPLY)
    CHECK.KEYWORDS (REQUIREMENTS))
   )

(DEFCLASS PS.REQ.CT3 (CTI)
   ()
   (METACLASS MODIFY-ON-SUCCESS.CT
    ADD-PARTS (LIST (A PRODUCT.QTY WITH QTY = 1 NAME =
                'SUPPLY-15))
    BIN.VARS.REQUIRED (POWER.NEEDED)
    STATEMENT (POWER.NEEDED > 10 AND POWER.NEEDED <= 15 AND
                (NOT (ORDERED? 'SUPPLY-15)))
    BIN.TYPES (POWER-SUPPLY)
    CHECK.KEYWORDS (REQUIREMENTS))
   )
```

```
(* MINI-BVS definition)
(DEFINSTANCE MINI-BVS BVS
   SET.OF MINIKB
   FILED.ON MINICT
   ELEMENTS (#DISCS #IF-CARDS #RAM #ROM #TERMINALS IF-
            CARDS.NEEDED POWER.NEEDED))

(DEFCLASS #DISCS (BVI)
   ()
   (METACLASS BIN.VAR
    BIN.TYPES (IO)
    HOW.TO.DETERMINE (COMPUTE.#DISC ASK.QUESTION)
    LEGAL.VALUES INTEGER
    DESCR "the number of discs ordered")
   )

(DEFCLASS #IF-CARDS (BVI)
   ()
   (METACLASS BIN.VAR
    BIN.TYPES (MINICOMPUTER)
    HOW.TO.DETERMINE (COMPUTE.#IF-CARDS ASK.QUESTION)
    LEGAL.VALUES INTEGER
    DESCR "the number of interface cards")
   )

(DEFCLASS #RAM (BVI)
   ()
   (METACLASS BIN.VAR
    BIN.TYPES (MINICOMPUTER)
    HOW.TO.DETERMINE (COMPUTE.#RAM ASK.QUESTION)
    LEGAL.VALUES INTEGER
    DESCR "the number of RAM boards ordered")
   )

(DEFCLASS #ROM (BVI)
   ()
   (METACLASS BIN.VAR
    BIN.TYPES (MINICOMPUTER)
    HOW.TO.DETERMINE (COMPUTE.#ROM ASK.QUESTION)
    LEGAL.VALUES INTEGER
    DESCR "the number of ROM boards ordered")
   )

(DEFCLASS #TERMINALS (BVI)
   ()
   (METACLASS BIN.VAR
    BIN.TYPES (IO)
    HOW.TO.DETERMINE (COMPUTE.#TERMINALS ASK.QUESTION)
    LEGAL.VALUES INTEGER
    DESCR "the number of terminals ordered")
   )
```

```
(DEFCLASS IF-CARDS.NEEDED (BVI)
  ()
  (METACLASS BIN.VAR
   BIN.TYPES (IO)
   HOW.TO.DETERMINE (COMPUTE.IF-CARDS.NEEDED ASK.QUESTION)
   LEGAL.VALUES INTEGER
   DESCR "the number of interface cards required for this
             order")
  )

(DEFCLASS POWER.NEEDED (BVI)
  ()
  (METACLASS BIN.VAR
   BIN.TYPES (MINICOMPUTER)
   HOW.TO.DETERMINE (COMPUTE.POWER.NEEDED ASK.QUESTION)
   LEGAL.VALUES NUMBER
   DESCR "the power required to operate this order")
  )
(* MINI-BVMS definition)
(DEFINSTANCE MINI-BVMS BVMS
   SET.OF MINIKB
   FILED.ON MINICT
   ELEMENTS (COMPUTE.#DISC COMPUTE.#IF-CARDS COMPUTE.#RAM
COMPUTE.#ROM COMPUTE.#TERMINALS
COMPUTE.IF-CARDS.NEEDED COMPUTE.POWER.NEEDED))

(DEFKBFUN COMPUTE.#DISC ()(COUNT.PARTS 'DISC-1000 T)
   )

(DEFKBFUN COMPUTE.#IF-CARDS ()(COUNT.PARTS 'IF-1000 T)
   )

(DEFKBFUN COMPUTE.#RAM ()(COUNT.PARTS 'RAM-1000 T)
   )

(DEFKBFUN COMPUTE.#ROM ()(COUNT.PARTS 'ROM-1000 T)
   )

(DEFKBFUN COMPUTE.#TERMINALS ()(COUNT.PARTS 'TERMINAL-1000
                T)
   )

(DEFKBFUN COMPUTE.IF-CARDS.NEEDED ()

(* Compute the minimum number of interface cards
                  required by this order.
         This calculation assumes that the number of terminals
               and discs are correct and acceptable so
                  configure those first.)

(PROG (#TERMINALS:INTEGER #DISCS:INTEGER)
         (#TERMINALS :=(SAND CURRENT.BIN 'FETCH '#TERMINALS))
         (#DISCS :=(SAND CURRENT.BIN 'FETCH '#DISCS))
         (RETURN (SELECTQ #DISCS
```

```
    (0 1)
    (1 (IF #TERMINALS = 1
  THEN 1
    ELSE 2))
    (2 (IF #TERMINALS = 4
  THEN 3
        ELSE 2))
    (3 (IF #TERMINALS = 4
  THEN 4
        ELSE 3))
  #DISCS))))

(DEFKBFUN COMPUTE.POWER.NEEDED ()(PROG (#RAM:INTEGER
        #ROM:INTEGER #IF-CARDS:INTEGER)
        (#RAM :=(SAND CURRENT.BIN 'FETCH '#RAM))
        (#ROM :=(SAND CURRENT.BIN 'FETCH '#ROM))
        (#IF-CARDS :=(SAND CURRENT.BIN 'FETCH '#I
    F-CARDS))
        (RETURN (2 + 1*#RAM + .5*#ROM + .2*#IF-CA
        RDS))))
)
```

APPENDIX V
GLOSSARY

ASSEMBLY
A specific set of product instances or parts.

ASSEMBLY DESCRIPTION
A Boolean function or predicate defining a set of parts in terms of a set of part names, names of assemblies or part types. A collection of parts satisfies an assembly description when the parts fit that description.

BIN
A set of product instances created during execution of a CONFIGURE operation in a task block. The product instances are obtained from the order lines, by an EXPANSION operation upon parts initially placed in the bin, or by application of a modification constraint.

BIN TREE
A hierarchical structure of bins corresponding to the hierarchy of the functional classes of the bins.

CHECK
An operation which applies a specified set of constraints to the product instances or parts in the current bin in order to check whether there are any configuration problems with the parts in the bin.

CONDITION
A Boolean function of the elements in a defined set.

CONFIGURE
An operation which creates a new bin of a specified functional class and moves a respective subset of parts from the current bin to the new bin, and then invokes execution of the task block associated with the type of the new bin.

CONFIGURATION
The grouping of a set of elements into subsets.

CONSTRAINTS
A statement of a condition that certain parts must satisfy and a respective action to be conditionally executed in response to whether the condition is satisfied when the constraint is applied.

EXPAND
An operation which selects a specified subset of parts from the current bin and adds any new parts that correspond to the "product expansions" or subcomponents of the specified subset of parts.

FIELD SERVICE PARTS
A list of parts, such as replacement and spare parts, that are included in an order but which are not checked for compatibility with themselves or with the rest of the order.

FIND
An operation which matches the parts in the current bin to an assembly description and copies the matching parts to an assembly list.

FUNCTION
(1) The purpose or performance of an assembly.
(2) A numerical or logical value responsive to the domain of the function. A function of the parts in an assembly, for example, may indicate whether a specified number of specified parts are included in the assembly or whether the parts have specified conditions or attributes. In a computer program, functions are applied or evaluated at only specified instants of time.

FUNCTIONAL HIERARCHY
The decomposition of a configuration or product into its major functional components of sub-assemblies.

INITIAL BIN
The root of the bin tree

MODIFICATION CONSTRAINT
A constraint which changes the set of product instances or parts in the current bin, and may also issue a warning message to the user.

OPERATION
A specific action in a control procedure or computer program which, when executed, modifies the sequence of execution of the control procedure or modifies the data or configuration elements processed by the control procedure.

ORDER
The input to the order processing system including order information, order lines, and field serivce parts.

ORDER INFORMATION
Information which primarily identifies an order, such as customer name and order number, and does not affect the configuration process.

ORDER LINES
A list of parts ordered and the quantity of each part that will be checked.

PRODUCT EXPANSION
For a specified part or product instance, the set of corresponding sub-parts or product instances making up the specified part or product instance.

PRODUCT INSTANCE
An explicit representation of an individual part considered by the order processing system.

TASK BLOCK
A set of imperative language statements specifying operations to perform with respect to associated bins.

UNASSIGNED
A type of bin denoting that the configuration system has not yet determined what product the parts of the bin will implement and therefore which knowledge base should be used to configure the order.

WARNING CONSTRAINT
A constraint which issues a message, informing the user of a problem with the configuration.

What is claimed is:

1. A knowledge system comprising a computer having a memory storing a knowledge base, said knowledge base including
predefined descriptions of assemblies of predefined components for indicating whether a specified component is permitted in a specified assembly, and
for at least some of said descriptions of assemblies, sets of predefined conditions of different properties of the components in the assembly for indicating whether certain predefined properties of a specified set of components are compatible within the assembly,
said memory comprising a control procedure for
first obtaining a predetermined initial set of predefined components,
thereafter matching the initial set of components to the predefined descriptions of assemblies to determine respective sets of matching components including the components in the initial set which are also permitted in the respective assemblies,
thereafter applying the sets of conditions to the respective sets of matching components for the respective assemblies, and
indicating whether the respective conditions are satisfied,
said computer including means for executing said control procedure to thereby first obtain said predetermined initial set of predefined components, thereafter match said initial set of components to said predefined descriptions of assemblies, thereafter apply said sets of conditions to the respective sets of matching components for the respective assemblies and generate an indication of whether the conditions are satisfied.

2. The knowledge system as claimed in claim 1, wherein said descriptions of assemblies include the names of at least some of said components in the initial set of components.

3. The knowledge system as claimed in claim 1, wherein said knowledge base further includes a catalog of components including component names and respective names of assemblies comprising said components, and wherein said descriptions of assemblies include the names of some of said assemblies in said catalog of components.

4. The knowledge system as claimed in claim 3, wherein said descriptions of assemblies comprise Boolean functions of names of assemblies.

5. The knowledge system as claimed in claim 1, wherein said control procedure includes a set of control steps for obtaining attributes of the components in said initial set of components, and wherein said descriptions of assemblies include respective Boolean functions of said attributes.

6. The knowledge system as claimed in claim 1, wherein said control procedure includes a set of control steps for obtaining a predetermined initial set of predefined components by inputting a predetermined list of components.

7. The knowledge system as claimed in claim 1, wherein the knowledge base further includes respective actions for said conditions, and wherein said control procedure includes a set of control steps for carrying out said actions for indicating whether the respective conditions are satisfied.

8. The knowledge system as claimed in claim 7, wherein said actions comprise adding and deleting specified components from said initial set of components.

9. The knowledge system as claimed in claim 1, wherein the descriptions of assemblies of predefined components include at least one definition of a relationship between at least two of said descriptions of assemblies, and wherein the control procedures includes a set of control steps for matching the initial set of components to at least one of said two descriptions of assemblies in response to the descriptions of the two assemblies and in response to the defined relationship between the two assemblies.

10. The knowledge system as claimed in claim 9, wherein said relationship is a structural relationship between said two assemblies.

11. The knowledge system as claimed in claim 9, wherein said relationship is a functional relationship between said two assemblies.

12. The knowledge system as claimed in claim 1, wherein some of said assemblies are sub-assemblies of other of said assemblies, and wherein said knowledge base includes a definition of a hierarchy of said descriptions of assemblies defining offspring-parent relationships between said descriptions of sub-assemblies and the respective descriptions of assemblies which comprise said sub-assemblies, and wherein said control procedure for matching the initial set of components to the predefined descriptions of assemblies includes means for first matching the list of components to the parent descriptions of assemblies, and then matching the list of the respecting matching components for the respective parent assemblies to their respective offspring descriptions of sub-assemblies.

13. The knowledge system as claimed in claim 12, wherein some of said parent descriptions of assemblies represent structures comprising their respective sub-assemblies physically connected together.

14. The knowledge system as claimed in claim 12, wherein some of said parent descriptions of assemblies represent functions collectively performed by the respective offspring sub-assemblies.

15. The knowledge system as claimed in claim 1, wherein said knowledge base further comprises a set of expansion rules defining expandable components including some of said components in the initial set of components in terms of respective sub-components of the expandable components and wherein said control procedure further includes a set of control steps for selecting expandable components from the initial set of components and adding the respective sub-components corresponding to the selected expandable components to the initial set of components.

16. The knowledge system as claimed in claim 15, wherein said set of control steps for selecting expandable components includes control steps for searching the initial set of components for specified components and when any of the specified expandable components are found, expanding those expandable components by adding their respective sub-components to the initial set of components.

17. The knowledge system as claimed in claim 1, further comprising a working configuration portion of said memory, and wherein said set of control steps for matching the initial set of components to the defined assemblies includes control steps for recording the respective matching components in respective bin portions of said working configuration portion of said memory.

18. The knowledge system as claimed in claim 17, wherein said knowledge base further includes respective modification actions for making specified changes to the recorded set of matching components in the respective bin portions of said working configuration portion of said memory, and wherein the said control procedure for applying the sets of conditions includes a set of control steps for conditionally executing said changes in response to whether the respective conditions are found to be satisfied for the respective assemblies when the respective conditions are applied.

19. The knowledge system as claimed in claim 18, wherein said conditions include descriptions of assemblies including specific components.

20. The knowledge system as claimed in claim 18, wherein said descriptions of assemblies include Boolean functions of specified attributes of components.

21. The knowledge system as claimed in claim 1, wherein said control procedure includes
a built-in control procedure independent of the descriptions of assemblies and said predefined conditions, and
task blocks defining control steps for said matching of said components to specified descriptions of assemblies and applying said conditions to the respective matching components, said task blocks being executed when specified steps in said built-in control procedure are reached.

22. The knowledge system as claimed in claim 21, wherein said task blocks include task blocks associated with respective assemblies and executed when said components are matched with the respective descriptions of assemblies of the task blocks.

23. The knowledge system as claimed in claim 22, wherein said descriptions of assemblies of predefined components include Boolean functions of specified attributes of components.

24. The knowledge system as claimed in claim 22, wherein said control steps defined by said task blocks include control steps for applying specified subsets of said conditions corresponding to the specified descriptions of assemblies.

25. The knowledge system as claimed in claim 21, wherein said task blocks include a specified task block to be executed before the other task blocks are executed.

26. The knowledge system as claimed in claim 21, wherein said conditions include Boolean functions of specified attributes of specified components, and wherein said knowledge base includes a knowledge base function associated with a respective one of said specified attributes, said knowledge base function being implicitly invoked when said condition is applied including said Boolean function of said specified attribute, so that the knowledge base function determines a value for its respective specified attribute.

27. The knowledge system as claimed in claim 21, wherein said built-in control procedure includes a set of control steps for generating a trace of the operations performed by said control procedure including the sequence of control steps performed when said task blocks are executed, and wherein said control procedure also includes a set of control steps for generating a user-understandable explanation from said trace and transmitting said explanation to a user.

28. The knowledge system as claimed in claim 1, wherein said control procedure includes a set of control steps for generating a trace of the results of said matching of said components and said application of said conditions and also includes a set of control steps for generating an explanation understandable to a human user from said trace and transmitting said explanation to a human user.

29. A knowledge system comprising a computer having a memory storing a knowledge base, said knowledge base including
predefined descriptions of assemblies of predefined components for indicating whether a specified component is permitted in a specified assembly, and
corresponding sets of assembly constraints including predefined conditions of different properties of the components in their respective assemblies for indicating whether certain predefined properties of a specified set of components are compatible within the assembly, and also including predefined actions to perform when the constraints are applied and the conditions are satisfied including outputting a warning to a user indicating specified conditions are satisfied,
said memory further comprising a control procedure for
first obtaining a predetermined list of components,
thereafter matching the components in said list to the predefined descriptions of assemblies to determine respective sets of matching components containing the components in said list which are permitted in the respective assemblies,
thereafter applying the sets of assembly constraints to the respective sets of matching components from the list for the respective assemblies, and
conditionally performing the respective actions in response to whether their respective conditions are satisfied when the assembly constraints are applied, said computer including means for executing said control procedure to thereby first obtain said predetermined list of components, thereafter match the components in said list to the predefined descriptions of assemblies, thereafter apply said sets of constraints to the respective sets of matching components from said list of components, and conditionally perform said respective actions in response to whether their respective conditions are satisfied when the assembly constraints are applied.

30. The knowledge system as claimed in claim 29 wherein said descriptions of assemblies define a hierarchy of descriptions of assemblies and sub-assemblies, and said control procedure for matching includes a procedure for matching said components in the respective assemblies to the descriptions of specified sub-assemblies to determine the components for which said constraints are applied.

31. The knowledge system as claimed in claim 29, wherein said constraints include conditions responsive to whether specified parts have been matched to the respective descriptions of assemblies.

32. The knowledge system as claimed in claim 29, wherein said constraints include conditions responsive to whether specified parts have specified attributes.

33. The knowledge system as claimed in claim 32, wherein the knowledge base includes definitions of variables for specifying the attributes of components included in the descriptions of respective assemblies.

34. The knowledge system as claimed in claim 33, wherein said knowledge base includes knowledge base functions for at least some of said variables specifying steps for determining values for the respective attributes of said components, and said control procedure includes a set of control steps for implicitly invoking and executing the respective knowledge base functions when applying constraints including conditions referencing the respective variables having the knowledge base functions.

35. The knowledge system as claimed in claim 29, further comprising a working configuration portion of said memory, and wherein said control procedure for matching the components in said list to the descriptions of assemblies includes a set of control steps for recording the respective matching components in respective bin portions of said working configuration portion of said memory.

36. The knowledge system as claimed in claim 35, wherein said control procedure for applying the sets of assembly constraints includes a set of control steps for applying a specified set of constraints to the matching components recorded in a specified bin portion of said working configuration portion of said memory.

37. The knowledge system as claimed in claim 35, wherein said knowledge base includes expansion rules defining sub-components for respective components, and wherein said control procedure includes a set of control steps for searching a specified bin for at least some of said components having sub-components defined by said expansion rules, and recording the respective sub-components in the specified bin.

38. The knowledge system as claimed in claim 35, wherein the actions of the assembly constraints include actions specifying modifications to the set of components recorded in a specified bin.

39. The knowledge system as claimed in claim 35, wherein said working configuration portion of said memory includes a current bin memory location for storing a value specifying a particular bin.

40. The knowledge system as claimed in claim 39, wherein the control procedure includes task blocks including control steps, at least some of the bins having an associated task block for specifying operations to perform in connection with their respective bins, and the control procedure includes a set of steps for executing the task block associated with a specified bin.

41. The knowledge system as claimed in claim 40, wherein the set of steps for executing the task block associated with a specified bin include the steps of pushing the value of the current bin memory location onto a stack, setting the value of the current bin memory location to specify the specified bin, executing the control steps in the task block for the specified bin, popping the stack and assigning the popped value to the current bin memory location.

42. The knowledge system as claimed in claim 40, wherein the task blocks include imperative language statements specifying distinct steps in said control procedure.

43. The knowledge system as claimed in claim 42, wherein the knowledge base includes expansion rules specifying that at least some of said components are expandable and are comprised of sub-components and wherein the imperative language statements include a separate statement for specifying that for each expandable component in a specified bin, its respective sub-components are to be recorded in the specified bin.

44. The knowledge system as claimed in claim 42, wherein the imperative language statements include a separate statement for specifying that specified assembly constraints are to be applied to the components in a specified bin.

45. The knowledge system as claimed in claim 42, wherein the imperative language statements include a separate statement for executing a specified task block.

46. The knowledge system as claimed in claim 42, wherein the control procedure includes a set of control steps for generating a sequential record of the imperative language statements that are executed, the components added to bins, the constraints applied, and the actions that are executed when the conditions of the applied constraints are satisfied.

47. The knowledge system as claimed in claim 40, wherein said knowledge base includes a plurality of separate portions for processing predetermined lists to configure different respective products, and wherein the control procedure includes control steps for obtaining said predetermined list by an input operation and for selecting the knowledge base portion corresponding to a product number in said predetermined list.

48. The knowledge system as claimed in claim 35, wherein said control procedure for matching the components in said list includes a set of control steps for finding the components in a specified bin which satisfy a specified assembly description.

49. The knowledge system as claimed in claim 48, wherein said control steps for finding the components in a specified bin are responsive to specified assembly descriptions including Boolean functions of part names, names of assemblies and part types.

50. A knowledge system comprising a computer having memory storing
   a knowledge base including knowledge about a set of related elements, and
   an initial list of certain ones of said elements,
   said knowledge about said set of related elements including
   a predefined declaration of hierarchical decomposition of said set of related elements into separately defined subsets of said elements, some of said separately defined subsets being composed of other of said separately defined subsets having fewer elements, and for said separately defined subsets of said elements, respective predefined functions of the respective elements in the subsets, the domain of each function thereby being its respective subset, such function having a predefined result obtained when the function is applied responsive to the specified elements within its domain, said memory including a working configuration portion for storing lists of said elements, said memory storing a predefined matching procedure for matching a specified list of certain ones of said elements to a specified one of said subsets to thereby obtain a list of matching elements which are the elements in said specified list which are also elements of said specified subset, said list of matching elements being stored in said working configuration portion of said memory, and said memory further storing a predefined control procedure for successively applying said matching procedure to match said initial list to said subsets of elements composing said set of related elements, and for each of said subsets of elements composed of said subsets of fewer elements applying said matching procedure to match the previously obtained respective list of matching elements to each of said subsets of fewer elements composing said subset of elements to thereby obtain lists of matching elements representing the configuration of said initial list according to said hierarchical decomposition, and applying said functions to the respective lists of matching elements within the domains of the respective functions and obtained by matching to the respective subsets, and said computer including means for executing said control procedure to thereby obtain said matching lists of elements representing a configuration of said initial list according to said hierarchical decomposition, and for applying said functions to the respective matching lists within the domains of the respective functions.

51. The knowledge system as claimed in claim 50, wherein said functions include functions responsive to whether specified elements of the initial list are included within said respective lists of matching elements within the domains of the respective functions.

52. The knowledge system as claimed in claim 50, wherein the knowledge base includes predetermined changes to the composition of said lists of matching elements stored in said working configuration portion of said memory, and wherein said functions include respective Boolean condition functions for indicating said changes, and wherein the control procedure includes control steps for executing the indicated changes to thereby conditionally change said lists of matching elements.

53. The knowledge system as claimed in claim 52, further comprising an explanation facility for generating an ordered list of the conditions for which changes were indicated and the changes which were executed, and transmitting the ordered list to a user.

54. The knowledge system as claimed in claim 50 wherein said subsets correspond to hierarchical functions collectively performed by the combinations of their respective elements, and the definitions of said subsets explicitly stage their respective functions.

55. The knowledge system as claimed in claim 54, wherein said respective functions of the respective elements in the subsets include at least one function defining a variable, and at least one of said task blocks includes a statement specifying when the function is applied to determine a value for its respective variable.

56. The knowledge system as claimed in claim 50, wherein said declaration of hierarchical decomposition defines classes of subsets of said elements, and said control procedure includes configuring control steps for creating specified instances of said classes of subsets and adding corresponding elements of said initial list to the instances of said subsets.

57. The knowledge system as claimed in claim 56, wherein said control procedure includes a set of control steps for recursively applying said configuring control steps.

58. The knowledge system as claimed in claim 57, wherein said set of control steps for recursively applying starts recursive application at the uppermost level of the hierarchical decomposition.

59. The knowledge system as claimed in claim 50, wherein said knowledge base includes a plurality of task blocks specifying in part the operation of said control procedure, and said subsets are associated with particular ones of said task blocks, and said task blocks specify operations to perform with respect to their associated subsets.

60. The knowledge system as claimed in claim 59, wherein said task blocks include imperative language statements including separate statements for creating and storing in said working configuration portion of memory the list of matching elements obtained by matching to a specified one of said subsets, and for applying a specified set of functions to the respective lists of matching elements within the domains of said functions.

61. A knowledge system for checking a production request for a flexibly-assembled product, said request including a list of part names and respective quantities, said knowledge system comprising a computer having a memory storing a knowledge base, said knowledge base including a declaration of a hierarchy of funtional assemblies including parent-offspring relationships between respective assemblies and sub-assemblies, a parts catalog including a predefined set of parts and identification of the functional assemblies which the respective parts compose, and a set of conditions applicable to respective assemblies for indicating whether parts configured into the respective assemblies are compatible, said memory also including a working configuration portion of said memory subdivided into respective bins for receiving the names of parts configured into the respective assemblies, and a control procedure for obtaining said request, configuring the part names in the request into at least one parent assembly by referencing the parts to the parts catalog to determine whether the parts compose the parent assembly and when they compose the parent assembly adding the respective part names to the parent bin, configuring the part names in the request to respective offspring assemblies by referencing the parts in the respective parent bins to the parts catalog to determine whether the parts comprise the offspring assemblies and when they comprise the respective offspring assemblies adding the respective part names to the respective offspring bins, and applying said conditions to the part names in the respective assemblies, and said computer including means for executing said control procedure to obtain said request, configure the part names in said request to respective offspring assemblies, and apply said conditions to the part names in the respective assemblies to thereby check whether the request includes compatible parts for all of the assemblies in the product.

62. The knowledge system as claimed in claim 61 wherein the knowledge base further comprises task blocks for respective ones of said assemblies, said task blocks including imperative language statements for specifying control procedure steps responsive to the parts in the bins for the respective assemblies.

63. The knowledge system as claimed in claim 62 wherein the knowledge base further comprises a separate set of expansion rules specifying the composition of expandable parts in terms of sub-parts, and wherein the task blocks include imperative language statements for adding the sub-parts of expandable parts in the bins to the respective bins.

64. The knowledge system as claimed in claim 61, wherein said knowledge base further comprises a set of actions specifying changes to the set of parts configured into at least some of said assemblies in response to the respective conditions for said assemblies, and wherein said control procedure includes a set of control steps for changing the sets of parts configured into the respective assemblies in the fashion indicated by said actions in response to whether the respective conditions are satisfied when the respective conditions are applied.

65. The knowledge system as claimed in claim 64 wherein the control procedure includes a set of control steps for generating and transmitting to a user a list of said changes made to the set of parts configured into the respective assemblies in the fashion indicated by said actions and an explanation of reasons why the changes were made.

66. The knowledge system as claimed in claim 64 wherein some of said actions specify that certain additional information is to be requested from a user and that certain changes are to be conditionally made in response to information received from the user.

67. A knowledge system for designing a product including assemblies of predetermined parts, said knowledge system comprising a computer having a portion of memory storing a knowledge base and a portion of memory subdivided into respective bins for receiving selected names of said parts for comprising the respective assemblies, said knowledge base including a control procedure for obtaining a set of assembly constraints including conditions applicable to respective assemblies for indicating whether parts in the respective bins have desired properties and respective actions indicating predetermined changes to the sets of parts in the respective bins for obtaining said desired properties in response to whether the respective conditions are satisfied, and applying said conditions of said assembly constraints to the respective assemblies and conditionally executing the respective changes in response to whether the conditions are satisfied, wherein said knowledge base further includes a hierarchy defining at least some of said assemblies as offspring sub-assemblies of respective parent assemblies, and wherein said assembly constraints associated with said parent assemblies have conditions referencing the conditions of parts in the respective offspring bins, and said computer including means for executing said control procedure to thereby obtain said set of assembly constraints, apply said assembly constraints, and conditionally execute said respective changes to thereby obtain a design for said product, said design being indicated by the list of names of the parts in the bins after said conditions are applied and said changes are conditionally executed.

68. The knowledge system as claimed in claim 67 wherein the constraints of said offspring assemblies reference the conditions of parts in the respective parent bins via respective bin variables having respective scopes including the respective parent assembly conditions and the respective offspring assembly conditions.

69. The knowledge system as claimed in claim 67 wherein the knowledge base further comprises task blocks for respective ones of said assemblies, said task blocks including imperative language statements for specifying control procedure steps responsive to the parts in the bins for the respective assemblies.

70. The knowledge system as claimed in claim 67 wherein the control procedure includes a set of control steps for generating and transmitting to a user an ordered list of said changes in the sequence that the changes are executed, and an explanation of why said changes were made.

* * * * *